US012289814B2

(12) United States Patent
Shin et al.

(10) Patent No.: US 12,289,814 B2
(45) Date of Patent: Apr. 29, 2025

(54) CONTROL METHOD OF APPLIANCE

(71) Applicant: LG ELECTRONICS INC., Seoul (KR)

(72) Inventors: Myeongsu Shin, Seoul (KR); Wanglim Lee, Seoul (KR); Janghoon Kim, Seoul (KR); Chan-Yong Yeo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/635,658

(22) Filed: Apr. 15, 2024

(65) Prior Publication Data

US 2024/0276619 A1 Aug. 15, 2024

Related U.S. Application Data

(63) Continuation of application No. 17/885,041, filed on Aug. 10, 2022, now Pat. No. 12,004,279.

(30) Foreign Application Priority Data

Aug. 11, 2021 (KR) ........................ 10-2021-0106320

(51) Int. Cl.
*H05B 47/00* (2020.01)
*H05B 47/105* (2020.01)

(52) U.S. Cl.
CPC .................................. *H05B 47/105* (2020.01)

(58) Field of Classification Search
CPC ...................................................... H05B 47/10
See application file for complete search history.

(56) References Cited

U.S. PATENT DOCUMENTS 8,149,225 B2 * 4/2012 Lee ......................... G06F 3/041 345/173
2016/0091243 A1 3/2016 Beier
(Continued)

FOREIGN PATENT DOCUMENTS

CN 212109183 12/2020
JP 2018-094416 A 6/2018
(Continued)

OTHER PUBLICATIONS

U.S. Appl. No. 11/532,194, filed Dec. 2022, Li; Zhongke.
(Continued)

*Primary Examiner* — Gerald J Sufleta, II
(74) *Attorney, Agent, or Firm* — KED & ASSOCIATES, LLP

(57) ABSTRACT

A control method of an appliance, including: the appliance includes a first unit that includes a first lamp, a first cavity, a first door and a first sensor; a second unit that includes a second lamp, a second cavity, a second door and a second sensor; and a controller that controls operations of the first unit and the second unit, includes sensing vibrations generated in any one of the first unit or the second unit by the first sensor and the second sensor; determining whether the sensed vibrations are caused by a knock, and when determining that the sensed vibrations are caused by a knock using the first sensor and the second sensor, transferring a knock-on signal to the controller; and comparing the knock-on signals received from the first sensor and the second sensor and determining which of the first unit or the second unit is given the knock by the controller, and outputting a lamp-on output signal to the first unit or the second unit in which the knock is generated by the controller.

19 Claims, 30 Drawing Sheets

(56) References Cited

U.S. PATENT DOCUMENTS

| | | | |
|---|---|---|---|
| 2016/0188025 A1 | 6/2016 | Park | |
| 2019/0120546 A1 | 4/2019 | Hong | |
| 2019/0301923 A1 | 10/2019 | Barreto et al. | |
| 2020/0064945 A1* | 2/2020 | Park | H03K 17/9643 |

FOREIGN PATENT DOCUMENTS

| | | |
|---|---|---|
| KR | 10-2019-0001876 A | 1/2019 |
| KR | 10-2020-0042263 | 4/2020 |
| KR | 10-2021-0071372 | 6/2021 |
| KR | 10-2021-0079152 | 6/2021 |
| KR | 10-2021-0095506 | 8/2021 |
| WO | WO 2021/125430 A1 | 6/2021 |

OTHER PUBLICATIONS

European Search Report dated Dec. 20, 2022 issued in EP Application No. 22189733.3.
European Search Report dated Dec. 21, 2022 issued in EP Application No. 22189747.3.
European Search Report dated Dec. 21, 2022 issued in EP Application No. 22189711.9.
U.S. Office Action dated Oct. 20, 2023 issued in U.S. Appl. No. 17/885,041.
U.S. Office Action dated Feb. 5, 2024 issued in U.S. Appl. No. 17/885,041.

* cited by examiner

CONTROL METHOD OF APPLIANCE

CROSS-REFERENCE TO RELATED APPLICATION

This application is a continuation of U.S. patent application Ser. No. 17/885,041, filed Aug. 10, 2022, which claims priority to and the benefit of Korean Patent Application No. 10-2021-0106320, filed in Korea on Aug. 11, 2021, the disclosure of which is incorporated herein by reference in its entirety.

BACKGROUND

1. Field

Disclosed herein is an appliance, and specifically, a control method of the appliance in which a see-through window is applied to a door to allow a user to look into the appliance.

2. Background

Appliances such as a refrigerator, a clothing management device and the like are widely used, and the appliances accommodate objects and include doors.

In an appliance, a cabinet forming an exterior has an accommodation space for accommodating objects, therein, and the appliance is provided with doors for opening and closing the accommodation space. The appliance can be provided with two or more doors, if necessary.

The doors of the appliance are opaque. Accordingly, in the state in which the doors close the accommodation space, it is difficult to check objects accommodated in the accommodation space. In the appliance provided with such doors, the doors are opened to allow a user to check the objects accommodated in the accommodation space.

In the case of an appliance such as a refrigerator, an oven and a dryer, cold air or hot air in the appliance leaks outward as the doors are opened, causing unnecessary energy loss.

In the case of an appliance such as a washing machine, wash water can flow out as the doors are opened. The doors of the washing machine are locked while the washing machine performs a washing operation to prevent the doors from being opened.

Additionally, in some appliances such as an oven, a washing machine, a dryer and the like, a see-through window is applied to their doors. Through the see-through window, the state of an object in the appliance can be checked.

Even if the see-through window is mounted on the doors of the appliance, the object in the appliance cannot be properly checked in the dark or at night.

To solve the problems, appliances, provided with a light for lighting up the inside of the appliance accommodating an object as well as a door on which a see-thought window is mounted, have been on the market, recently. The appliances include a manipulation switch for turning on or off the light. Users can manipulate the manipulation switch and turn on the light, and check the state of the object more clearly through the see-through window.

However, the addition of the manipulation switch for turning on/off the light to an appliance can lead to an increase in the number of manipulation switches provided in the appliance. At this time, a large number of manipulation switches disposed at the appliance can cause deterioration in aesthetic qualities of the entire appliance.

Additionally, in an appliance including a large number of manipulation switches, the size of the manipulation switches needs to decrease or a distance among the manipulation switches needs to decrease, increasing the possibility of an error in manipulation or deteriorating ease of manipulation.

Further, a large number of manipulations switches make users confusing, and users cannot remember which manipulation switch is used in which situation, making it difficult for them to use the appliance.

Furthermore, users can have difficulty in finding and manipulating a manipulation switch for turning on/off a light in the dark. That is, a light required in the dark cannot be used due to darkness.

In recent years, appliances, capable of operating a light that lights up their inside only by a knock operation on the door, have been available on the marked.

Such an appliance can perform the operation of lighting up its inside only based on a knock operation without opening the door or manipulating a manipulation switch, solving the above-mentioned problems to some degree.

In an appliance, which performs the function of operating a light that lights up the inside of the appliance based on a knock operation (hereafter, a "knock-on function"), a lamp operates, as a sensor senses sound waves generated by a knock input applied to the door.

In the appliance, the sensor can be installed in a limited position.

That is, in the appliance, a single medium needs to connect between the point of a knock and the point of the installation of a sensor such that sound waves caused by a knock reach the sensor, since the homogeneity and continuity of the medium for transferring sound waves need to be maintained.

In the appliance, limited points can satisfy the conditioners where a single medium connects between the point of a knock and the point of the installation of a sensor.

That is, in the appliance, the sensor can be installed in limited positions.

Additionally, in the case of an appliance such as an oven and the like, the inside of a cooking space closed by doors is heated, and high-temperature heat is transferred to the doors and the surrounding area thereof. When a sensor is disposed at the door to which high-temperature heat is transferred and in the surrounding area of the door, the sensor cannot operate properly or can be broken due to the heat.

Importantly, the homogeneity of a medium needs to be maintained between the position of the application of a knock and the position of the installation of an acoustic wave sensor in an appliance having the knock-on function. In an appliance, vibrations of the appliance itself or vibrations caused by another external force and the like can occur in addition to vibrations caused by a knock.

At this time, the vibrations caused by a knock cannot distinguish from the other vibrations, causing an error in sensing a knock. To solve the problem, in a conventional appliance having the knock-on function, the homogeneity of a medium is maintained between the position of the application of a knock and the position of the installation of an acoustic wave sensor. In the appliance, the acoustic wave sensor for recognizing a knock input is disposed on a front panel.

The damping width of sound waves transferred along different mediums when the homogeneity of the mediums is not maintained is greater than when the homogeneity of the mediums is maintained. Accordingly, the intensity of sound waves generated by an impact applied to another portion of the appliance rather than the front panel is sufficiently dampened.

In the appliance, the damping width of sound waves is used to distinguish sound waves caused by a knock applied to the front panel from sound waves caused by vibrations of the appliance itself or vibrations induced by external force.

In the appliance, a knock input is sensed in this way, while vibrations, which are not generated on the front panel, are not recognized as a knock, effectively reducing operational errors caused by vibrations of a refrigerator itself or vibrations induced by another external force.

However, in the appliance, since an acoustic wave sensor needs to be attached on the front panel, the sensor can be installed in a limited position. Additionally, the acoustic wave sensor, used to distinguish vibrations of a knock signal generated on the front panel from vibration caused by another factor, can cause the following problems.

That is, the acoustic wave sensor recognizes whether a knock is input, only considering the intensity and pattern of sound waves. Accordingly, the acoustic wave sensor can recognize sound waves, caused by another factor rather than a knock, as a knock.

The acoustic wave sensor senses sound waves without considering the direction of the position where the sound waves are generated. Thus, the acoustic wave sensor cannot determine the position where the sound waves are generated. When the intensity and pattern of sound waves caused by a knock on the door are similar to the intensity and pattern of sound waves caused by another factor in another position rather than the door, the acoustic wave sensor cannot distinguish the two types of sound waves properly. That is, when the intensity and pattern of sound waves caused by another factor in another position rather than the door are similar to the intensity and pattern of the knock, the acoustic wave sensor is highly likely to recognize the sound waves caused by another factor wrongly as the sound waves caused by the knock.

Additionally, in the case of an appliance such as an oven and the like where the temperature of a door and the surrounding area thereof is high, a sensor is highly likely to make an operational error or experience damage due to heat transferred to a see-through window when the sensor is installed at the see-through window. This means that the sensor is rarely disposed at the see-through window. When the sensor is disposed in another position rather than the see-through window, a distance between a point of a knock input and the point of the sensor increases, and the performance of sensing a knock deteriorates.

Further, in an appliance, an acoustic wave sensor is disposed at a door while being pressed against the door. The sensitivity of the acoustic wave sensor depends on the degree to which the acoustic wave sensor is pressed against the door. For example, as the acoustic wave sensor is pressed against the door strongly, the sensitivity of the acoustic wave sensor decreases, and as the acoustic wave sensor is pressed against the door weakly, the sensitivity of the acoustic wave sensor increases.

A decrease in the sensitivity of the acoustic wave sensor results in a decrease in the performance of sensing a knock. An excessive increase in the sensitivity of the acoustic wave sensor increases the possibility that the acoustic wave sensor can make a sensing error while responding to surrounding sound waves having low intensity such as sounds made by vibrations of a motor and the like.

In the prior art, an acoustic wave sensor is used to sense a knock input of an appliance rather than a vibration sensor due to difficulty in filtering vibrations caused by noise, as described above. Additionally, in the prior art, since it is difficult to attach a sensor to the door of an appliance such as an oven and the like due to high-temperature heat, the sensor needs to be disposed in another position rather than the door.

However, as a distance between the point of a knock input and the point of an acoustic wave sensor increases, damping in the transfer of sound waves increases, making it difficult to sense the knock input accurately and filter a noise signal.

Furthermore, appliances, which have been launched recently, provide additional advanced functions to ensure ease of use. Thus, manipulation devices for manipulating the additional functions are added to the doors of the appliances. This means that the design and manufacturing of the doors become more complex and that devices or elements for additional functions need to be disposed in another portion rather than the doors.

Additionally, since the sizes of a see-through window and a display that are mounted on the door tend to increase, the door has not enough space to dispose devices such as sensors, elements, modules and the like for advanced functions. The devices including devices such as a sensor for sensing a knock input need to be disposed in another position rather than the door.

A dishwasher with an acceleration sensor is disclosed in prior art document 1 (JP Patent Publication No. 2018-094416). The acceleration sensor disclosed in prior art document 1 can detect the direction and magnitude of acceleration of the movement of a door caused by vibrations added to the door. The acceleration sensor is disposed at the door, and senses vibrations added to the door, to sense a knock on the door.

The dishwasher that senses a knock by using the acceleration sensor in prior art document 3 can distinguish vibrations caused by a knock very accurately from vibrations caused by another factor in another position rather than the door since the acceleration sensor disposed at the door can detect the direction of acceleration as well as the magnitude of the movement of the door, caused by vibrations added to the door.

That is, the dishwasher in prior art document 1 can improve the accuracy of sensing a knock operation effectively while reducing the possibility that a knock operation is sensed wrongly.

The acceleration sensor can help to improve the accuracy in the dishwasher's sensing of a knock operation in prior art document 1. However, in a high-temperature environment, the acceleration sensor can operate improperly or can be broken, like a vibration sensor or an acoustic wave sensor and the like.

Accordingly, it is difficult to apply the acceleration sensor in prior art document 1 to the appliance such as an oven and the like where the temperature of a door and the surrounding area thereof is high.

Additionally, when the acceleration sensor is installed in a position far from a door or the surrounding area of the door, the performance of sensing a knock can deteriorate, and a noise signal cannot be filtered properly as a distance between a point of a knock input and the point of the acceleration sensor increases, although the acceleration sensor is not affected by high temperature.

An appliance with an acceleration sensor is disclosed in prior art document 2 (International Patent Publication No. 2021125430). According to prior art document 2, a vibration sensor that senses vibrations on the x-axis, y-axis and z-axis is disposed far from a door.

Specifically, according to prior art document 2, a sensor assembly including an acceleration sensor is disposed on a side of a cabinet.

According to prior art document 2, the sensor assembly includes a three axes sensor module including an acceleration sensor, and is disposed at a cabinet. At this time, the sensor assembly can be installed in at least any one of the rear portion of the lower end, the front portion of the upper end, and the rear portion of the upper end of the cabinet, or disposed on a manipulation panel.

Since the sensor assembly is disposed at the cabinet as described above, the sensor assembly can avoid the effect of high temperature. However, as a distance between a point of a knock input and the point of the acceleration sensor increases, the performance of sensing a knock deteriorates, and a noise signal can hardly be filtered.

According to prior art document 2, the portion where the door is installed and the portion where the sensor assembly is installed can be a different medium. Accordingly, vibrations caused by a knock applied to the door can be transferred to the sensor assembly through a plurality of mediums that physically connect to one another. A plurality of solid components that constitute an appliance and physically connect to one another can be the mediums.

A vibration signal sensed by the sensor assembly when vibrations input by a knock are transferred through a plurality of mediums differs from a vibration signal sensed by the sensor assembly when vibrations input by a knock are transferred through a single medium.

In prior art document 2, for the sensor assembly to sense a knock applied to the door properly, information on the damping width of vibrations input by the knock, based on the sorts and number of mediums through which the vibrations pass, needs to be found previously, and based on the found information, settings in relation to the sensing operation of the sensor assembly need to differ.

The sorts and number of mediums can be set differently based on the sort, standard, function or feature and the like of an appliance. Accordingly, for a different sort or standard and the like of an appliance to which the sensor assembly is applied, settings in relation to the sensing operation of the sensor assembly need to differ.

That is, in the appliance of prior art document 2, settings in relation to the sensing operation of the sensor assembly need to change, depending on the sort or standard of an appliance.

Additionally, in a built-in appliance used in a living room or a kitchen, in particular, a built-in oven used in a kitchen, a cabinet forming the exterior of the appliance is often omitted. The built-in oven is usually installed in a way the built-in oven is fitted between kitchen furniture and a wall or between kitchen furniture and kitchen furniture. Accordingly, there is not enough space for installing the sensor assembly between a side of the appliance and kitchen furniture or a wall.

That is, as disclosed in prior art document 2, the structure in which the sensor assembly is disposed on a side of an appliance can hardly be applied to a built-in appliance.

Further, according to prior art document 2, the sensor assembly is installed in an appliance where a plurality of ovens is adjacent to one another in a left-right direction or an up-down direction. However, in prior art document 2, since a single sensor assembly need to control lights of the plurality of ovens, the light of each oven can hardly be controlled based on a knock-on function.

That is, the sensor assembly's one-time sensing of a knock allows of simultaneous control over the lights of the plurality of ovens but does not allow of individual control over the light of each oven.

That is, according to prior art document 2, in an appliance having a plurality of ovens, control of lighting, based on a knock-on function, can hardly be performed for each oven.

An appliance, which has a plurality of accommodation spaces and a plurality of doors opening and closing the accommodation spaces and in which a sensor assembly is installed, is disclosed in prior art document 3 (KR Patent Publication No. 2021-0095506).

According to prior art document 3, the same number of the sensor assemblies as the number of the doors or accommodation spaces are respectively disposed on the sides of the appliance.

The appliance can ascertain the intensity of vibrations sensed respectively by the plurality of sensor assemblies installed as described above to determine a door to which a knock is applied. Based on results of the determination, the appliance can control the operation of a lamp installed in the accommodation space that is opened and closed by the door to which a knock is applied.

According to prior art document 3, a vibration absorption member is disposed between the doors disposed vertically, and dampens vibrations. That is, vibrations caused by a knock on the upper door are dampened by the vibration absorption member, when the vibrations are transferred to a sensor assembly on the lower door, and vice versa.

However, in the appliance of prior art document 3, settings in relation to the sensing operation of the sensor assembly need to change depending on the sort or standard of an appliance.

Further, according to prior art document 3, the plurality of sensor assemblies are disposed at different points, and the appliance ascertains the intensity of vibrations sensed respectively by the plurality of sensor assemblies, and determines a door to which a knock is applied. To this end, a high accuracy in the settings needs to be ensured.

That is, like the appliance of prior art document 2, the appliance of prior art document 3 needs to change settings in relation to the sensing operation of the sensor assembly depending on the sort or standard of the appliance, and accuracy in the settings is required, spending large amounts of expenses and time embodying a knock-on function.

Prior Art Document

Patent Document

Document 1: JP Patent Publication No. 2018-094416
Document 2: KR Patent Publication No. 10-2019-0001876
Document 3: International Patent Publication No. 2021125430

BRIEF DESCRIPTION OF THE DRAWINGS

Embodiments will be described in detail with reference to the following drawings in which like reference numerals refer to like elements, and wherein.

DETAILED DESCRIPTION

Figure 1:
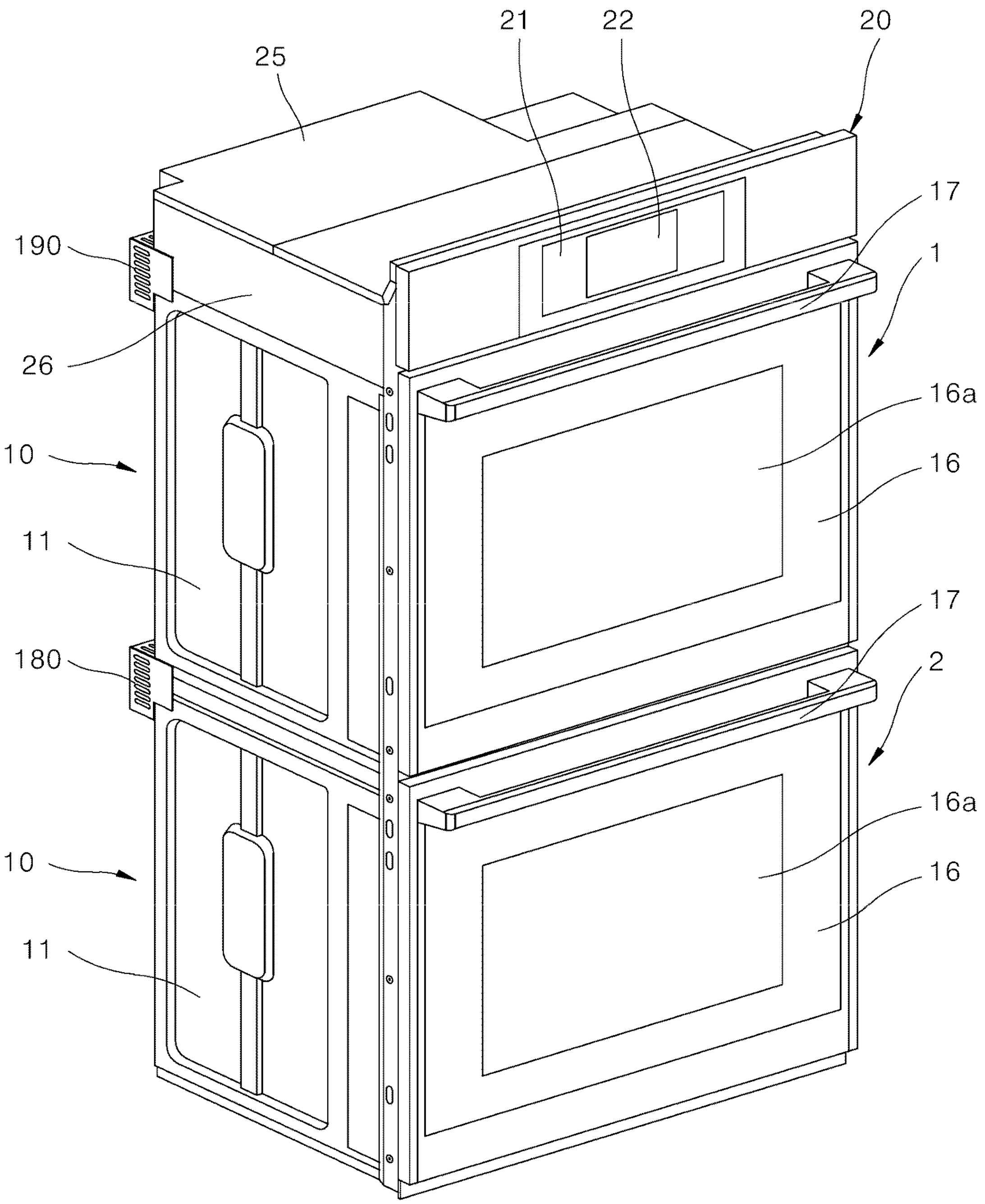
FIG. 1 is a front perspective showing an appliance of one embodiment.

The above-described aspects, features and advantages are specifically described hereunder with reference to the accompanying drawings such that one having ordinary skill in the art to which the present disclosure pertains can easily implement the technical spirit of the disclosure. In the disclosure, detailed description of known technologies in relation to the subject matter of the disclosure is omitted if it is deemed to make the gist of the disclosure unnecessarily vague. Below, preferred embodiments according to the disclosure are specifically described with reference to the accompanying drawings. In the drawings, identical reference numerals can denote identical or similar components.

The terms "first", "second" and the like are used herein only to distinguish one component from another component. Thus, the components should not be limited by the terms. Certainly, a first component can be a second component unless stated to the contrary.

Embodiments are not limited to the embodiments set forth herein, and can be modified and changed in various different forms. The embodiments in the disclosure are provided such that the disclosure can be through and complete and the scope of the disclosure can be fully conveyed to one of ordinary skill in the art. Accordingly, all modifications, equivalents or replacements as well as a replacement of the configuration of one embodiment with the configuration of another embodiment or an addition of the configuration of one embodiment to the configuration of another embodiment, within the technical spirit and scope of the disclosure, should be construed as being included in the scope of the disclosure.

The accompanying drawings are provided for a better understanding of the embodiments set forth herein and are not intended to limit the technical spirit of the disclosure. It is to be understood that all the modifications, equivalents or replacements within the spirit and technical scope of the disclosure are included in the scope of the disclosure. Sizes or thicknesses of the components in the drawings are exaggerated or reduced to ensure ease of understanding. However, the protection scope of the subject matter of the disclosure should not be interpreted in a limited way.

The terms in the disclosure are used only to describe specific implementations or embodiments but not intended to limit the subject matter. The singular forms "a", "an" and "the" are intended to include the plural forms as well, unless explicitly indicated otherwise. It is to be understood that the terms "comprise", "include" and the like, set forth herein, are used to indicate presence of features, numbers, steps, operations, components, parts or combinations thereof, and do not imply the exclusion of one or more additional features, numbers, steps, operations, components, parts or combinations thereof.

The terms "first", "second" and the like are used herein only to distinguish one component from another component. Thus, the components should not be limited by the terms.

When one component is described as being "connected" or "connected" to another component, one component can be directly connected or connected to another component. However, it is also to be understood that an additional component can be "interposed" between the two components. When one component is described as being "directly connected" or "directly connected" to another component, it is to be understood that no additional component is interposed between the two components.

When one component is described as being "on" or "under" another component, one component can be directly on or under another component, and an additional component can be interposed between the two components.

Unless otherwise defined, all the terms (technical or science words) used herein have the same meaning as commonly understood by one of ordinary skill in the art. Additionally, terms such as those defined in commonly-used dictionaries should be interpreted as having a meaning that is consistent with their meaning in the context of the relevant art, and unless explicitly defined herein, should not be interpreted in an ideal or overly formal way.

In the state in which an appliance lies on the floor, with respect to the center of the appliance, a direction in which a door is installed is defined as a forward direction. Accordingly, a direction toward the inside of the appliance with the door open is defined as a rearward direction. For convenience, a direction facing the front and the rear can be referred to as a first direction. Then the forward direction can be referred to as one direction of the first direction, and the rearward direction can be referred to as the other direction of the first direction.

Additionally, a gravitational direction can be defined as a downward direction, and a direction opposite to the gravitational direction can be defined as an upward direction.

Further, a horizontal direction across a front-rear direction of the appliance, i.e., a widthwise direction of the appliance that is seen in front of the door of the appliance can be referred to as a left-right direction. For convenience, the left-right direction can be referred to as a second direction. Then the right side can be referred to as one direction of the second direction, and the left side can be referred to as the other direction of the second direction.

Additionally, the widthwise direction of the appliance can also be referred to as a lateral direction. Then the right side can also be referred to as one side of the lateral direction, and the left side can be referred to the other side of the lateral direction.

An up-down direction can be referred to as a third direction. Then the upward direction can be referred to as one direction of the third direction, and the downward direction can be referred to as the other direction of the third direction.

Further, the up-down direction can be referred to as a longitudinal direction. Then the front-rear direction and the left-right direction, i.e., the first direction and the second direction, can be referred to as a transverse direction.

Throughout the disclosure, the terms "A and/or B" as used herein can denote A, B or A and B, and the terms "C to D" can denote C or greater and D or less, unless stated to the contrary.

[Entire Structure of Appliance]

Figure 2:
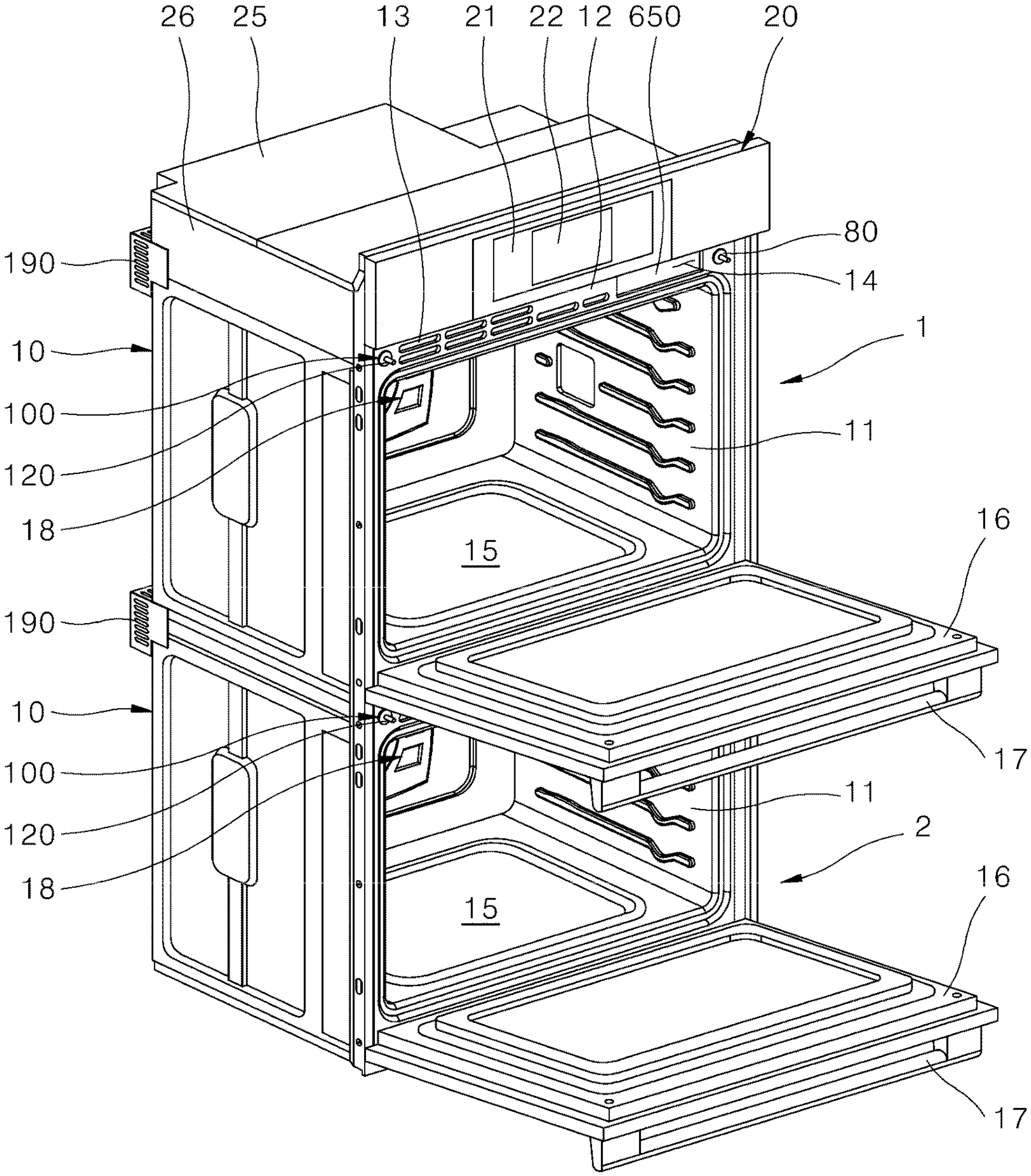
FIG. 2 is a front perspective view showing the appliance of FIG. 1 with a door open.
Figure 3:
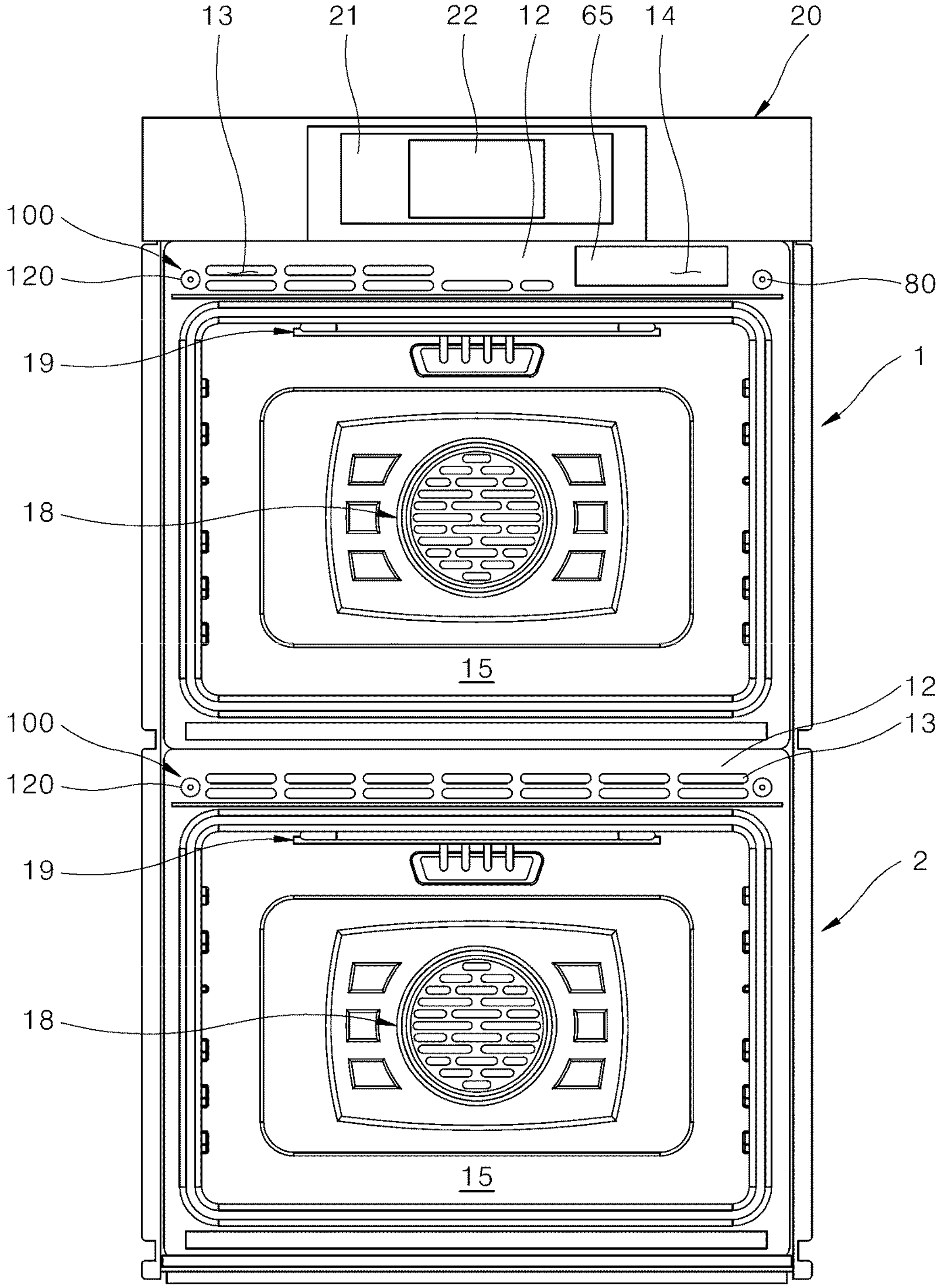
FIG. 3 is a front view showing the appliance of FIG. 2 without the door.
Figure 4:
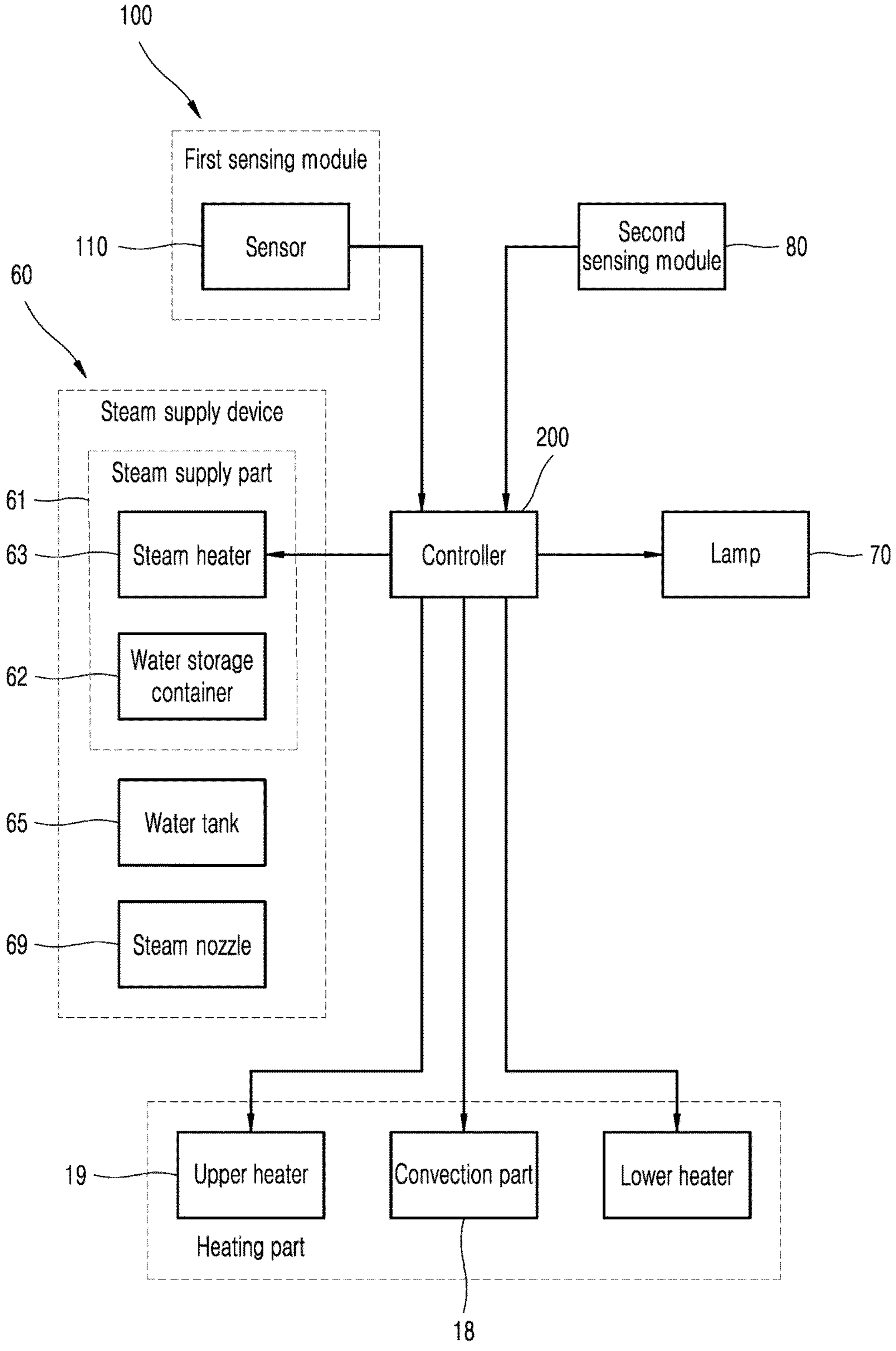
FIG. 4 is a block diagram schematically showing the configuration of the appliance of one embodiment.
Figure 5:
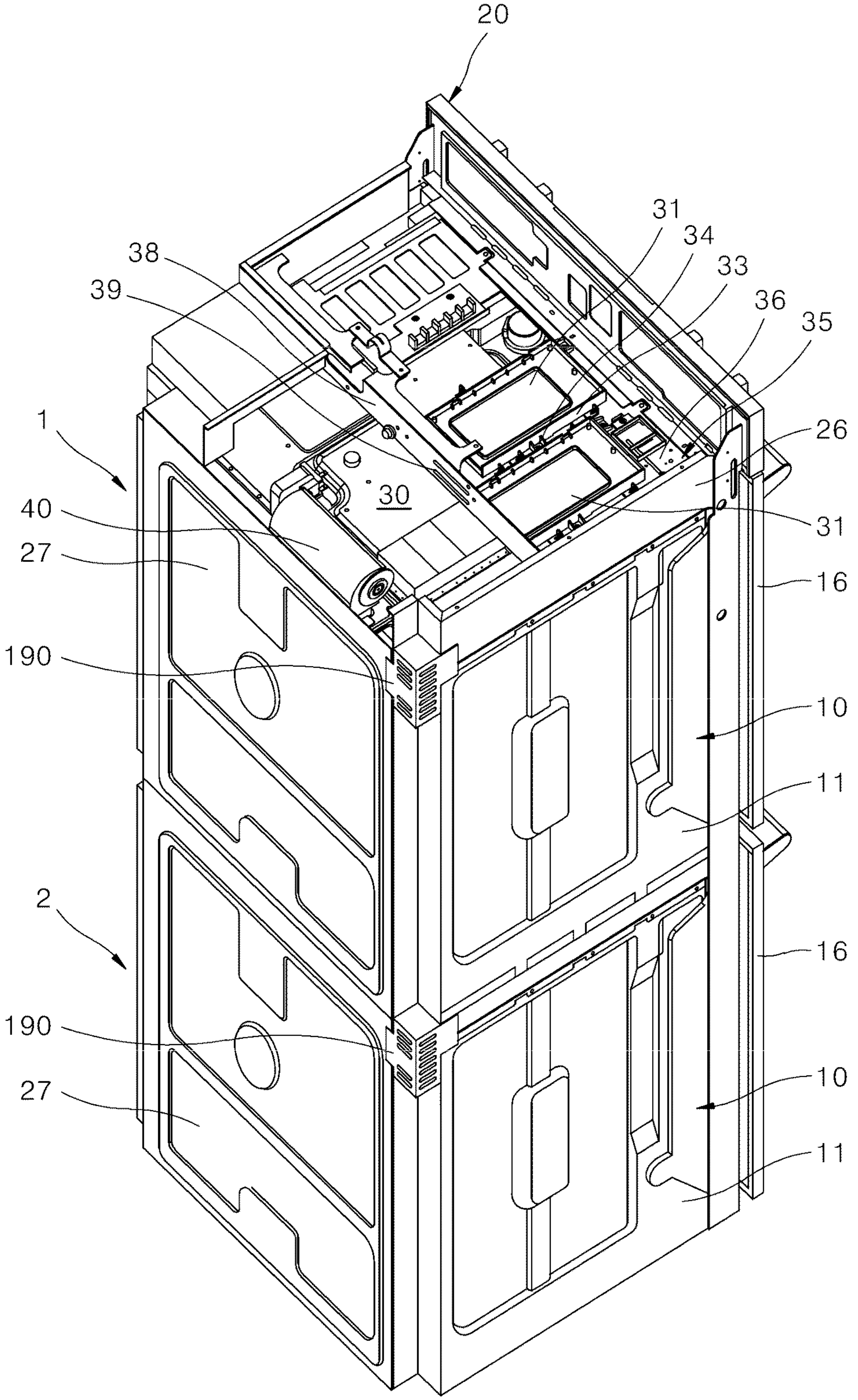
FIG. 5 is a rear perspective view showing the appliance of one embodiment.
Figure 6:
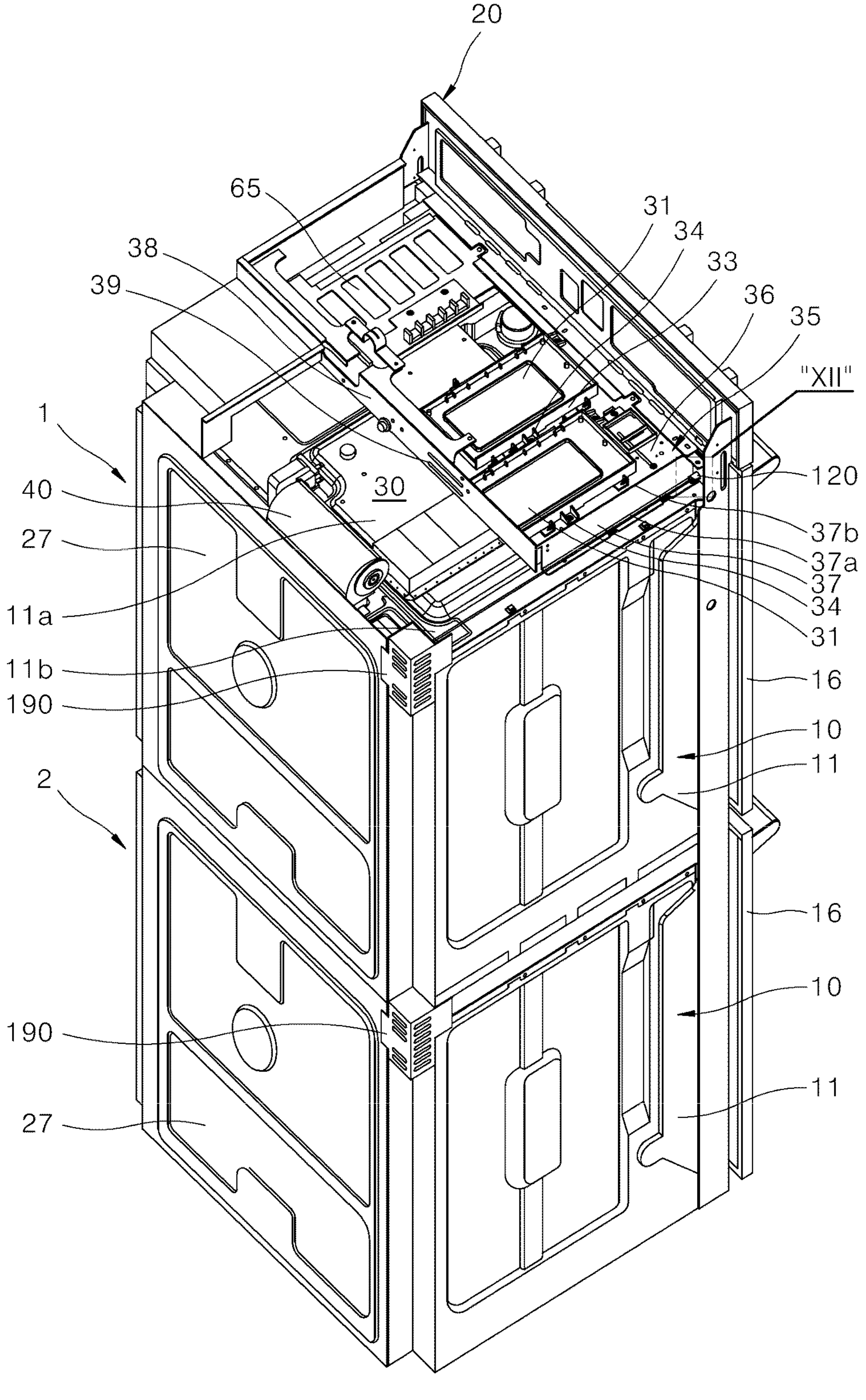
FIG. 6 is a rear perspective view showing the appliance of FIG. 5 without a lateral electronic panel.
Figure 7:
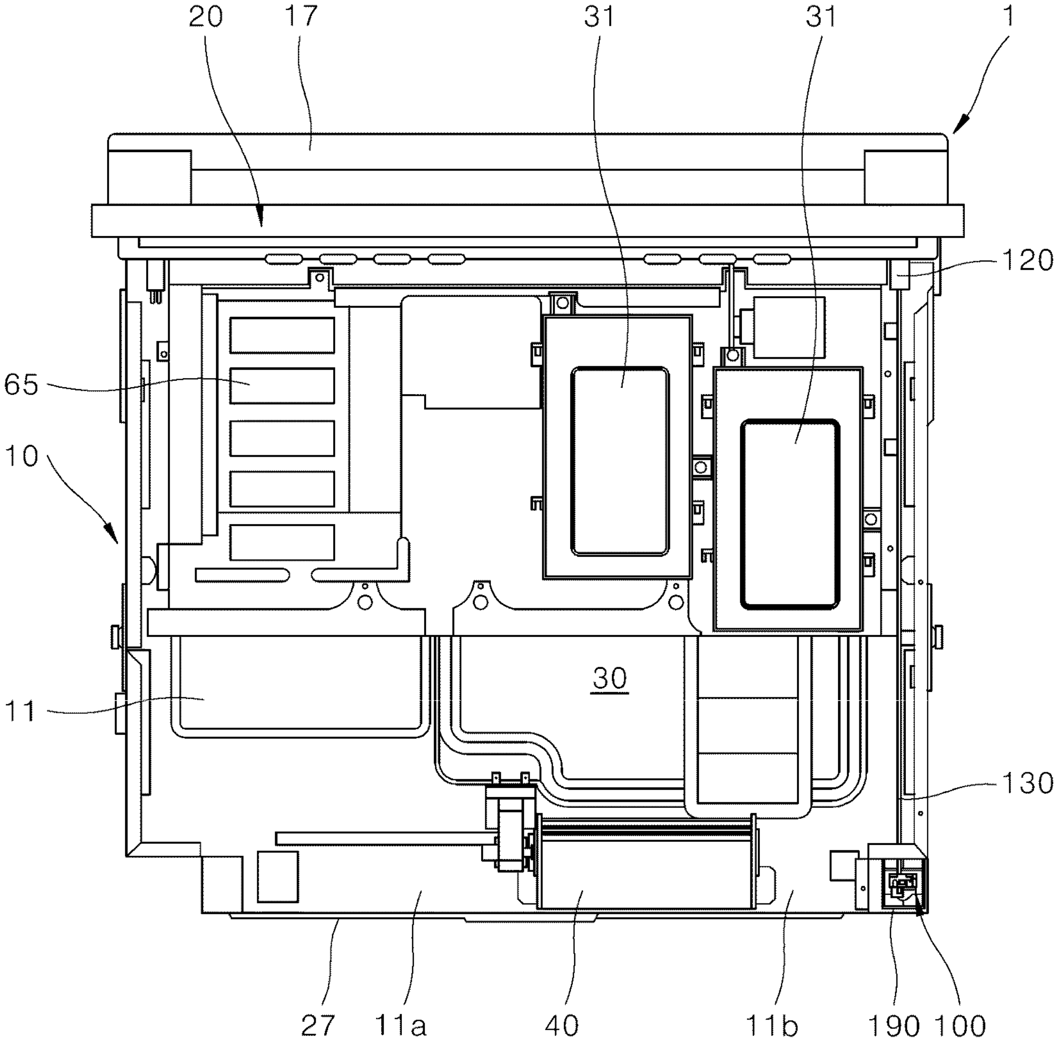
FIG. 7 is a plan view showing the upper surface of the appliance of FIG. 6.
Figure 8:
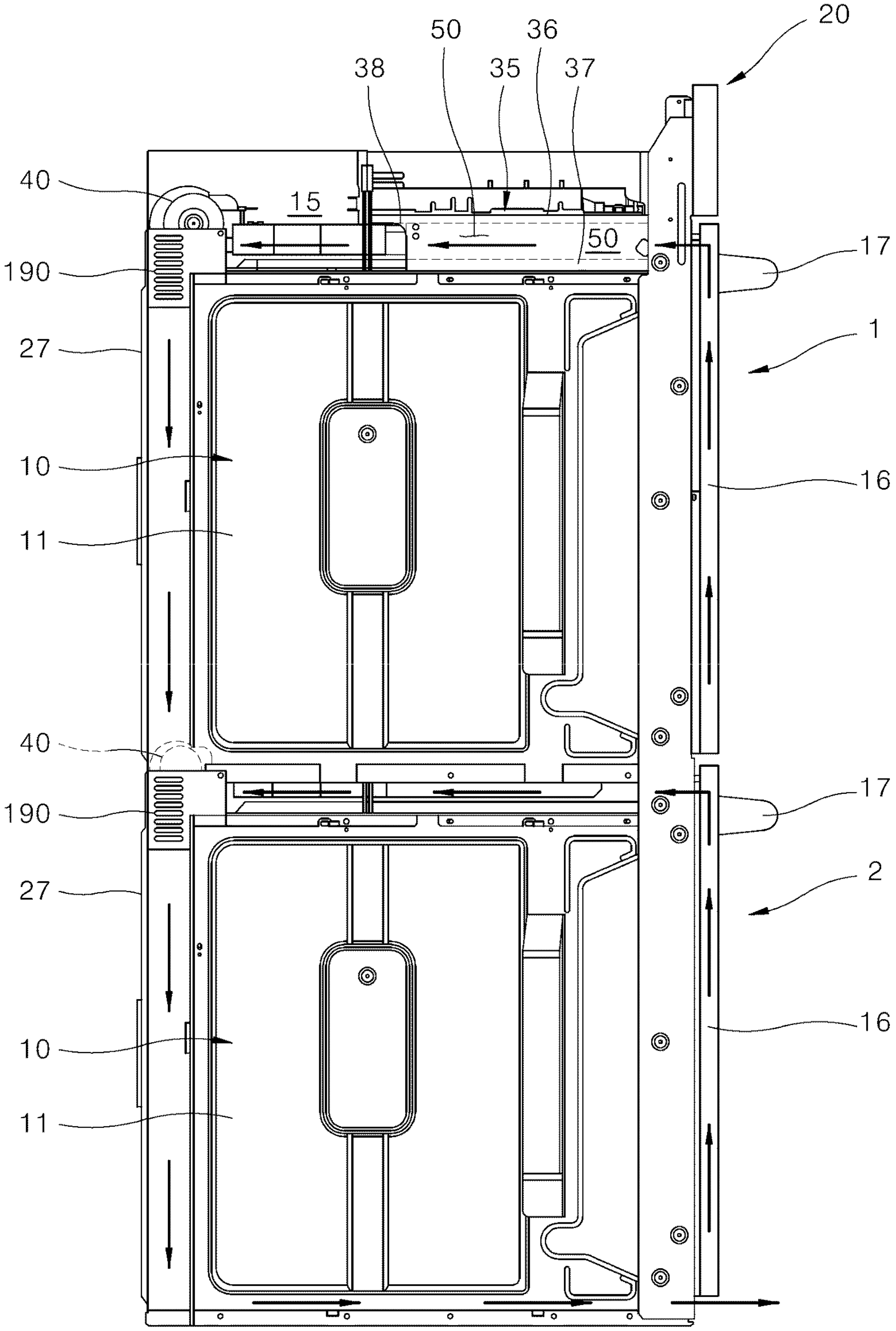
FIG. 8 is a side view showing a lateral surface of the appliance of FIG. 6.

FIG. 1 is a front perspective showing an appliance of one embodiment, FIG. 2 is a front perspective view showing the appliance of FIG. 1 with a door open, and FIG. 3 is a front view showing the appliance of FIG. 2 without the door. FIG. 4 is a block diagram schematically showing the configuration of the appliance of one embodiment, FIG. 5 is a rear perspective view showing the appliance of one embodiment, and FIG. 6 is a rear perspective view showing the appliance of FIG. 5 without a lateral electronic panel. FIG. 7 is a plan view showing the upper surface of the appliance of FIG. 6, and FIG. 8 is a side view showing a lateral surface of the appliance of FIG. 6.

Referring to FIG. 1, the appliance of one embodiment may include a first unit 1 in the upper portion of the appliance, and a second unit 2 in the lower portion of the appliance.

In the embodiment, a cooking appliance is described as an example of the appliance. However, the appliance according to the present disclosure is not limited to a cooking appliance. Other types of appliances such as a washing machine, a dryer, a dishwasher and the like rather than a cooking appliance may be applied to the appliance in the present disclosure.

In the embodiment, while a cooking appliance is provided as an example of the appliance, the first unit 1 and the second unit 2 are both sealed-type cooking appliances such as an electric oven and the like, for example, but not limited.

For example, the first unit 1 in the upper portion of the cooking appliance may be an electric oven, while the second unit 2 in the lower portion of the cooking appliance may be a gas oven. On the contrary, while the first unit 1 in the upper portion of the cooking appliance may be a gas oven, the second unit 2 in the lower portion of the cooking appliance may be an electric oven.

In another example, another type of sealed-type cooking appliances such as a microwave oven that is not an oven may be applied to the first unit 1 or the second unit 2, and open-type cooking appliances such as a cooktop, a hop, a griddle and the like may be applied to the first unit 1 and disposed on the second unit 2.

Hereafter, the configuration of the cooking appliance is described under the assumption that the first unit 1 and the second unit 2 are both electric ovens. Additionally, in description of the configuration of the cooking appliance, the configuration of the first unit 1 is mainly described.

Referring to FIGS. 2 to 5, the exterior of the first unit 1 is formed by a main body 10. The main body 10 may be formed into a shape including an approximately rectangular cuboid shape. The main body 10 may be made of a material having predetermined strength, to protect a plurality of components installed in the inner space of the main body 10.

The main body 10 may include a cavity 11 forming its skeleton, and a front panel 12 being disposed at the front of the cavity 11 and forming the front surface of the main body 10. The cavity 11 has a cooking space 15 therein, and an open portion may be formed inside the front panel 12, and opens the cooking space 15 forward.

The main body 10 may have a first accommodation space therein. In the embodiment, the appliance is a cooking appliance, for example. Accordingly, the first accommodation space formed in the main body 10 may be a cooking space 15 needed to cook food items. Hereafter, the structure of the appliance is described under the assumption that the first accommodation space is the cooking space 15.

The cooking space 15 may be formed into a cuboid, the front surface of which is open. With the cooking space 15 closed, the cooking appliance heats the inner space of the cooking space 15 to cook food items. That is, in the cooking appliance, the inner space of the cooking space 15 is a space in which food items are actually cooked.

The cooking appliance may be provided with a heating part that heats the cooking space 15. As an example of the heating part, a convection part 18 may be provided at the rear side of the cooking space 15, and heats the inner space of the cooking space 15 as a result of convention of hot air.

Additionally, an upper heater may be provided at the upper side of the cooking space 15, as the heating part, and heats the inner space of the cooking space 15 from above. Further, a lower heater may be provided at the lower side of the cooking space 15, as the heating part, and heats the inner space of the cooking space 15 from below.

The main body 10 may include a lamp 70. The lamp 70 is provided to light up the first accommodation space, i.e., the inside of the cooking space 15. The lamp 70 may be installed in the cavity 11. In the embodiment, the lamp 70 is disposed on a lateral surface of the cavity 11, for example.

A door 16 may be swivably disposed at the front of the main body 10 and selectively opens and closes the cooking space 15. The door 16 may open and close the cooking space 15 in a pull-down manner, i.e., in a way that the upper end of the door 16 swivels around the lower end of the door 16.

The door 16 may be formed entirely into a cuboid having a predetermined thickness. Additionally, a handle 17 may be disposed on the front surface of the door 16 such that a user grips the handle 17 to swivel the door 16.

Further, the door 16 may be provided with a see-through window 16*a*. The see-through window 16*a* may be made of a transparent material such as glass, transparent plastics and the like. Depending on an appliance to which the see-through window 16*a* is applied, the see-through window 16*a* needs to withstand high temperature and high pressure, and when necessary, has resistance against water, heat and the like.

A control panel 20 may be disposed in the upper portion of the front surface of the appliance, i.e., on the front surface of the upper portion of the cavity 11. The control panel 20 may form a portion of the exterior of the front surface of the appliance. A display part may be disposed on the control panel 20. The display part may include an input part 21 that is used for adjusting the operations of the appliance, and a display 22 that displays the operation state of the appliance.

In an example, the input part 21 and the display 22 may be formed on a single panel. For example, the input part 21 and the display 22 may be formed into a touch panel that receives the user's touch input.

The display part may display a user interface (UI) or a graphic user interface (GUI) in relation to the driving of the appliance.

Specifically, the display part may include at least one of a liquid crystal display, a thin film transistor-liquid crystal display, an organic light-emitting diode, a flexible display, and a 3D display.

When the display part and a touch sensor sensing a touch operation have a mutually layered structure to form a touch screen, the display part may be used as an input device as well as an output device. The touch sensor, for example, may be formed into a touch film, a touch sheet, a touch pad and the like.

Additionally, the touch sensor may convert a change in pressure applied to a specific portion of the display or capacitance occurring in a specific portion of the display part and the like into an electrical input signal.

A plurality of buttons may be displayed in the display part. For example, a knock-on button for setting the function of turning on/off the lamp 70 installed in the cooking space 15, based on the user's knock input, may be displayed in the display part.

Further, a lamp button for setting the function of turning on/off the lamp 70 manually may be displayed in the display part. Under the assumption that the appliance is an oven, a self-clean button for setting a self-cleaning function of the cooking space 15 and the like may be displayed in the display part.

A second accommodation space may be provided outside the cavity 11, specifically, in the upper portion of the cavity 11. The second accommodation space may be respectively provided in the upper portion of the cavity 11 in the first unit 1, and in the upper portion of the cavity 11 in the second unit 2.

The second accommodation space in the second unit 2 is a space formed between the cavity 11 of the second unit 2 and the cavity 11 of the first unit 1. The second accommodation space in the first unit 1 is a space formed in the upper portion of the cavity 11 in the first unit 1. The second accommodation space in the first unit 1 may be used as a component room 15 for installing electronic components needed for the operations of the appliance.

In summary, the second accommodation space is respectively formed between the first unit 1 and the second unit 2 and in the upper portion of the first unit 1, and out of the second accommodation spaces, the second accommodation space in the upper portion of the first unit 1 may be used as the component room 15.

The component room 15 may be disposed in the upper portion of the cavity 11 and behind the control panel 20. The component room 15 may have a space for installing electronic components, therein.

The front surface of the component room 15 may be blocked by the front panel 12. The front panel 12 may be disposed between the cavity 11 and the door 16. The front panel 12 may be disposed in a way that at least a portion of the front panel 12 blocks the front of the component room 15. For example, the upper area of the front panel 12 disposed in the upper portion of the cooking space 15 may block the front surface of the component room 15.

In the embodiment, the front panel 12 may protrude from the upper portion of the cavity 11 and define the front boundary surface of the second accommodation space. That is, the front panel 12 provided at the second unit 2 may block the second accommodation space formed between the first unit 1 and the second unit 2, from the front. Additionally, the front panel 12 provided at the first unit 1 may define the front boundary surface of the component room 15, in the upper portion of the cavity 11.

A suction opening 13 may be formed on the front panel 12. The suction opening 13 may be formed on the front panel 12 in a way that penetrates in the front-rear direction. The suction opening 13 may form a passage for allowing external air to pass through the front panel 12 and flow into the second accommodation space, on the front panel 12.

On the front panel 12 provided at the first unit 1, a passage through which air outside the component room 15 flows into the component room 15 may be formed by the suction opening 13.

The suction opening 13 may be biased toward the end portion of one side of the front panel 12 in the left-right direction thereof from the left-to-right center of the front panel 12. For example, the suction opening 13 may be disposed from the left-to-right center of the front panel 12 to the right side of the front panel 12.

[Inner Structure of Component Room]

The front boundary surface of the component room 15 may be defined by the front panel 12. Additionally, the upper, lateral and rear boundary surfaces of the component room 15 may be defined by a component room cover 25 that covers the component room 15 from above. Further, the lower boundary surface of the component room 15 may be defined by the upper surface of the cavity 11.

Referring to FIGS. 6 and 7, the upper surface of the cavity 11 may include a first area 11*a* and a second area 11*b*.

The first area 11*a* corresponds to a portion disposed approximately at the center of the upper surface of the cavity 11, and the second area 11*b* corresponds to a peripheral portion surrounding the first area 11_a_. The first area 11_a_ is disposed further upward than the second area 11_b_, and a step may be formed between the first area 11_a_ disposed further upward than the second area 11_b_, and the second area 11_b_ disposed further downward than the first area 11_a_.

Various types of electronic components may be disposed in the component room 15, as described above. For example, a circuit board 31 may be disposed in the component room 15. Various types of elements, circuits and the like in relation to the receipt of a manipulation signal input through the control panel 20, the generation of a control signal for controlling the operations of the heating part, and the like may be provided on the circuit board 31.

The circuit board 31 may be disposed over the cavity 11 through a component supporter 35. The component supporter 35 may support the circuit board 31 while spacing the circuit board 31 form the cavity 11. For example, the component supporter 35 may be disposed on the cavity 11, and the circuit board 31 may be coupled to the component supporter 35 in a position spaced upward from the cavity 11, and spaced a predetermined distance apart from the cavity 11.

The component supporter 35 may include a support plate 36, an air guide 37 and a rear plate 38.

The support plate 36 may form a flat surface parallel with the upper surface of the cavity 11. The support plate 36 may be spaced a predetermined distance apart from the upper surface of the cavity 11. The upper surface of the component supporter 35 may be defined by the support plate 36. That is, the support plate 36 may form the upper surface of the component supporter 35.

In the embodiment, the circuit board 31 may be mounted on the upper surface of the support plate 36, for example. The circuit board 31 may be accommodated in a board case 33, and the board case 33 may be coupled to the support plate 36 in the state of being mounted on the upper surface of the support plate 36.

The board case 33 may be provided with a plurality of fastening projections 34. Each of the fastening projections 34 may protrude outward in the lateral direction of the board case 33. In the state in which each of the fastening projections 34 touches the support plate 36 in the up-down direction, the fastening projections 34 and the support plate 36 may be coupled by a screw. Thus, the board case 33 and the support plate 36 may be coupled.

That is, the board case 33 may be fixed to the upper surface of the support plate 36, and the circuit board 31 may be accommodated in the board case 33, such that circuit board 31 is fixed to the upper surface of the support plate 36.

The air guide 37 may be disposed under the support plate 36, i.e., between the upper surface of the cavity 11 and the support plate 36. Additionally, the air guide 37 may be disposed beside the circuit board 31. The air guide 37 may be formed into a flat surface parallel with a lateral surface 11_c_ of the cavity 11 and form a lateral surface of the component supporter 35.

In the embodiment, the support plate 36 may have a greater length in the front-rear direction than the circuit board 31. The air guide 37 may have a length corresponding to the front-to-rear length of the support plate 36.

The air guide 37 may be coupled to the upper surface of the cavity 11, and the support plate 36. To this end, a lower-end coupling surface 37_a_ and an upper-end coupling surface 37_b_ may be respectively provided at the lower end and the upper end of the air guide 37.

The lower-end coupling surface 37_a_ may be disposed at the lower end of the air guide 37, and formed into a flat surface parallel with the upper surface of the cavity 11. Additionally, the upper-end coupling surface 37_b_ may be disposed at the upper end of the air guide 37, and formed into a flat surface parallel with the support plate 36. For example, the lower-end coupling surface 37_a_ and the upper-end coupling surface 37_b_ may be formed in a way that a portion of the upper side of the air guide 37, and a portion of the lower side of the air guide 37 bend.

The lower-end coupling surface 37_a_ may be coupled to the upper surface of the cavity 11 in the state of touching the upper surface of the cavity 11. The upper-end coupling surface 37_b_ may be coupled to the support plate 36 in the state of touching the lower surface or the upper surface of the support plate 36. The lower-end coupling surface 37_a_ and the cavity 11, and the upper-end coupling surface 37_b_ and the support plate 36 may be screw-coupled.

For example, in the state in which the fastening projection 34, the support plate 37_b_ and the upper-end coupling surface 37_b_ overlap in the up-down direction, the fastening projection 34, the support plate 36 and the upper-end coupling surface 37_b_ are coupled by a single screw at a time, such that the cavity 11, the air guide 37 and the support plate 36 are coupled.

As the cavity 11, the air guide 37, and the support plate 36 are coupled as described above, the support plate 36 may be spaced from the upper surface of the cavity 11 by an approximate height of the air guide 37. Accordingly, the circuit board 31 supported by the support plate 36 may be spaced from the upper surface of the cavity 11 by an approximate height of the air guide 37.

Further, the support plate 36 may be coupled to the front panel 12 disposed in front of the support plate 36. For example, a portion of the upper end of the front panel 12 may bend and form a coupling surface parallel with the support plate 36, and a portion of the support plate 36 may protrude toward the front panel 12 and be coupled to the coupling surface of the front panel 12.

Like the air guide 37, the rear plate 38 may be disposed under the support plate 36, i.e., between the upper surface of the cavity 11 and the support plate 36. Additionally, the air guide 37 may be disposed behind the circuit board 31. The rear plate 38 may be formed into a flat surface parallel with the rear surface 11_d_ of the cavity 11, and form the rear surface of the component supporter 35.

The rear plate 38 may be disposed between a below-described fan 40 and the circuit board 31. The rear plate 38 may form a blocking wall that blocks between the fan 40 and the circuit board 31.

Unlike the air guide 37 sitting in the first area 11_a_ of the upper surface of the cavity 11, the rear plate 38 may sit in the second area 11_b_ of the upper surface of the cavity 11. That is, the rear plate 38 may be disposed further upward than the air guide 37 and protrude further upward than the air guide 37 and the circuit board 31. The rear plate 38 may be coupled to at least any one of the air guide 37 and the support plate 36, and fixed to the rear of the circuit board 31.

A cold air flow path 50 may be formed between the upper surface of the cavity 11 and the support plate 36 that are spaced from each other. The cold air flow path 50 may be a space surrounded by the upper surface of the cavity 11, the support plate 36 and the air guide 37. The front of the cold air flow path 50 is blocked by the front panel 12, and the rear of the cold air flow path 50 is blocked by the rear plate 38.

That is, the upper surface of the cold air flow path 50 may be defined by the support plate 36, and the lateral surface of the cold air flow path 50 may be defined by the air guide 37, and the front and rear surfaces of the cold air flow path 50 may respectively be defined by the front panel 12 and the rear plate 38.

The cold air flow path 50 may connect to the suction opening 13 formed on the front panel 12. That is, the suction opening 13 may forma a passage for allowing air outside the appliance to flow into the cold air flow path 50, on the front panel 12.

Additionally, an exhaust opening 39 may be formed on the rear plate 38 in a way that penetrates in the front-rear direction. The cold air flow path may connect to the exhaust opening 39, and the exhaust opening 39 may form a passage for allowing air in the cold air flow path 50 to pass through the rear plate 38, on the rear plate 38.

While being disposed in the component room 15, the fan 40 may be disposed near the rear surface of the cavity 11. The fan 40 may include a turbo fan installed on the upper surface of the cavity 11. The fan 40 may suction air in front of the component room 15 and discharge the air to a space behind the coking space 15.

Further, a lower through hole may be provided in the lower portion of the front of the main body 10, and communicate with the space behind the cooking space 15 and be open forward.

As the fan 40 operates, external air in the lower portion of the front of the main body 10 may flow into the door 16 through an air flow hole provided in the lower portion of the door 16, and move upward, as illustrated in FIGS. 6 to 8. In this process, the door 16 heated by heat, transferred to the door 16 from the cooking space 15, may cool.

The air having moved upward in the door 16 may flow into the component room 15 through the air flow hole provided in the upper portion of the door 16 and through the suction opening 13 formed on the front panel 12 and penetrating the front panel 12. The air having flown into the component room 15 may cool electronic components disposed in the component room 15 while being suctioned into the fan 40, be discharged to the space behind the cooking space 15 and then be discharged to the front of the main body 10.

The air having flown into the component room 15 through the suction opening 13, i.e., most of the cold air, may pass through the cold air flow path 50. The flow of the cold air may be guide by the air guide 37 disposed on the lateral surface of the cold air flow path 50.

The cold air having flown into the cold air flow path 50 may cool electronic components such as a circuit board 31 supported by the component supporter 35, and escape from the cold air flow path 50 through the exhaust opening 39 and flow into the fan 40.

The rear plate 38 may block between the cold air flow path 50 and the fan 40, and a passage between the cold air flow path 50 and the fan 40 may be formed only in the portion of the rear plate 38, where the exhaust opening 39 is formed. Accordingly, the cold air having flown into the cold air flow path 50 may cool the circuit board 31 and the like while staying in the cold air flow path 50 for a certain period of time without escaping from the cold air flow path 50 immediately, and then be discharged out of the cold air flow path 50 through the exhaust opening 39.

[Structure of Steam Supply Device]

Referring to FIGS. 2 to 7, the appliance in the embodiment may further include a steam supply device 60. The steam supply device 60 may be installed in the main body 10, and provided as a component that supplies steam into the cooking space 15. The steam supply device 60 may include a steam supply part 30 and a water tank 65.

The steam supply part 61 may operate to heat water and generate steam, and include a water storage container 62 and a steam heater 63. The water storage container 62 may accommodate water that is supplied from the water tank 30 through a connection pipe. The steam heater 63 may heat water accommodated in the water storage container 62, and generate steam.

The steam supply device 60 may further include a steam nozzle 69. The steam nozzle 69 may spray steam, generated in the steam supply part 61, into the cooking space 15. The steam nozzle 69 may be disposed in the cooking space 15, and disposed on the upper surface of the cavity 11.

The water tank 65 may be provided to store and supply water required by the steam supply part 61. The water tank 65 may be disposed in the second accommodation space. In the embodiment, the water tank 65 is provided in the first unit 1, for example.

Accordingly, the water tank 65 may be disposed in the component room 30. The water tank 65 may pass through the front panel 12 from the inside of the component room 30 and be withdrawn toward the front of the appliance.

Additionally, an opening part 14 may be formed on the front panel 12, and provides a passage for allowing the water tank 65 to pass through the front panel 12 in the front-rear direction.

In the embodiment, the opening part 14 may be biased toward the end portion of the other side of the front panel 12 in the left-right direction thereof from the left-to-right center of the front panel 12. For example, the suction opening 13 may be biased toward the right side of the front panel 12, and the opening part 14 may be biased toward the left side of the front panel 12.

The water tank 65 may be withdrawn toward the front of the appliance through the opening part 14, and in the state in which the water tank 65 is withdrawn, water may be added to the water tank 65.

[Schematic Configuration of First Sensing Module, Second Sensing Module and Controller]

The appliance in the embodiment may include a first sensing module 100, a second sensing module 80 and a controller 200.

The first sensing module 100 may be provided to sense vibrations caused by a knock input to the door 16. As the first sensing module 100 senses vibrations caused by a knock, the first sensing module 100 may operate in a way that outputs a first signal.

The first sensing module 100 may be installed in the main body 10. At least a portion of the first sensing module 100 may be exposed toward the door 16 from the main body 10. In the embodiment, while a portion of the first sensing module 100 is disposed on the front panel 12 in a way that penetrates in the front-rear direction, for example. Description in relation to this is provided hereafter.

The first sensing module 100 may include a sensor 110 capable of sensing vibrations. The sensor 110 may sense a knock input applied to the appliance. Specifically, the sensor 110 may be a sensor that senses vibrations transferred by a medium. As vibrations generated in the door 16 by a knock is transferred to the sensor 110 through a medium, the sensor 110 may sense the vibrations.

Certainly, the sensor may sense vibrations caused by another factor as well as vibrations caused by a knock. In the embodiment, the sensor 110 is provided to identify and sense vibrations, in particular, caused by a knock that is input by the user.

Accordingly, the sensor 110 in the embodiment may accurately distinguish vibrations caused by a knock that is input by the user from vibrations caused by another factor. For example, the sensor 110 may sense vibrations, which are transferred in a pattern identical with a pattern unique to vibrations caused by a knock, as vibrations caused by the user's knock.

The second sensing module 80 may be provided to sense the opening and closing of the door 16. The second sensing module 80 may sense the opening and closing of the door 16, between the main body 10 and the door 16.

The second sensing module 80 may be installed in the main body 10. At least a portion of the second sensing module 80 may be exposed toward the door 16 from the main body 10. In the embodiment, a portion of the second sensing module 80 is disposed on the front panel 12 in a way that penetrates in the front-rear direction, for example. Description in relation to this is provided hereafter.

In the embodiment, the first sensing module 100 may be disposed in the first accommodation space, i.e., above the cooking space 15, and outside the cooking space 15 in the left-right direction. The second sensing module may also be disposed above the first accommodation space, and outside the first accommodation space in the left-right direction.

The second sensing module 80 and the first sensing module 100 may be spaced from each other in the left-right direction, with the first accommodation space therebetween. For example, the first sensing module 100 and the second sensing module 80 are spaced from each other with the cooking space 15 therebetween. The first sensing module 100 is biased toward the right side of the front panel 12, and the second sensing module 80 is biased toward the left side of the front panel 12.

In the embodiment, the second sensing module 80 includes a tact switch, for example. The second sensing module 80 is pressed and turned on by the door 16 as the door 16 is closed, and is turned off as the door 16 is opened.

The second sensing module 80, pressed and turned on by the door 16, may output a second signal, and the operations of components, which are supposed to be performed as the second signal is output, may be controlled by the controller 200.

The controller 200 may control the operations of the appliance. For example, the controller 200 may control the operations of the heating part, the lamp 70, the fan 40 and the like, based on a manipulation signal that is input through the display part, the input part 21 and the like of the control panel 20.

Additionally, the controller 200 may control the operation of the display 22 that displays the operation state of the appliance. For example, the controller 200 may be constituted by a micro controller mounted on the circuit board 31.

[Schematic Structure of First Sensing Module and Structure of Sensor]

Figure 9:
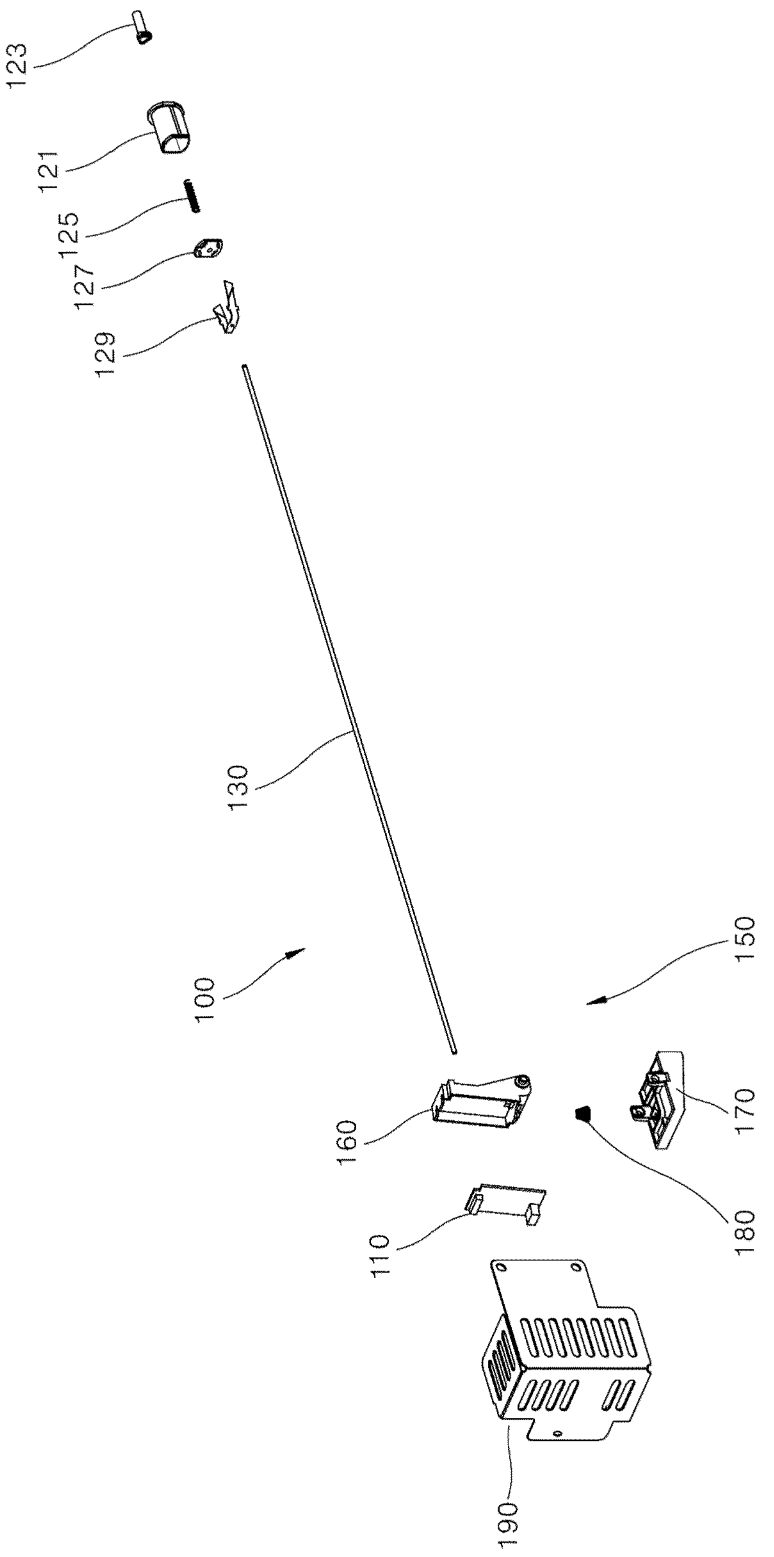
FIG. 9 is an exploded perspective view separately showing components of a first sensing module of one embodiment.
Figure 10:
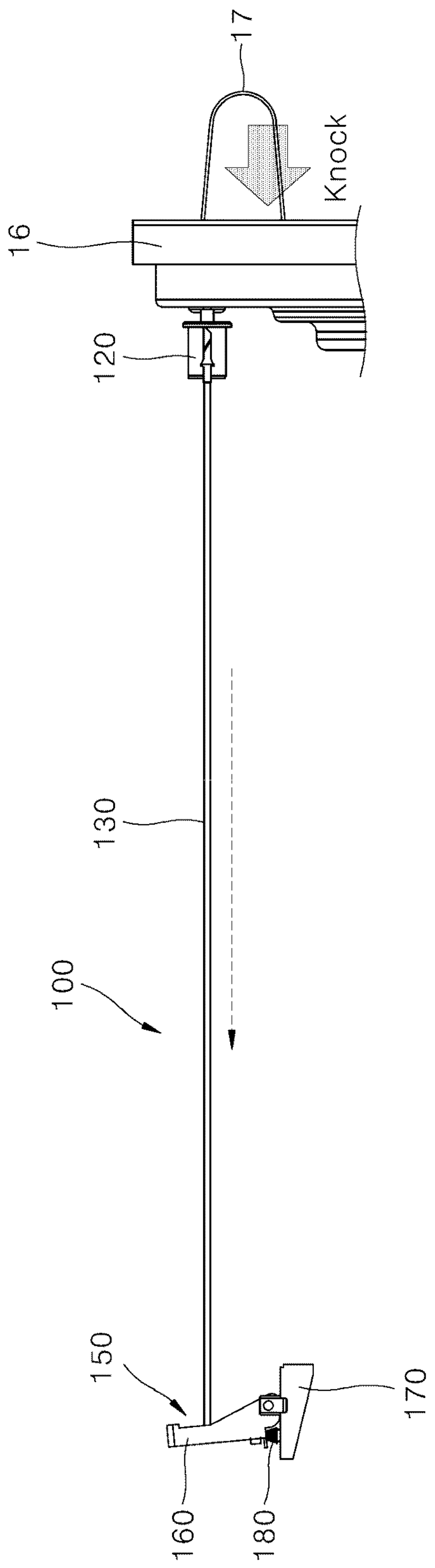
FIG. 10 is a side view showing a connection state of the first sensing module of FIG. 9.
Figure 11:
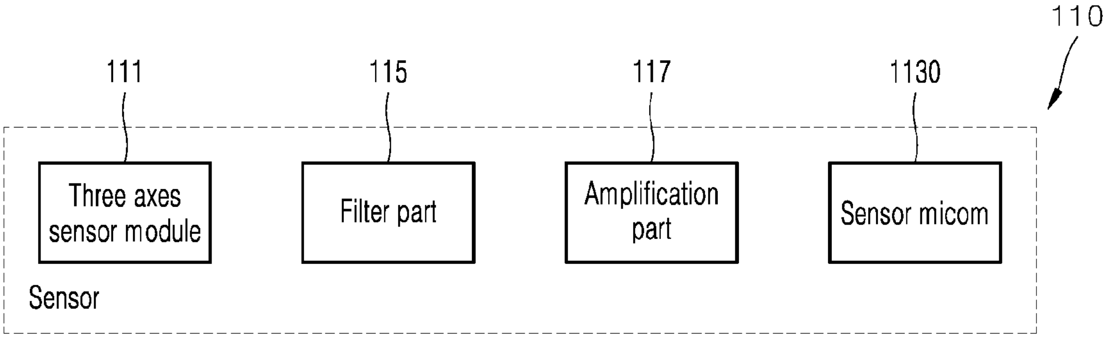
FIG. 11 is a view schematically showing the configuration of a sensor provided in the first sensing module of FIG. 9.

FIG. 9 is an exploded perspective view separately showing components of a first sensing module of one embodiment, FIG. 10 is a side view showing a connection state of the first sensing module of FIG. 9, and FIG. 11 is a view schematically showing the configuration of a sensor provided in the first sensing module of FIG. 9.

Referring to FIGS. 2 to 4 and 9 to 10, the first sensing module 100 may include an input switch 120, a transfer member 130, a sensor 110 and a support assembly 150.

The input member may be provided to receive vibrations of the door 16. For example, the input member may include the input switch 120. The input switch 120 may be disposed at the frontmost side of the first sensing module 100.

At least a portion of the input switch 120 may be disposed between the cavity 11 and the door 16. In the embodiment, the input switch 120 is disposed on the front panel 12, for example. At least a portion of the input switch 120 may be exposed to the front of the front panel 12 while being supported by the front panel 12. That is, the input switch 120 may be disposed on the front panel 12 in a way that at least a portion of the input switch 120 is disposed between the front panel 12 and the door 16.

In the embodiment, the front panel 12 may have an open portion that exposes the cooking space 15 to the front of the front panel 12, and the input switch 120 may be disposed further upward than the open portion. At this time, the left-to-right position of the input switch 120 may be adjacent to the left-to-right end portion of the open portion.

Additionally, the front panel 12 may have a suction opening 13 and an opening part 14, and the suction opening 13 may be biased toward the end portion of one side of the front panel 12 in the left-right direction of thereof. Additionally, the input switch 120 may be disposed between the end portion of one side of the front panel 12 in the left-right direction thereof and the suction opening 13.

That is, the input switch 120 is biased further toward one side in the left-right direction than the suction opening 13, and the first sensing module 100 provided with the input switch 120 may be disposed near the end portion of one side of the appliance in the left-right direction thereof.

The transfer member 130 may be provided to transfer vibrations, transferred to the input switch, to the sensor 110. In the embodiment, the sensor 110 may be disposed at the rear of the cavity 11, and the transfer member 130 may connect between the input switch 120 and the sensor 110. That is, the transfer member 130 may be provided to connect between the input switch 120 disposed at the front of the cavity 11 and the sensor 110 disposed at the rear of the cavity 11.

For example, the transfer member 130 may be formed into a thin rod that is elongated in the front-rear direction. The end portion of the front side of the transfer member 130 may connect to the input switch 120, and the end portion of the rear side of the transfer member 130 may connect to the support assembly 150 at which the sensor 110 is disposed.

The transfer member 130 may connect between the input switch 120 and the sensor 110 while passing through the second accommodation space. In the embodiment, the input switch 120 is disposed in the upper portion of the first accommodation space and at the front of the second accommodation space, and the sensor 110 may be disposed at the rear of the second accommodation space. The sensor 110 connecting between the input switch 120 and the sensor 110 may be installed in a way that passes through the second accommodation space.

In the first unit 1, the second accommodation space may be used as a component room 15. Accordingly, the transfer member 130 provided in the first unit 1 may connect between the input switch 120 and the sensor 110 while passing through a component room 30 where electronic components connecting to the controller 200 are disposed.

The transfer member 130, provided as described above, may serve as a medium for transferring vibrations input through the door 16 and the input switch 120 toward the sensor 110.

In the embodiment, the transfer member 130 is formed into a rod, for example. Preferably, the transfer member 130 may be formed into a rod having a rigid body causing no vibration damping.

The sensor 110 may be disposed at the rear of the cavity 11 and the first accommodation space, as described above. The sensor 110 may sense a vibration sensing signal corresponding to vibrations, and based on the sensed vibration sensing signal, determine whether a knock is input. In an example, the sensor 110 may determine that a knock is applied when vibration sensing signals of a predetermined threshold or greater are sensed continuously at predetermined intervals.

Vibrations caused by a knock may be produced only in the first axis direction among three axes directions. For example, vibrations caused by a knock may be produced only in the direction of any one of the x-axis, y-axis and z-axis. Considering the fact, to determine whether vibrations are caused by a knock, it needs to be found which direction of vibrations causes a sensed vibration sensing signal.

In another example, the sensor 110 may compare the pattern of a vibration sensing signal caused by a knock with the pattern of an actually sensed vibration sensing signal, and based on results of the comparison, determine whether vibrations are caused by a knock.

The pattern of the vibration sensing signal caused by a knock (hereafter, a "predetermined knock signal") may be determined previously. The sensor 110 may compare the pattern of an actually sensed vibration sensing signal with the pattern of the predetermined knock signal, and based on results of the comparison, determine whether vibrations are caused by a knock.

The sensor 110 may sense vibrations that are transferred in all directions. For example, the sensor 110 may include a vibration sensor having a plurality of axes. The sensor 110 including the vibration sensor may sense vibrations that are transferred in a plurality of axes directions.

That is, the sensor 110 in the embodiment senses vibrations that are transferred in three axes directions, and may sense vibrations corresponding to a knock by combining vibration sensing signals corresponding to the vibrations in the three axes directions.

The sensor 110, as illustrated in FIGS. 4 and 11, may include a three-axes sensor module 111 and a sensor micom (or sensor controller) 113.

In an example, the three axes sensor module 111 may include a single three axes acceleration sensor that senses vibrations, transferred in three axes directions orthogonal to one another, at the same time. The three axes acceleration sensor may detect three axes components of acceleration with a single sensor. The three axes acceleration sensor may detect a very small change in the movement (acceleration) of a medium in the three axes directions orthogonal to one another, which is caused by vibrations, respectively.

At this time, the three axes acceleration sensor may be installed such that any one axis direction among the three axes directions is aligned with the direction of vibrations caused by a knock, for example. Since the three axes acceleration sensor is installed as described above, accuracy in the sensor 110's sensing of knock vibrations may improve.

In another example, the three axes sensor module 111 may include three independent acceleration sensors. In another example, the three axes sensor module 111 may include four or more independent acceleration sensors. As the number of acceleration sensors increases, accuracy in the sensor 110's sensing of vibrations may improve.

At this time, at least one of the plurality of acceleration sensors may be installed such that the direction of the axis of the acceleration sensor's sensing of vibrations is aligned with the direction of vibrations caused by a knock, for example. As the direction of vibrations caused by a knock is aligned with the direction of any one of the three axes, accuracy in the sensor 110's sensing of vibrations caused by a knock may improve.

In yet another example, a first axis acceleration sensor that senses vibrations in the first axis direction, and a second axis sensor that senses vibrations in the second axis direction may be applied to the sensor 110. At this time, the sensor 110 needs to be installed such that the direction of vibrations caused by a knock applied to the door is aligned with the axial direction of the acceleration sensor.

Additionally, the sensor 110 may further include a filter part 115. A vibration sensing signal sensed by the sensor 110 may include unnecessary noise in addition to a vibration sensing signal caused by a knock input. The filter part 115 may remove the noise.

Further, the sensor 110 may further include an amplification part 117. A signal that is output after the filter part 115 removes noise may be amplified by the amplification part 117. The amplified signal may be input to the sensor micom 113.

The sensor micom 113 may be configured in addition to the controller 200. The sensor micom 113 may determine whether vibrations sensed by the sensor 110 are vibrations caused by a knock input by the user, based on a signal output from the amplification part 117. When determining that the vibrations are vibrations caused by a knock input by the user, the sensor micom 113 may transmit information in relation to this to the controller 200.

For example, the sensor micom 113 may determine whether vibrations are caused by a knock, based on results of the comparison of the pattern of a vibration sensing signal generated by the three axes sensor module with the pattern of the predetermined knock signal.

The sensor micom 113 may extract a vibration sensing signal in the predetermined first direction among vibration sensing signals in the three directions. The sensor micom 113 may determine whether vibrations are caused by a knock, by using the extracted vibration sensing signal in the first direction. This is because vibrations caused by a knock are produced in the first direction.

Additionally, when the vibration sensing signal in the first direction is input at the magnitude of a first predetermined threshold or greater and then a vibration sensing signal in the same direction is input at the magnitude of a second predetermined threshold or greater within a predetermined range of time, the sensor micom 113 may determine that vibrations sensed by the sensor 110 are vibrations caused by a knock.

Ordinarily, a knock is applied in the form of "knock knock", and vibrations corresponding to "knock knock" are indicated as a signal having magnitude greater than that of vibrations caused by another factor. Accordingly, when a vibration sensing signal corresponding to "knock knock is respectively at the magnitude of the first threshold and the second threshold or greater, the sensor micom 113 may determine that vibrations sensed by the sensor 110 are vibrations caused by a knock.

Further, the sensor micom 113 may extract a vibration sensing signal in any one axis direction (the first axis direction) aligned with the direction of vibrations caused by the knock, among vibration sensing signals in the three axes directions. The sensor micom 113 may determine whether vibrations are caused by a knock, based on results of the comparison of the extracted vibration sensing signal with the vibration sensing signals in the two other axes directions (the second and third axes directions).

For example, when a maximum value of the vibration sensing signal in at least one of the second axis direction or the third axis direction is greater than a maximum value of the vibration sensing signal in the first axis direction, the sensor micom 113 may determine that vibrations sensed by the sensor 110 are not vibrations caused by a knock.

When receiving a signal (hereafter, a "knock-on signal"), corresponding to vibrations caused by a knock, from the sensor 110, specifically, the sensor micom 113, the controller 200 may determine whether the signal is generated in the first unit 1 or the second unit 2, and turn on/off the lamp 70, based on the determination result.

In the embodiment, the three axes sensor module 111 and the sensor micom 113 may be mounted on a signal PCB substrate, and together with the PCB substrate, configured as a sensor 110 in the form of an integrated module. Additionally, in the case of a sensor 110 further including the filter part 115 and the amplification part 117, the sensor may be embodied as an integrated module-type sensor 110 where the three axes sensor module 111, the sensor micom 113, the filter part 115 and the amplification part 117 are mounted on a single PCB substrate.

Since the sensor 110 is formed into an integrated module, the sensor 110 may be easily installed, and the position of the installation of the sensor 110 may vary. The sensor 110 may be easily disposed at a supporter 160 of the support assembly 150 that is described hereafter. Description in relation to this is provided hereafter.

The support assembly 150 may be installed in the main body 10 and support the sensor 110, and transfer vibrations, transferred through the transfer member 130, to the sensor 110. The support assembly 150 may include a supporter 160, and a supporter holder 170.

The supporter 160 may be provided to support the sensor 110. The supporter holder 170 may be installed in the main body 10, and support the supporter 160 in a way that the posture of the supporter 160 changes. Hereafter, the structure of each of the components of the first sensing module including the support assembly 150 is described specifically.

[Structure of Input Switch]

Figure 12:
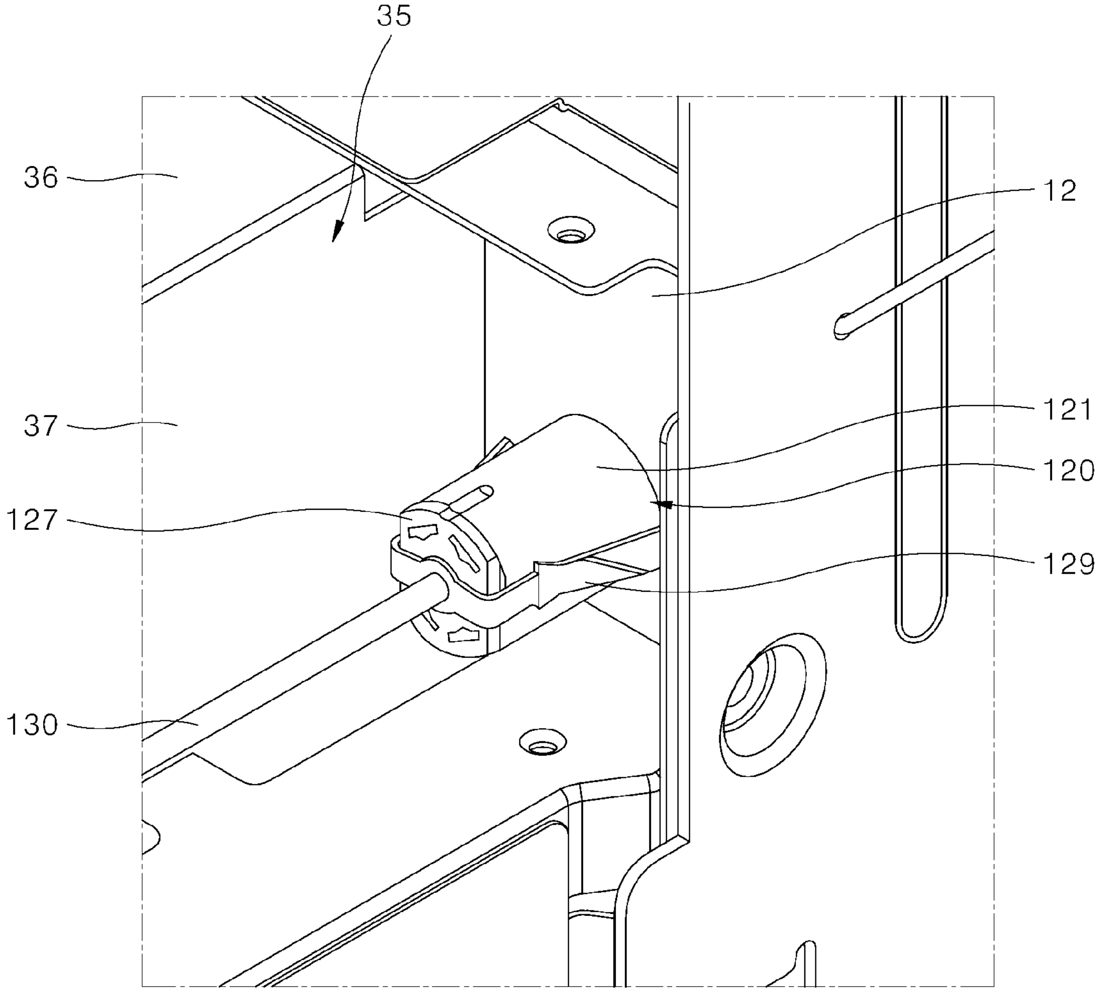
FIG. 12 is an enlarged view showing portion "XII" of FIG. 6.
Figure 13:
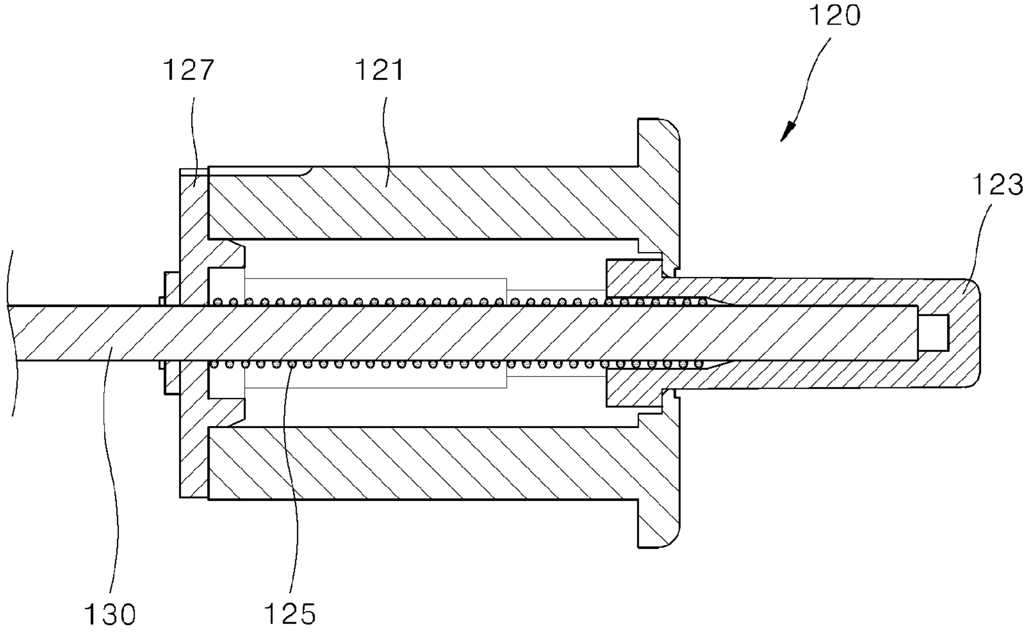
FIG. 13 is a cross-sectional view showing the inner structure of an input member of one embodiment.
Figure 14:
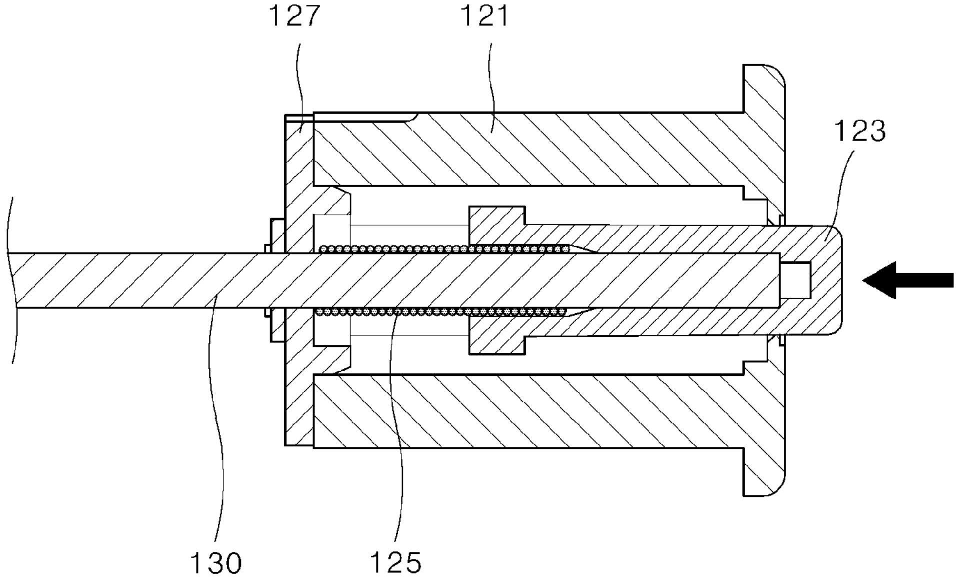
FIG. 14 is a cross-sectional view showing the input member of FIG. 13 is pressed.

FIG. 12 is an enlarged view showing portion "XII" of FIG. 6, FIG. 13 is a cross-sectional view showing the inner structure of an input switch of one embodiment, and FIG. 14 is a cross-sectional view showing the input switch of FIG. 13 is pressed.

Referring to FIGS. 2 and 12, the input switch 120 may be disposed on the front panel 12, and at least a portion of the input switch 120 may be disposed between the front panel 12 and the door 16 and exposed toward the door 16. The input switch 120 may include a switch holder 121, and a moving member 123.

The switch holder 121 may form the exterior of the input switch 120, and have an accommodation space for accommodating the moving member 123 therein. In the embodiment, the switch holder 121 is formed into a lying cylinder, for example. The switch holder 121 has a hollow hole therein, and the end portion of the front of the switch holder 121 may be open forward.

The switch holder 121 may be disposed on the front panel 12. At this time, the open end portion of the front of the switch holder 121 may be exposed toward the front of the front panel 12, and most of the area of the switch holder 121 except for the open end portion of the switch holder 121 may be disposed in an area of the rear of the front panel 12, i.e., in the second accommodation space or the component room 30.

The moving member 123 may be installed in the switch holder 121 in a way that moves in the front-rear direction. The moving member 123 may interlock with the movement of the door 16 and move rearward.

For example, the moving member 123 may be installed in the switch holder 121 in a way that at least a portion of the moving member 123 protrudes toward the fronts of the switch holder 121 and the front panel 12. At this time, the moving member 123 may protrude toward the front of the front panel 12 to the extent that the moving member 123 contacts the door 16 as the door 16 closes the first accommodation space. The moving member 123 may be pushed by the door 16 having closed the first accommodation space and moved rearward by a predetermined distance.

The transfer member 130 may connect to the moving member 123. The transfer member 130 may connect with the moving member 123 and move in the front-rear direction together with the moving member 123. For example, the transfer member 123 may be fitted and coupled to the moving member 123, and interlock with the movement of the moving member 123 and move in the front-rear direction.

The input switch 120 may further include a first elastic member 125. The first elastic member 125 may be provided to elastically support the moving member 123 at the rear of the moving member 123.

The moving member 123 may be kept protruding to the front of the front panel 12 toward the door 16 by the first elastic member 125. Additionally, the moving member 123 may be kept contacting the door 16 closely by elastic force provided by the first elastic member 125.

Additionally, the moving member 123 pushed and moved rearward by the door 16 may return to the front, using elastic force provided by the first elastic member 125.

For example, the first elastic member 125 may be provided in the form of a coil spring. Additionally, the input switch 120 may further include a support cover 127. The support cover 127 is disposed at the rear of the switch holder 121 and support the first elastic member 125 at the rear.

The end portion of the front of the first elastic member 125 in the form of a coil spring may be coupled to the moving member 123. The end portion of the rear of the first elastic member 125 may be supported by the support cover 127. The input switch 120 may further include a coupling member 129. The coupling member 129 may be provided to couple the support cover 127 to the switch holder 121.

In the embodiment, the switch holder 121 is formed into a lying cylinder, both sides of which are open in the front-rear direction, and the support cover 127 covers the open end portion of the rear of the switch holder 121, for example. The coupling member 129 may couple the support cover 127 to the switch holder 121 such that the support cover 127 does not separate from the switch holder 121.

For example, the coupling member 129 may be provided as a metallic member that is coupled to the lateral surface of the switch holder 121 in the state of encircling the rear surface of the support cover 127 and the lateral surface of the switch holder 121.

In the embodiment, the input switch 120 may be disposed in a position appropriate enough to receive vibrations caused by a knock input to the door 16. That is, the input switch 120 may be disposed in a position of the main body 10, closest to the door 16 onto which a knock input is applied, while being installed in the main body 10.

When the input switch 120 is adjacent to the door 16, noise is much less likely to be mixed as vibrations caused by a knock input applied to the door 16 are transferred to the input switch 120 than when a large number of components are fitted between the door 16 and the input switch 120.

That is, since the input switch 120 is adjacent to the door 16 as described, vibrations caused by a knock input applied to the door 16 may only be transferred to the input switch 120 at a high level of purity. Then accuracy in the sensor 110's sensing of a knock may improve.

[Structure of Support Assembly]

Figure 15:
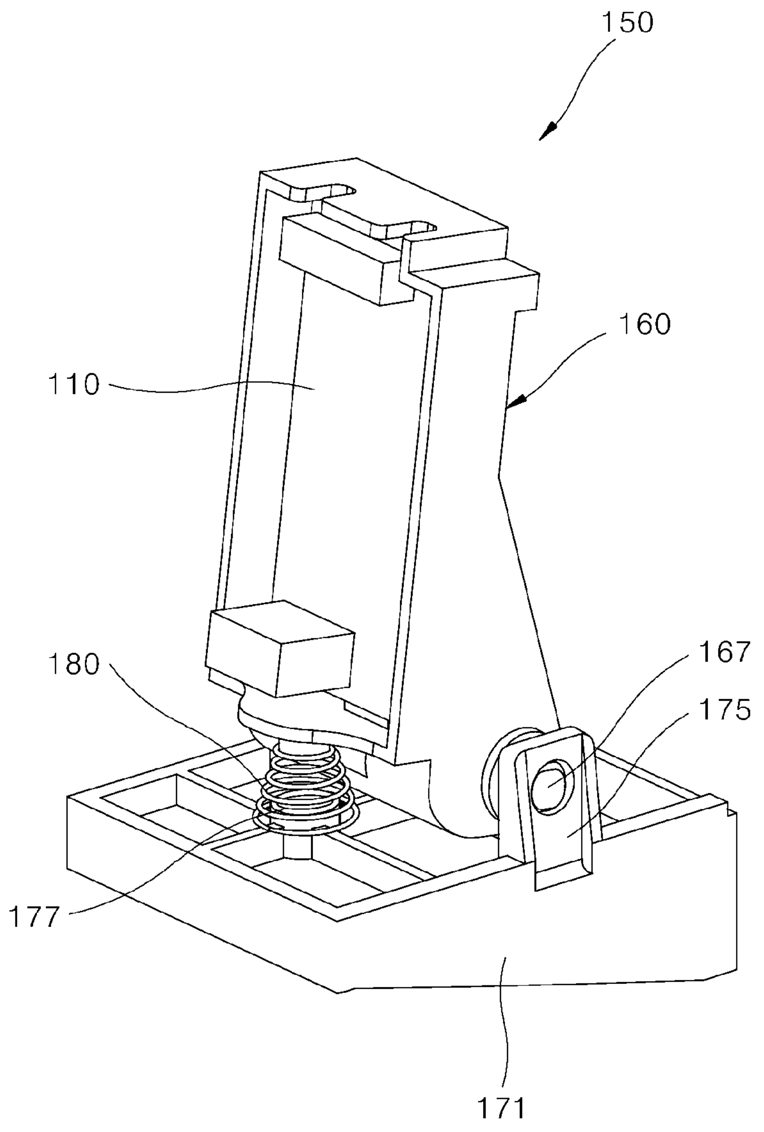
FIG. 15 is a perspective view showing a support assembly of one embodiment.
Figure 16:
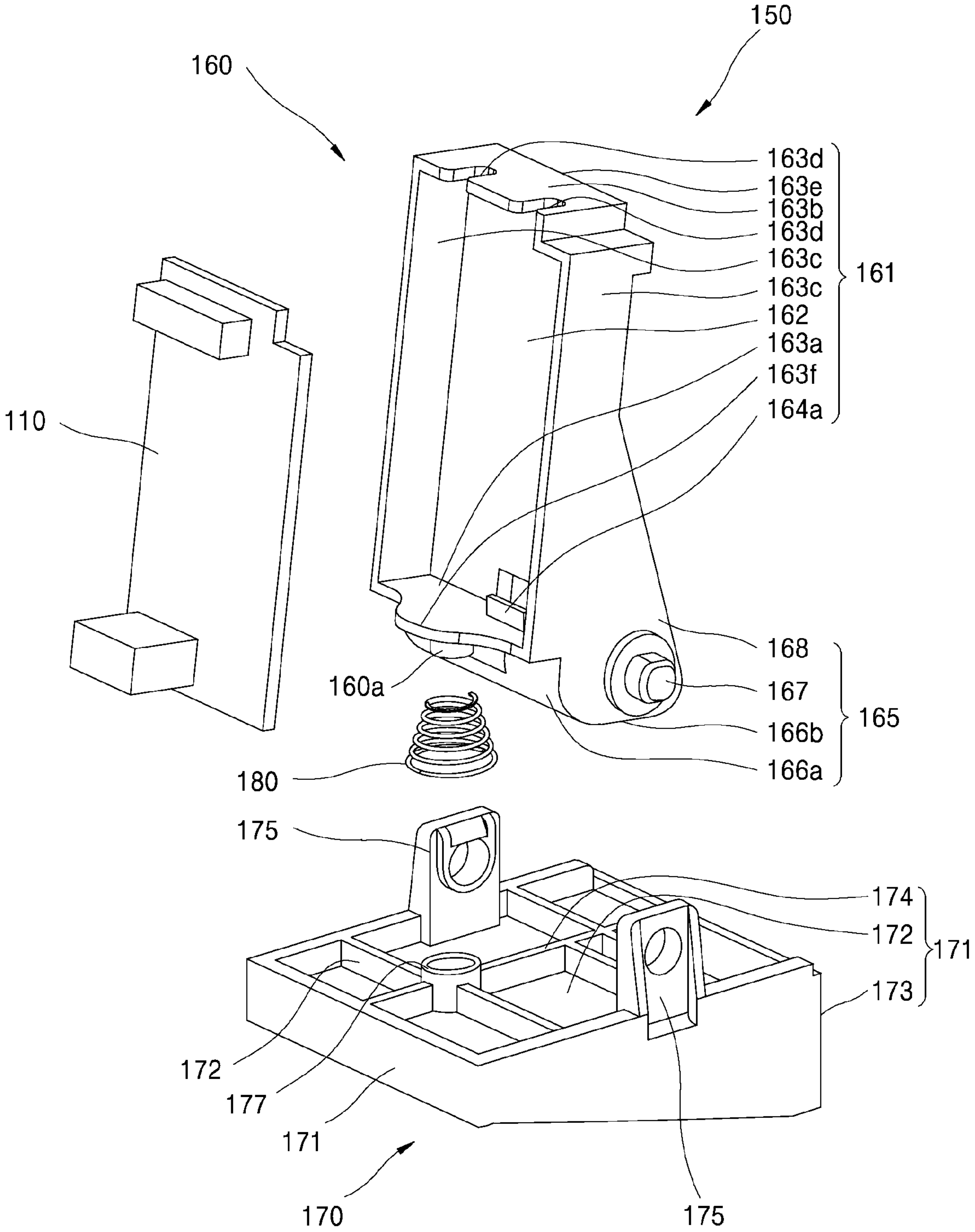
FIG. 16 is an exploded perspective view separately showing components of the support assembly of FIG. 15.
Figure 17:
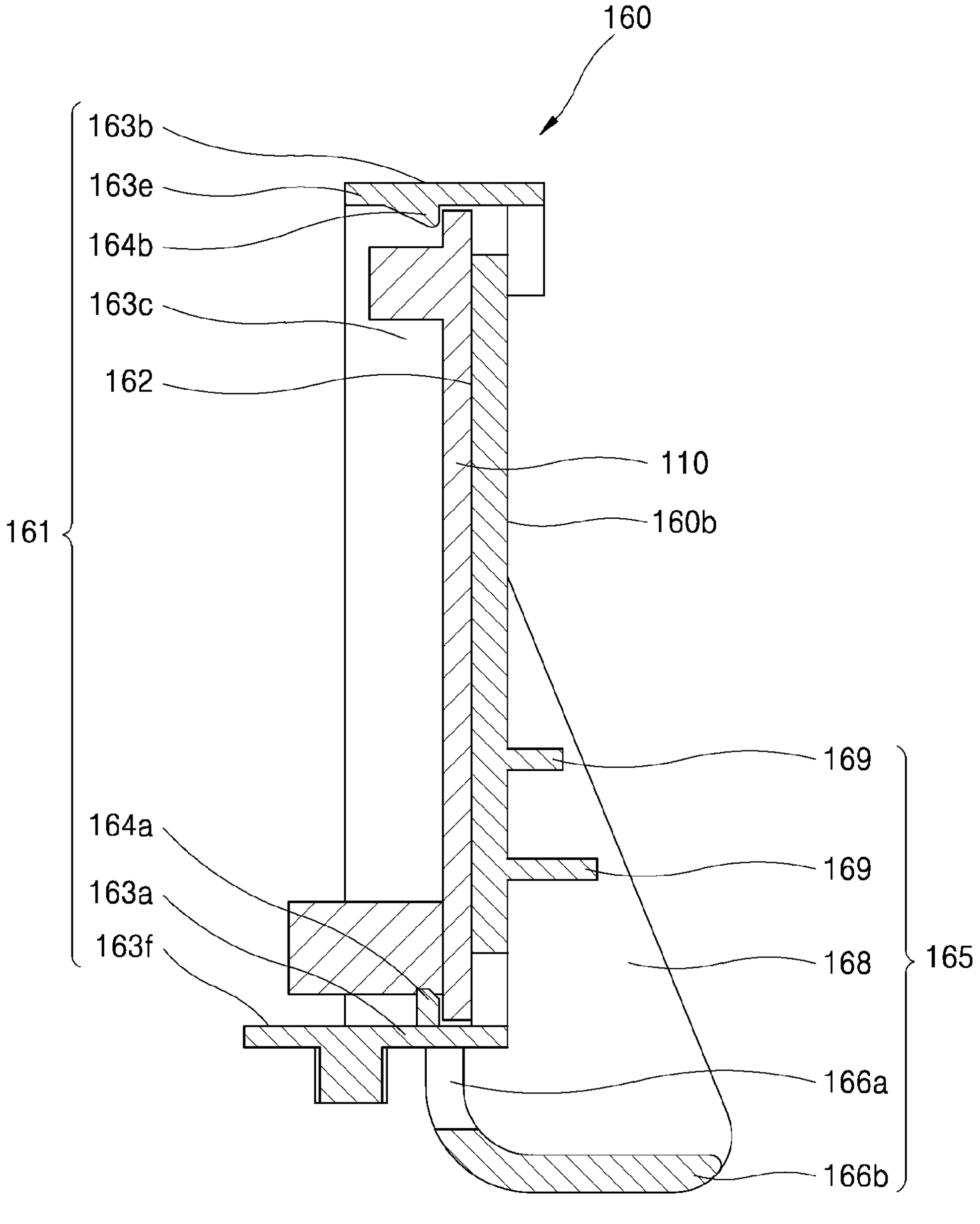
FIG. 17 is a lateral cross-sectional view showing the inner structure of a supporter of FIG. 15.
Figure 18:
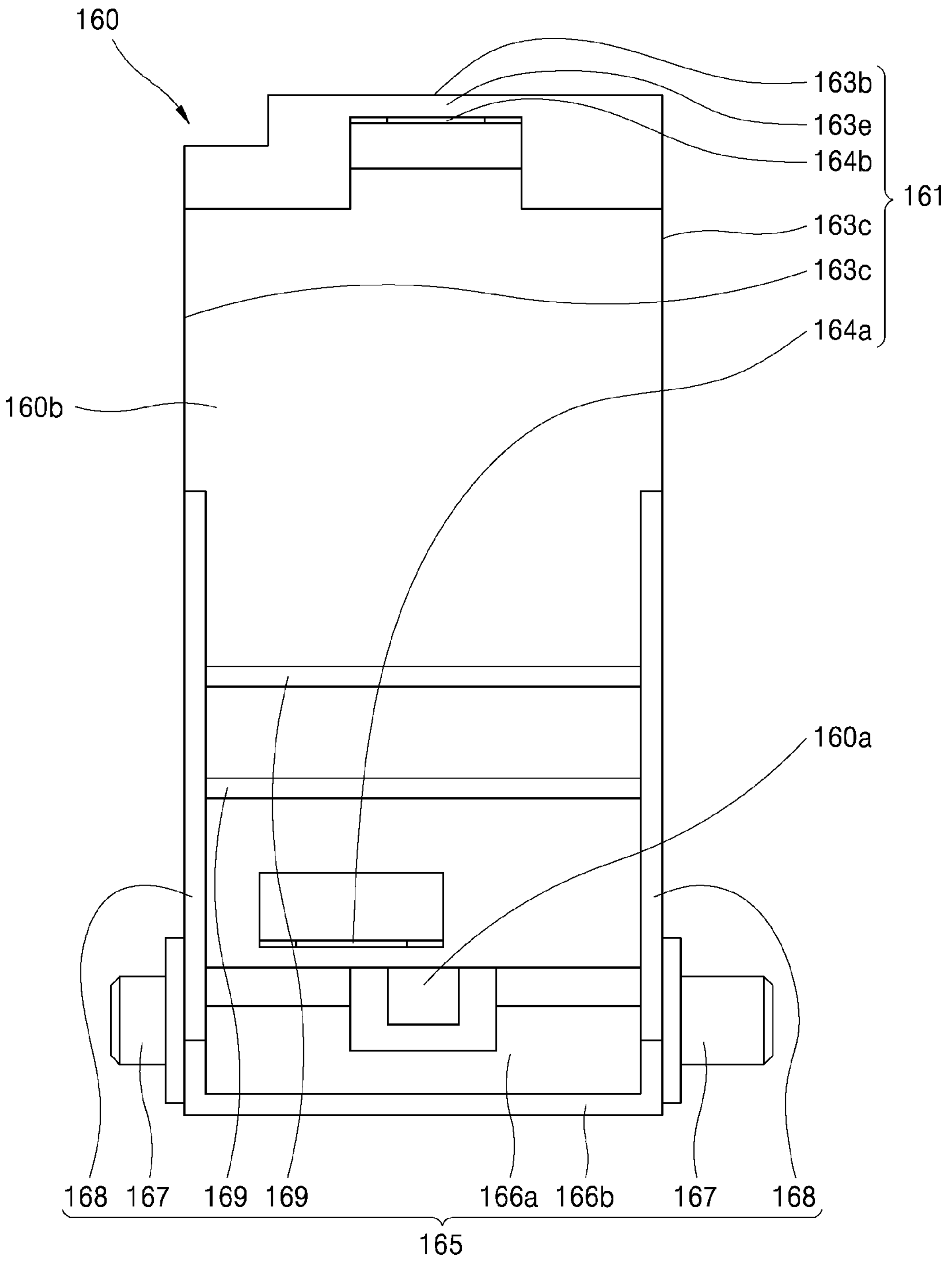
FIG. 18 is a front view showing the front surface of the supporter of FIG. 15.
Figure 19:
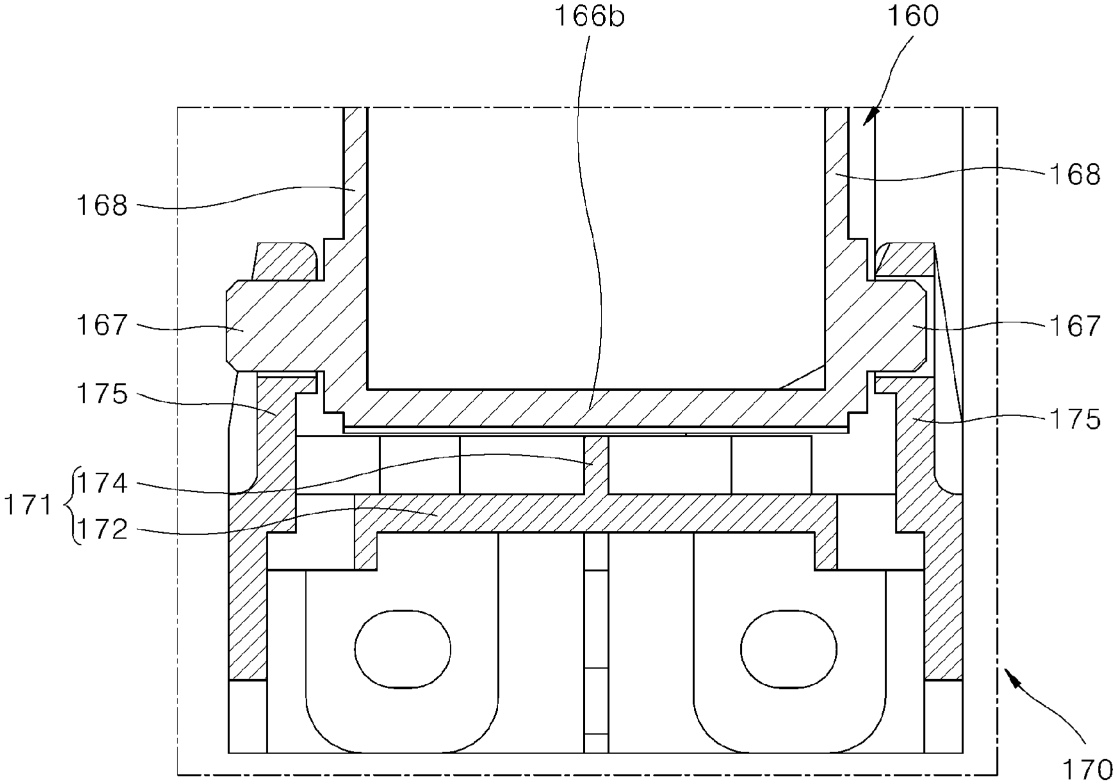
FIG. 19 is a front cross-sectional view showing the coupling structure between a supporter and a supporter holder of FIG. 15.
Figure 20:
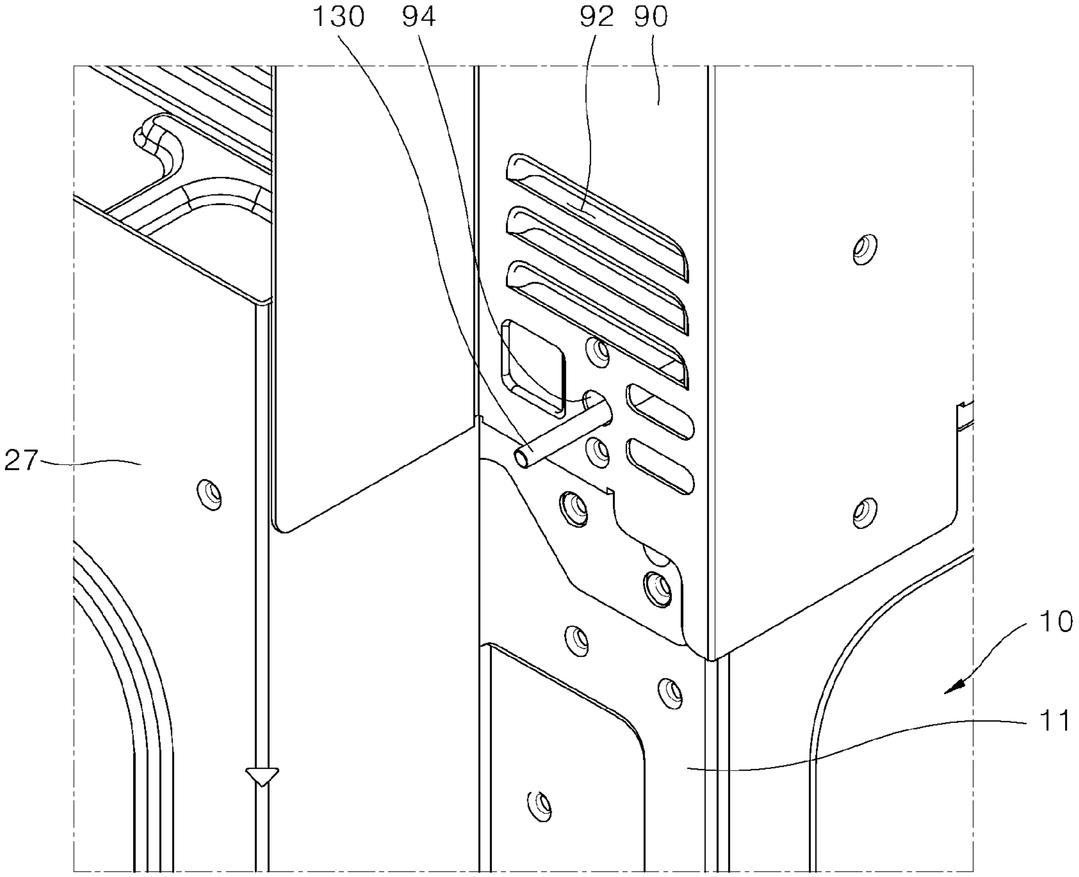
FIG. 20 is an enlarged view showing a portion behind a cavity before the support assembly of one embodiment is installed.
Figure 21:
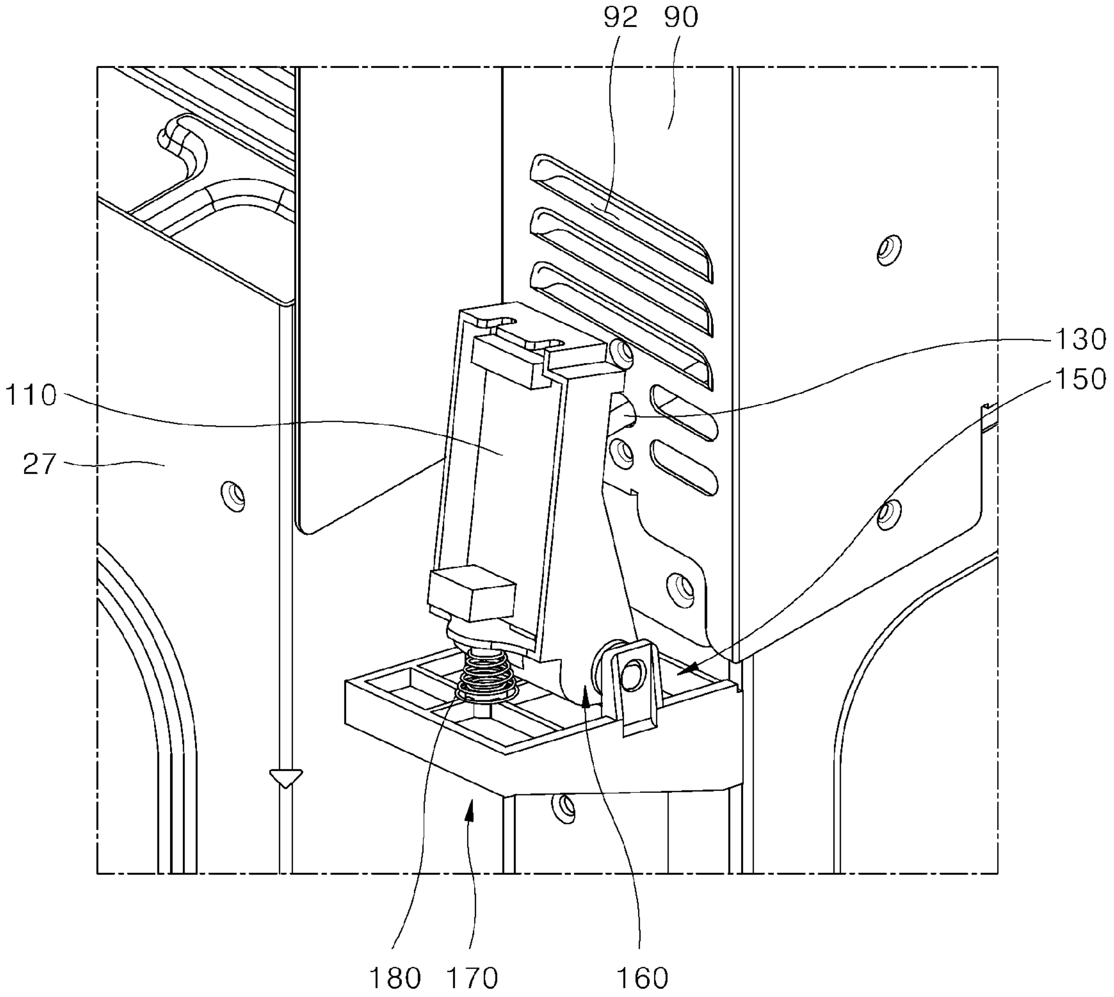
FIG. 21 is a view showing a support assembly disposed behind the cavity of FIG. 20.
Figure 22:
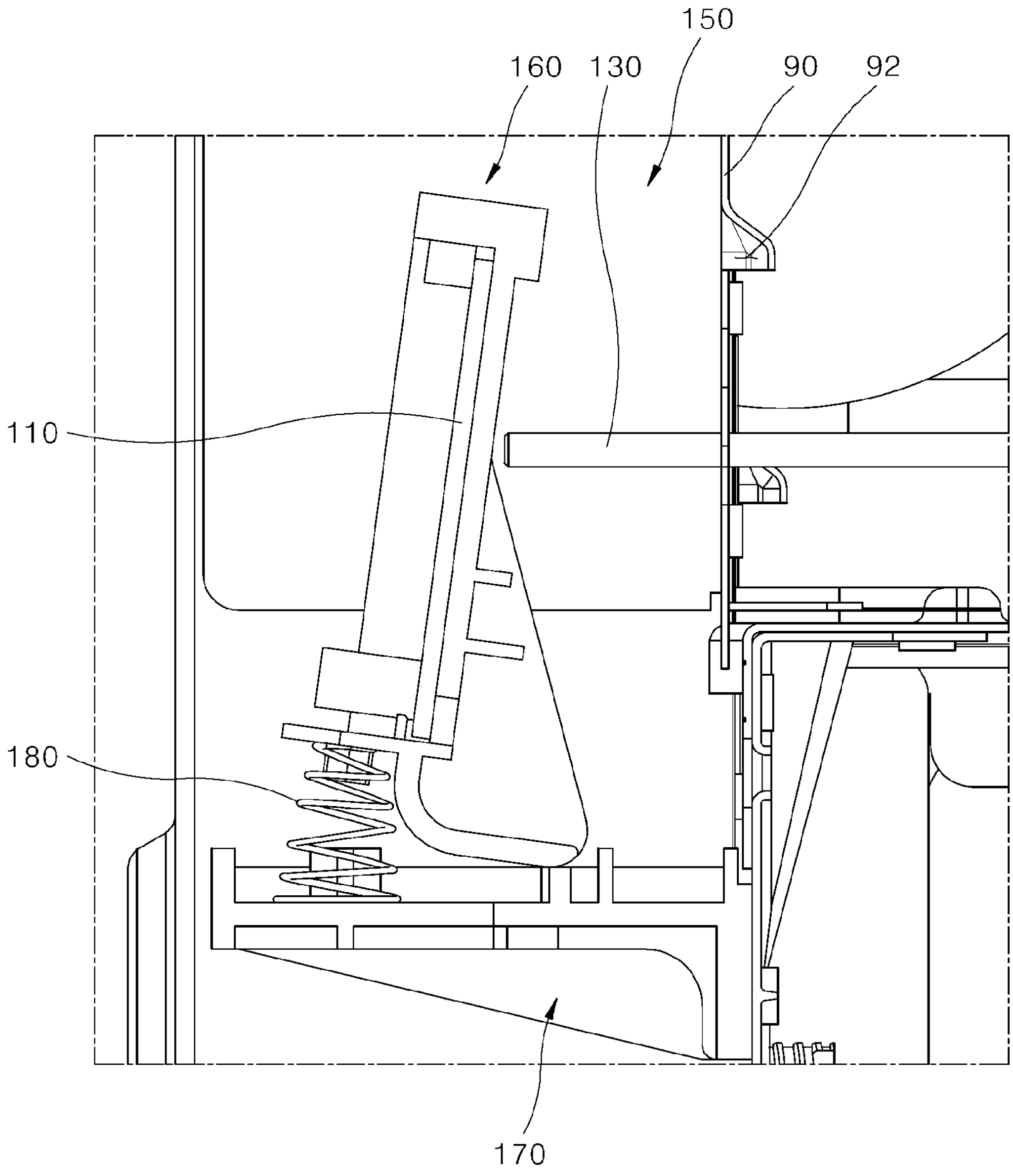
FIG. 22 is a lateral cross-sectional view showing the structure of the support assembly in FIG. 21.
Figure 23:
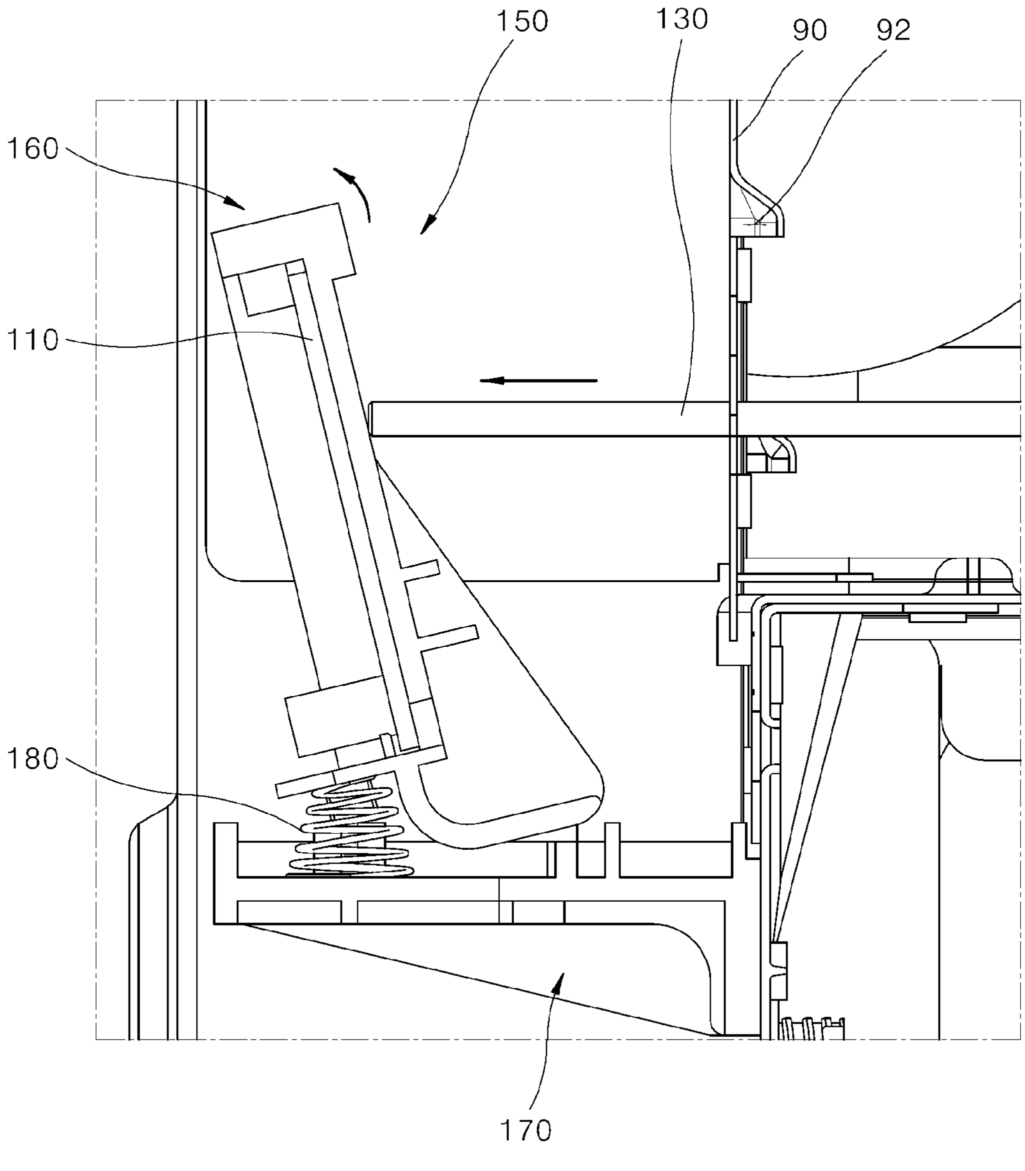
FIG. 23 is a lateral cross-sectional view showing the posture of the supporter of FIG. 22 is changed by a transfer member.

FIG. 15 is a perspective view showing a support assembly of one embodiment, FIG. 16 is an exploded perspective view separately showing components of the support assembly of FIG. 15, and FIG. 17 is a lateral cross-sectional view showing the inner structure of a supporter of FIG. 15. FIG. 18 is a front view showing the front surface of the supporter of FIG. 15, and FIG. 19 is a front cross-sectional view showing the coupling structure between a supporter and a supporter holder of FIG. 15. FIG. 20 is an enlarged view showing a portion behind a cavity before the support assembly of one embodiment is installed, and FIG. 21 is a view showing a support assembly disposed behind the cavity of FIG. 20. Additionally, FIG. 22 is a lateral cross-sectional view showing the structure of the support assembly in FIG. 21, and FIG. 23 is a lateral cross-sectional view showing the posture of the supporter of FIG. 22 is changed by a transfer member.

Referring to FIGS. 15 and 16, the support assembly 150 may be disposed at the rear of the main body 10 and support the sensor 110, and include a supporter 160 and a supporter holder 170.

The supporter 160 may be provided to support the sensor 110. The posture of the supporter 160 may be changed by vibrations transferred by the transfer member 130.

The front-to-rear position of the sensor 110 may interlock with the change in the posture of the supporter 160 and may change. In the embodiment, as illustrated in FIGS. 17 to 23, the supporter 160 includes a sensor support part 161 and a rotation support part 165, for example.

The sensor support part 161 corresponds to an area of the supporter 160, which supports the sensor 110. The sensor support part 161 may include a rear support surface 162.

The rear support surface is a surface that supports the PCB substrate, between the PCB substrate on which the sensor 110 is mounted and the transfer member 130. The rear support surface 162 may have a flat surface shape corresponding to the flat surface shape of the PCB substrate. For example, the PCB substrate and the rear support surface 162 may be respectively formed into a rectangular flat surface. The PCB substrate on which the sensor 110 is mounted may be coupled to the sensor support part 161 while closely contacting the rear support surface 162.

The sensor support part 161 may further include side walls 163*a*, 163*b*, 163*c*. The side walls 163*a*, 163*b*, 163*c* may extend from the edges of the rear support surface 162 in a direction orthogonal to the rear support surface 162.

The side wall 163*a*, 163*b*, 163*c* may be disposed at each of the edges of the rear support surface 162. The side walls 163*a*, 163*b*, 163*c* may surround the rear support surface 162 outside the rear support surface 162, e.g., from the outside in the up-down direction and the left-right direction.

The PCB substrate on which the sensor 110 is mounted may be accommodated in a space surrounded by the rear support surface 162 and the side walls 163*a*, 163*b*, 163*c*, and coupled to the sensor support part 161.

For example, the rear support surface 162 may be formed into a rectangular flat surface, and a coupling body of the rear support surface 162 and the side walls 163*a*, 163*b*, 163*c* may have a space therein and be formed into a cuboid, the front of which is open.

The sensor support part 161 may further include a fastening projection 164*a*, 164*b*. The fastening projection 164*a*, 164*b* may protrude from the side wall. The PCB substrate may be detachably coupled to the sensor support part 161 while being fitted between the rear support surface 162 and the fastening projection 164*a*, 164*b*.

The fastening projection 164*a*, 164*b* may include a first fastening projection 164*a* and a second fastening projection 164*b*. The first fastening projection 164*a* may be disposed at the lower end of the sensor support part 161, and the second fastening projection 164*b* may be disposed at the upper end of the sensor support part.

The first fastening projection 164*a* may protrude from a lower side wall 163*a* disposed at the lower end of the sensor support part 161, among the side walls 163*a*, 163*b*, 163*c*. The first fastening projection 164*a* may be spaced a predetermined distance apart from the rear support surface 162 and protrude from the lower side wall 163*a*.

For example, the first fastening projection 164*a* may be spaced from the rear support surface 162 by a distance corresponding to the thickness of the PCB substrate. The PCB substrate and the supporter 160 may be coupled to each other while a portion of the lower side of the PCB substrate is fitted between the rear support surface 162 and the first fastening projection 164*a*.

Additionally, the first fastening projection 164*a* may be provided to be elastically deformed in the direction of the thickness of the PCB substrate. The first fastening projection 164*a* may be spaced from the rear support surface 162 by a distance slightly less than the thickness of the PCB substrate. The first fastening projection 164*a* may fix the lower side of the PCB substrate to the supporter 160 while pressing the PCB substrate against the rear support surface 162.

The second fastening projection 164*b* may protrude in the form of a hook from an upper side wall 163*b* disposed at the upper end of the sensor support part 161, among the side walls 163*a*, 163*b*, 163*c*. The second fastening projection 164*b* may be spaced a predetermined distance apart from the rear support surface 162, and protrude from the upper side wall 163*b*.

The upper side wall 163*b* may have a slit part 163*d*. The slit part 163*d* may be formed in a way that a portion of the upper side wall 163*b* is slit in a parallel direction with the direction in which the upper side wall 163*b* protrudes. For example, the slit part 163*d* may be formed in a way that a portion of the upper side wall 163*b* is cut rearward from the end portion of the front of the upper side wall 163*b*.

The upper side wall 163*b* may have a pair of slit parts 163*d*. The pair of slit parts 163*d* may be spaced in the left-right direction with the second fastening projection 164*d* therebetween. Accordingly, a portion of the upper side wall 163*b*, disposed between the pair of slit parts 163*d*, may be deformed in the up-down direction.

In the embodiment, a portion (hereafter, a "cut surface") of the upper side wall 163*b*, disposed between the pair of slit parts 163*d*, may be elastically deformed, while being deformed in the up-down direction.

For example, the cut surface may be elastically deformed in the up-down direction with respect to the end portion of the front of the cut surface, adjacent to the rear support surface 162. The cut surface may serve as a body that supports the second fastening projection 164*b*. That is, the cut surface may be provided in the form of a hook body that forms a hook member together with the second fastening projection 164*b* formed into a hook projection.

In the embodiment, the PCB substrate and the supporter 160 may be coupled while a portion of the upper side of the PCB substrate is fitted between the rear support surface 162 and the second fastening projection 164*b*. At this time, the PCB substrate may pass through the area where the second fastening projection 164*b* may be disposed while pushing the second fastening projection 164*b* upward, and fitted between the rear support surface 162 and the second fastening projection 164*b*.

Additionally, the PCB substrate fitted between the rear support surface 162 and the second fastening projection 164*b* may separate from the supporter in the state in which the second fastening projection 164*b* bends upward.

The PCB substrate, as described above, may be detachably coupled to the supporter 160 by the second fastening projection 164*b* and the hook member including the cut surface. To this end, the hook member may be elastically deformed by the pair of slit parts 163*d* formed on the upper side wall 163*b*.

Further, the sensor support part 161 may further include a contact surface 160*b*. The contact surface 160*b* may be provided as a surface that contacts the transfer member 130 on the opposite side of the rear support surface 162.

For example, the contact surface 160*b* may be the back surface of the rear support surface 162 provided on the same member as the contact surface 160*b*. That is, on a single member constituting the supporter 160, the contact surface 160*b* may form the front surface of the member, and the rear support surface 162 may form the rear surface of the member.

The supporter 160 may further include an extension part 163*e*. The extension part 163*e* may extend forward from the upper side wall 163*b*. Because of the extension part 163*e*, the upper side wall 163*b* may protrude further rearward than the rear support surface 162. In other words, the upper side wall 163*b* may protrude further rearward than the other side walls 163*a*, 163*c* by the length of the extension part 163*e*.

As a result, the front-to-rear length of the upper side wall 163*b* may increase, and the front-to-rear length of the cut surface formed on the upper side wall 163*b* may also increase. An increase in the front-to-rear length of the cut surface results in an increase in the length of the hook body in the hook member.

As the length of the hook body in the hook member increases, the width of the up-to-down deformation of the hook member, specifically, the width of the up-to-down movement of the second fastening projection 164*b* may further increase. Accordingly, since the hook member, and the second fastening projection 164*b* forming the hook member may bend further upward, the PCB substrate may be attached and detached more readily and reliably.

The rotation support part 165 may be provided to couple the sensor support part 161 to the supporter holder 170 in a way that sensor support part 161 rotates in the front-rear direction. The rotation support part 165 may include a support leg 166*a*, 166*b* and a pair of rotation projections 167.

The support leg 166*a*, 166*b* may protrude from the rear support surface 162 rearward and downward. In the embodiment, the support leg 166*a*, 166*b* includes a first leg part 166*a* and a second leg part 166*b*, for example. The first leg part 166*a* may protrude from the lower end of the rear support surface 162 downward. The second leg part 166*b* may extend from the lower end of the first leg part 166*a* rearward.

In the embodiment, the first leg part 166*a* and the second leg part 166*b* connect to each other in the form of "L", for example. In the state in which the sensor support part 161 and the supporter holder 170 are spaced from each other in the up-down direction, the first leg part 166*a* may extend from the sensor support part 161 toward the supporter holder 170. The second leg part 166*b* may form a flat surface approximately parallel with the upper surface of the supporter holder 170, specifically, the flat surface formed by a support surface 172 that is described hereafter.

The pair of rotation projections 167 may protrude respectively from one side and the other side of the support leg 166*a*, 166*b* in the left-right direction. Each of the rotation projections 167 may be rotatably coupled to the supporter holder 170. For example, each of the rotation projections 167 may be rotatably coupled to the supporter holder 170, specifically, a rotation projection supporter 175 that is described hereafter, in the front-rear direction.

The rotation support part 165 may further include a side support surface 168. The side support surface 168 may be formed into a flat surface that connects the rear support surface 162 or the contact surface 160*b* with the support leg 166*a*, 166*b* at both sides of the rear support surface 162 or the contact surface 160*b* in the left-right direction.

For example, the side support surface 168 may formed into a flat surface that connects to the rear support surface 162 or the contact surface 160*b* and the first leg part 166*a* and the second leg part 166*b*. The upper end of the side support surface 168 may connect to the rear support surface 162 or the contact surface 160*b*.

Additionally, the rear end of the side support surface 168 may connect to the rear support surface 162 or the contact surface 160*b* and the first leg part 166*a*. The lower end of the side support surface 168 may connect to the second leg part 166*b*. The side support surface 168, as described above, may connect to the rear support surface 162 or the contact surface 160*b* and the support leg 166*a*, 166*b*. When viewed from the side, the side support surface 168 may be formed into an approximate triangle.

The side support surface 168 may be disposed respectively at both sides of the supporter 160 in the left-right direction. That is, the supporter 160 may include a pair of side support surfaces 168. The side support surface 168, provided as described above, may improve the rigidity of the supporter 160.

Additionally, the side support surface 168 may help to suppress the occurrence of the bend of the support leg 166*a*, 166*b*, in particular, the second leg part 166*b*.

As the supporter 160 rotates further forward or rearward in the state in which the second leg part 166*b* contacts the supporter holder 170, external force that bends the second leg part 166*b* upward may be applied to the second leg part 166*b*. The side support surface 168 may support the second leg part 166*b* at both sides, to prevent the bend of the second leg part 166*b* caused by the external force.

Further, the side support surface 168 may limit a range of the left-to-right movement of the transfer member 130 such that the transfer member 130 contacting the contact surface 160*b* does not escape from the contact surface 160*b* in the left-right direction of the contact surface 160*b*.

The rotation support part 165 may further include a side rib 169. The side rib 169 may protrude from the contact surface 160*b* forward. The rotation support part 165 may include a plurality of side ribs 169. Each of the side ribs 169 may be formed in a way that extends transversely.

The side rib 169, provided as described above, is a protruding structure formed on the supporter 160 and helps to improve the strength of the supporter 160.

Additionally, the side rib 169 may be disposed under the area where the contact surface 160*b* and the transfer member 130 usually contact each other. The side rib 169 may support the transfer member 130 from below. The side rib 169 may prevent the transfer member 130 from being pushed excessively downward on the contact surface 160*b* in the process in which the transfer member 130 pushes the supporter 160 while contacting the contact surface 160*b*.

The supporter holder 170, as illustrated in FIGS. 15 to 16 and 20 to 23, may be installed in the main body 10 and support the supporter 160 in a way that the supporter 160 can change its posture. The supporter holder 170 may support the supporter 160 in a way that the supporter 160 rotates around the left-to-right axis. In the embodiment, the supporter holder 170 includes a holder main body 171 and a rotation projection supporter 175, for example.

The holder main body 171 may form the skeleton of the supporter 160 and be coupled to the rear of the cavity 11. The holder main body 171 may be disposed under the supporter 160.

A support surface 172 may be formed at the upper side of the holder main body 171, which faces the supporter 160. For example, the support surface 172 may be formed into a rectangular flat surface disposed transversely.

The holder main body 171 may be provided with a coupling surface 173. The coupling surface 173 is a portion that is used to couple the supporter holder 160 to the rear surface of the cavity 11. The coupling surface 173 may be formed into a flat surface disposed on the front surface of the holder main body 171.

Additionally, the holder main body 171 may be provided with an upper rib 174. The upper rib 174 may protrude upward from the support surface 172. For example, the upper rib 174 may be formed in a grid pattern on the upper surface of the holder main body 171.

As a protruding structure formed on the holder main body 171, the upper rib 174 may help to improve the strength of the supporter holder 170. Additionally, the upper rib 174 may support a second elastic member 180 described hereafter, and limit the range of movement of the supporter 160 by contacting the support leg 166*a*,166*b* to control a range of the swivel of the supporter 160.

The support assembly 150 may further include the second elastic member 180. The second elastic member 180 may be provided to elastically support the supporter 160 under the supporter 160.

The second elastic member 180 may keep the supporter 160 biased forward toward the door 16. At this time, the upper end of the supporter 160 may be kept biased further forward than the lower end of the supporter 160 adjacent to the rotation center of the supporter 160.

For example, the second elastic member 180 may be provided in the form of a coil spring. The upper end of the second elastic member 180 in the form of a coil spring may be coupled to the supporter 160, and the lower end of the second elastic member 180 may be coupled to the supporter holder 170.

Additionally, the second elastic member 180 in the form of a coil spring may be spaced rearward from the rotation center of the supporter 160. That is, the second elastic member 180 may be spaced rearward from the rotation projection 167. For example, the second elastic member 180 may be biased toward the end portion of the rear of the supporter 160.

The supporter holder 170 may further include a first spring support part 177, and the sensor support part 161 may further include a second spring support part 160*a*.

The first spring support part 177 may protrude from the holder main body 171 upward and support the lower end of the second elastic member 180. In the embodiment, the first spring support part 177 may be disposed at the point where the upper rib 174 are crossed in the "+" shape, and at the point, formed into a cylinder that protrudes upward.

The lower end of the second elastic member 180 in the form of a coil spring may be mounted on the upper rib 174 around the first spring support part 177 while surrounding the first spring support part 177 from the outside in the diameter direction. The lower end of the second elastic member 180 may actually be supported by the upper rib 174. The first spring support part 177 may be fitted into the second elastic member 180.

The second spring support part 160*a* may protrude downward from the lower side wall 163*a* disposed at the lower end of the sensor support part 161 and support the upper end of the second elastic member 180. In the embodiment, the sensor support part 161 may further include a protruding surface part 163. The protruding surface part 163*f* may protrude rearward from the lower side wall 163*a*.

In the embodiment, the protruding surface part 163*f* protrudes in the semi-circle shape corresponding to the posterior half shape of the second elastic member 180 or the posterior half shape of the second spring support part 160*a*, while protruding rearward from the lower side wall 163*a*, for example.

The second sprig support part 160*a* may be formed into a cylinder that extends downward from the lower side wall 163*a*. At least a portion of the second spring support part 160*a* may protrude from the protruding surface part 163*f* and be disposed further rearward then the lower side wall 163*a*. That is, the second spring support part 160*a* may be biased rearward from the supporter 160 as much as the protruding surface part 163*f* protrudes.

The upper end of the second elastic member 180 in the form of a coil spring may closely contact the protruding surface part 163*f* and the lower side wall 163*a* while surrounding the second spring support part 160*a* from the outside in the diameter direction. The upper end of the second elastic member 180 may actually be supported by the protruding surface part 163*f* and the lower side wall 163*a*. The second spring support part 160*a* may be fitted into the second elastic member 180.

As the supporter 160 rotates rearward, the second elastic member 180 may be pressed while the upper end of the second elastic member 180 moves downward. The second elastic member 180 pressed downward may provide elastic force for rotating the supporter 160 forward again as the supporter 160 is released from external force of rotating the supporter 160 rearward.

That is, the supporter 160 may rotate in the front-rear direction, and the second elastic member 180 may be pressed or extend in the up-down direction.

The elastic force provided by the second elastic member 180 may allow the supporter 160 to contact the transfer member 130 closely.

The second elastic member 180 may also be formed into a circular truncated cone the diameter of which increases toward its lower portion, while being formed into a coil spring.

In the embodiment, basically, the supporter 160 rotates in the front-rear direction, and the second elastic member 180 is pressed or extend in the up-down direction. The second elastic member 180 coupled to the supporter 160 is affected by the supporter 160 that moves in the front-rear direction. Accordingly, the second elastic member 180 may be deformed in the front-rear direction that is the rotation direction of the supporter 160 as well as in the up-down direction that is the press/extension direction.

Considering the fact, the second elastic member 180 may be provided in the form of a coil spring having a circular truncated cone shape the diameter of which increases toward its lower portion. The second elastic member 180 formed into a circular truncated cone-shaped coil spring may suppress the problem that occurs when the upper lateral surface and the lower lateral surface of the second elastic member 180 are jammed and caught mutually while contacting each other in the process of repetitive rotation of the supporter 160, and the like.

The second elastic member 180, formed as describe above, has a bottom surface expanded further than that of an ordinary coil spring, thereby stably being coupled to the supporter 160 holder and reliably supporting the supporter 160.

Further, the support leg 166*a*, 166*b* may serve as a stopper that controls the range of the rotation of the supporter 160. For example, the second leg part 166*b* may be spaced from the upper end of the holder main body 171 by a first distance. Specifically, the second leg part 166*b* may be spaced from the upper rib 174 by the first distance.

The first distance is defined as a gap between the second leg part 166*b* and the upper rib 174 when the second leg part 166*b* and the upper rib 174 are disposed in parallel. When the second leg part 166*b* and the upper rib 174 are spaced by the first distance, the second leg part 166*b* does not contact the upper rib 174. However, when the supporter 160 rotates rearward by a first rotation angle or rotates forward by a second rotation angle, the rearward rotation or the forward rotation of the supporter 160 may be limited, while the second leg part 166*b* interferes with the holder main body 171, i.e., the upper rib 174.

The first rotation angle may be properly determined depending on a limited range of the rearward rotation of the supporter 160, and the second rotation angle may be properly determined depending on a limited range of the forward rotation of the supporter 160, which will be limited. Additionally, the first distance may be properly determined within the range where the rotation of the supporter 160 is limited by the first rotation angle and the second rotation angle.

In conclusion, the range of the rotation of the supporter 160 may be limited by the support leg 166*a*, 166*b* and the upper rib 174. That is, as the supporter 160 rotates rearward by the first rotation angle, the rearward rotation of the supporter 160 may be limited while the second leg part 166*b* interferes with the upper rib 174, and as the supporter 160 rotates forward by the second rotation angle, the forward rotation of the supporter 160 may be limited while the second leg part 166*b* interferes with the upper rib 174.

[Another Example of Support Assembly]

Figure 24:
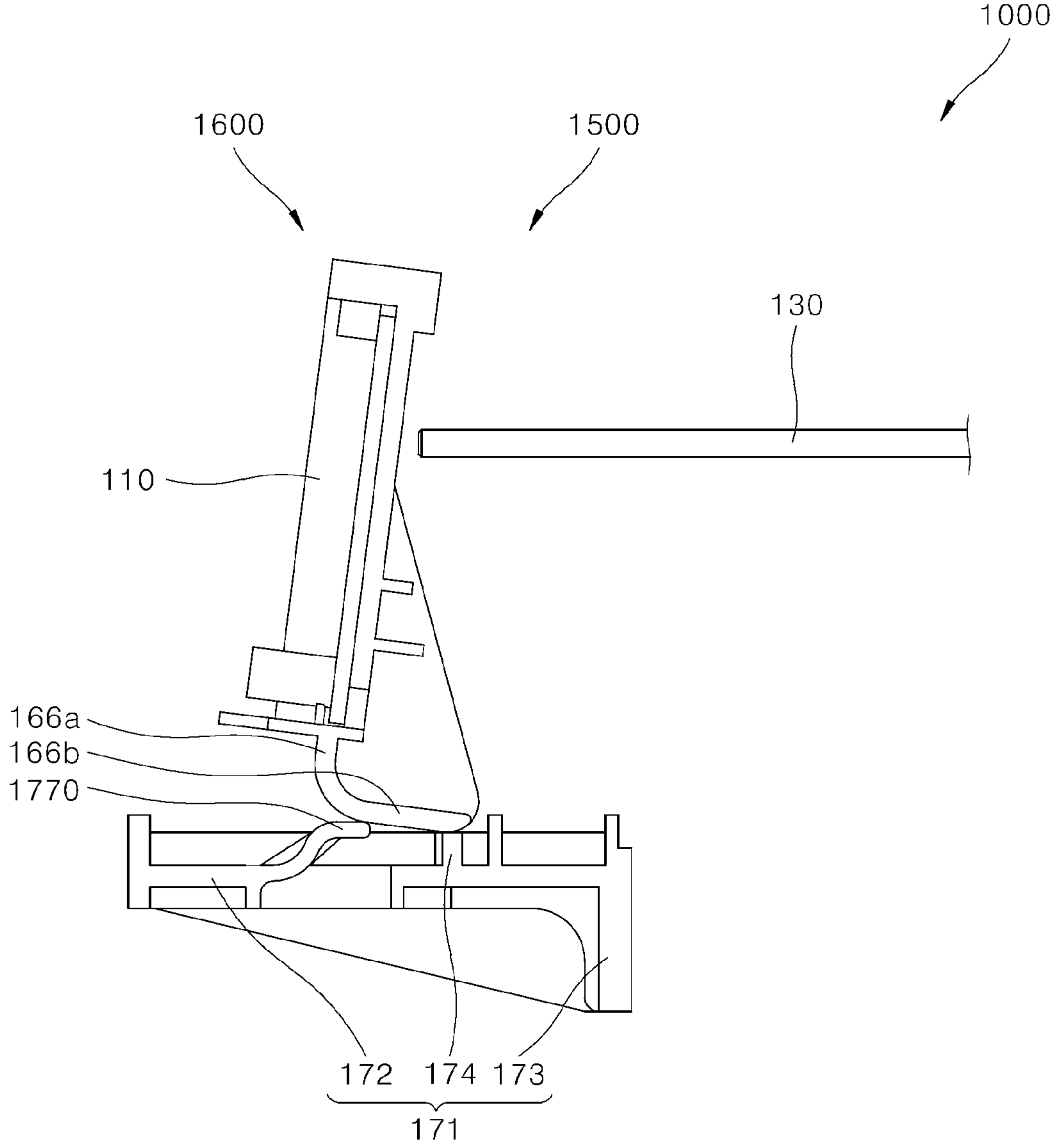
FIG. 24 is a lateral cross-sectional view showing another example of the support assembly in FIG. 15.
Figure 25:
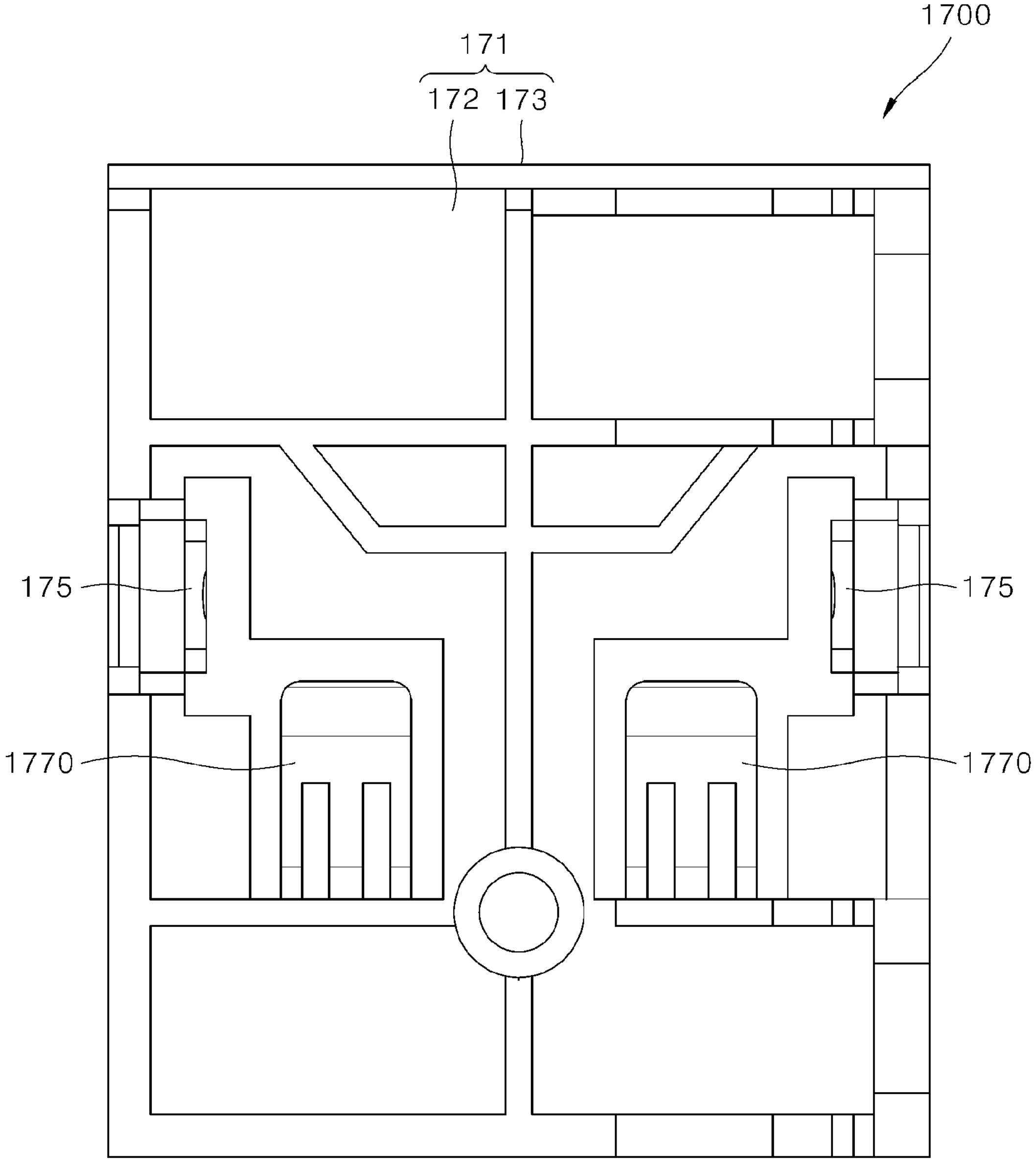
FIG. 25 is a bottom view showing the bottom surface of the supporter holder in FIG. 24.
Figure 26:
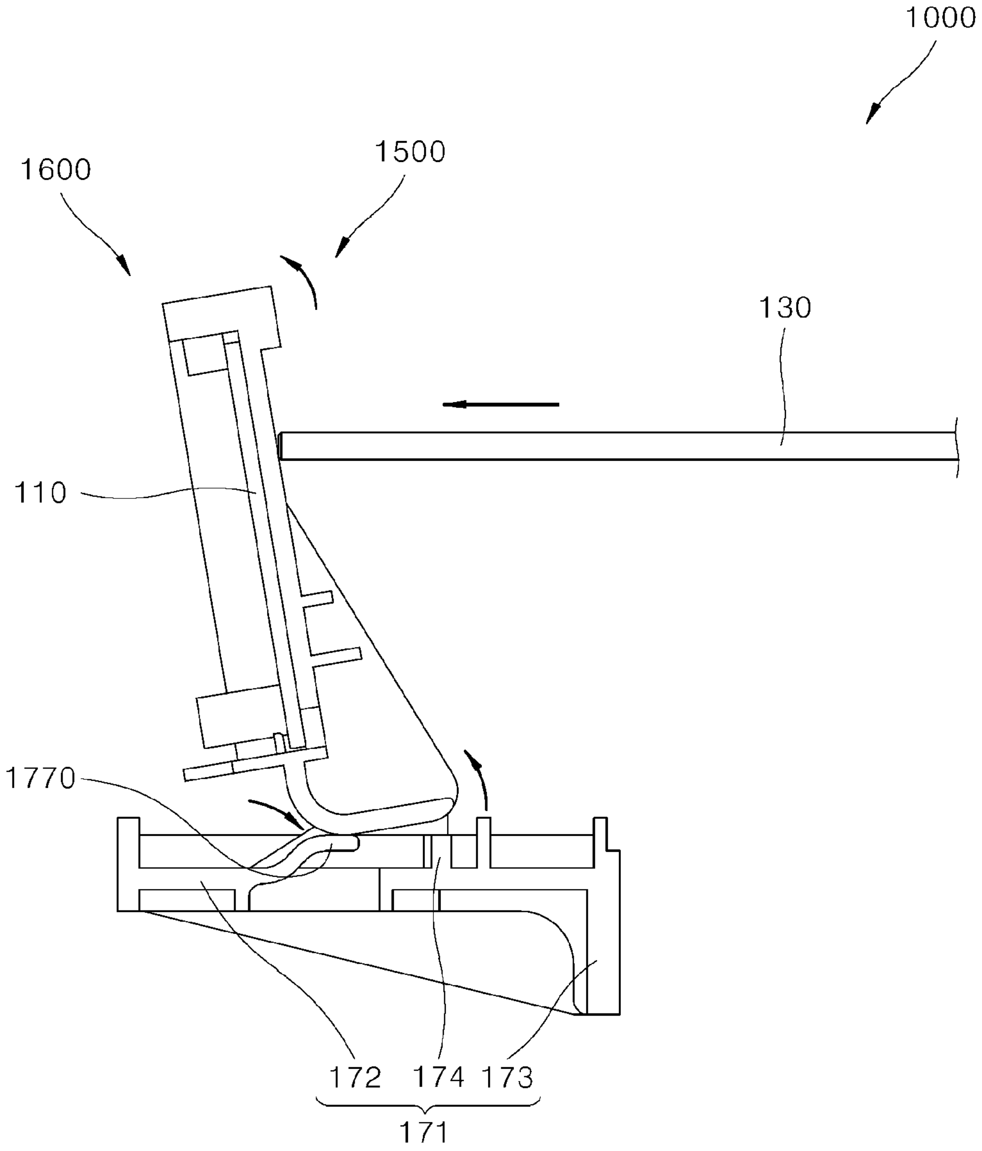
FIG. 26 is a lateral cross-sectional view showing the posture of the supporter in FIG. 24 changes.

FIG. 24 is a lateral cross-sectional view showing another example of the support assembly in FIG. 15, FIG. 25 is a bottom view showing the bottom surface of the supporter holder in FIG. 24, and FIG. 26 is a lateral cross-sectional view showing the posture of the supporter in FIG. 24 changes.

FIGS. 24 to 26 show another example of the support assembly 1500. Referring to FIGS. 24 and 25, a second elastic member 1770 may be spaced a predetermined distance apart from the rotation center of a supporter 1600, and extend from the holder main body 171 to protrude to the upper portion of the holder main body 171. The second elastic member 1770 may be formed into a projection that is elastically deformed in the up-down direction with respect to the portion where the second elastic member 1770 and the holder main body 171 connect.

For example, the second elastic member 180 may be formed in a way that a portion of the support surface 172 of the holder main body 171 is cut and that a portion of the cut support surface 172 is deformed to protrude to the upper portion of the holder main body 171.

At this time, one of the front or the rear of the second elastic member 1770 may connect to the support surface 172, and the remaining portions may be formed in a way that separates from the support surface 172. For example, the front and both the lateral surfaces the second elastic member 1770 separate from the support surface 172, and a portion of the rear may only be formed into a projection connecting to the support surface 172. The second elastic member 180 may be formed to bend upward from the portion where the second elastic member 1770 connects to the support surface 172, such that at least a portion of the second elastic member 1770 protrudes to the upper portion of the holder main body 171.

The second elastic member 1770 may be formed into a projection that is elastically deformed in the up-down direction with respect to the portion where the second elastic member 1770 connects to the holder main body 171, i.e., the support surface 172. The second elastic member 180 may elastically support the supporter 1600 in the position where the second elastic member 180 is spaced rearward from the rotation center of the supporter 1600.

Since the second elastic member 1770 is provided as described above, a coil spring does not need to be additionally installed to support the supporter 1600. Accordingly, structures for installing a coil spring such as a first spring support part 175 (see FIG. 16) and a second spring support part 160*a* (see FIG. 16) do not need to be added to the supporter 1600 and the supporter holder 1700.

Thus, an additional process for installing a coil spring and an additional structure for installing a coil spring are not required, thereby reducing manufacturing procedures, ensuring ease of manufacturing and spending less time and costs in manufacturing products.

[Operation and Effect of First Sensing Module]

Figure 27:
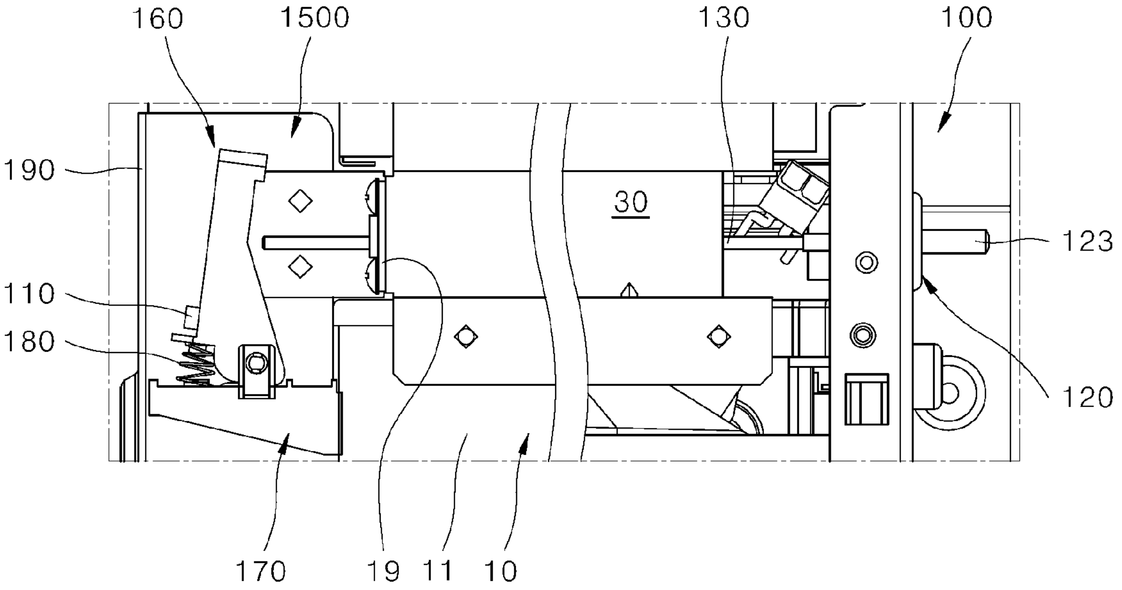
FIG. 27 is a view showing a first sensing module with a door open.
Figure 28:
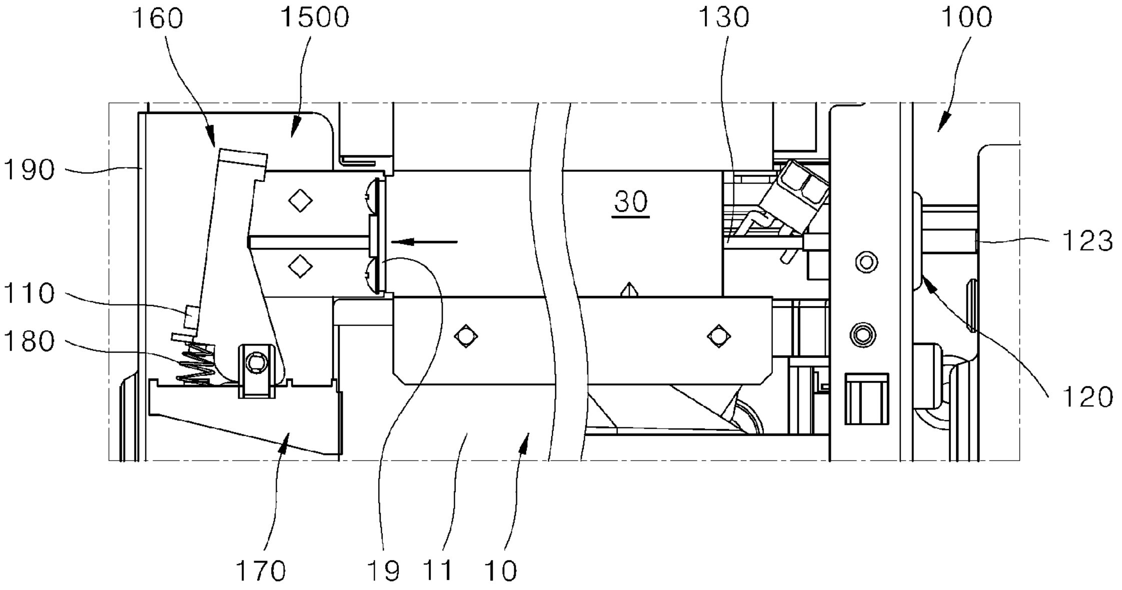
FIG. 28 is a view showing a transfer member starts to contact a supporter while a door is closed.
Figure 29:
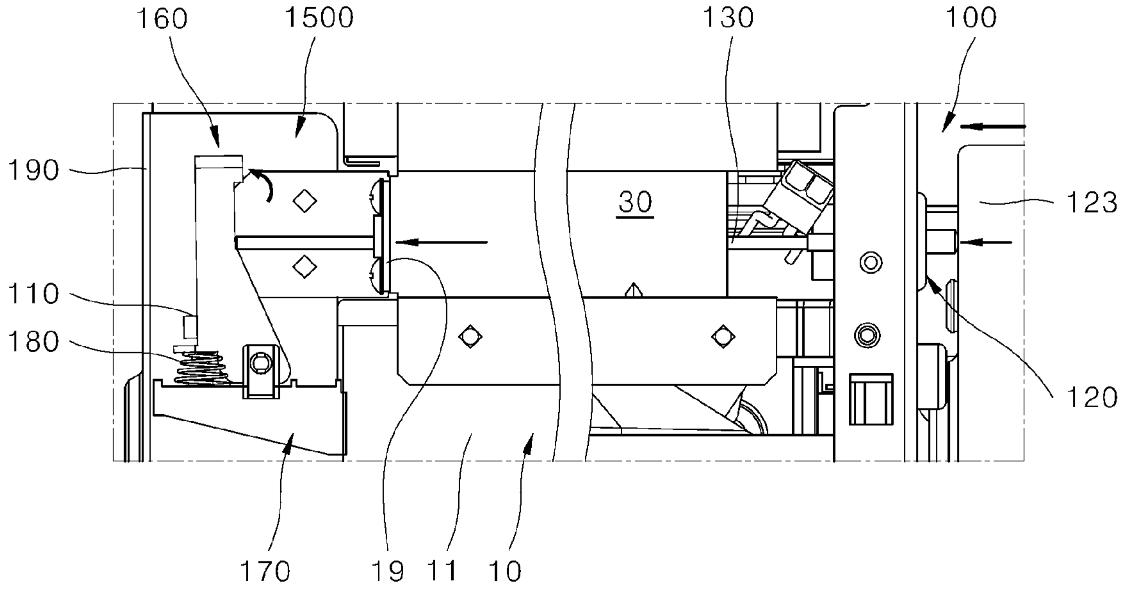
FIG. 29 is a view showing a first sensing module with a door closed.
Figure 30:
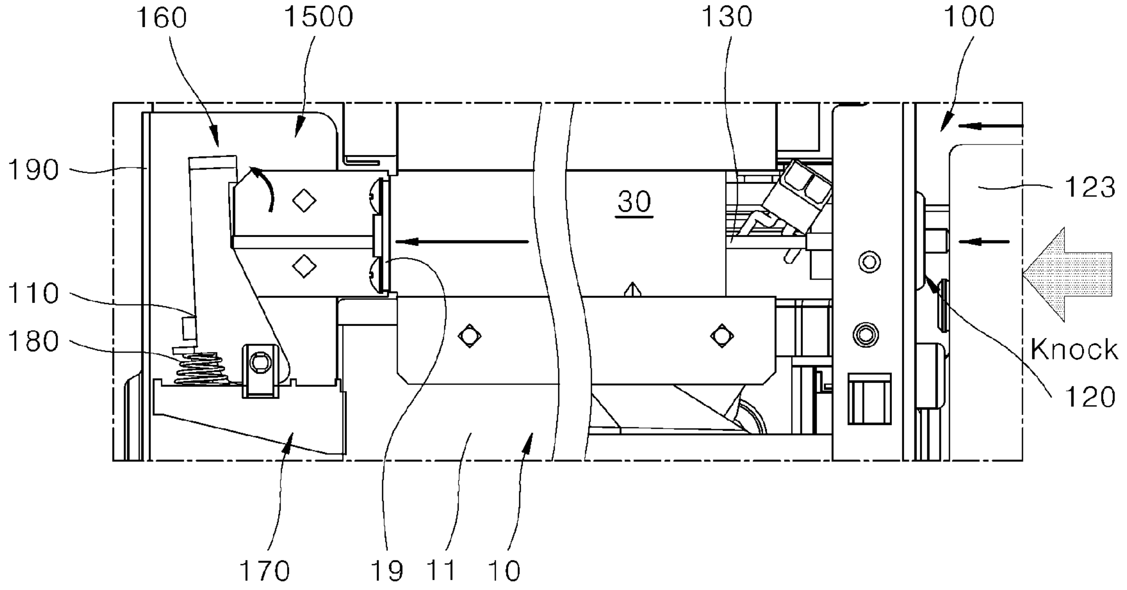
FIG. 30 is a view showing a first sensing module at a time of a knock operation.

FIG. 27 is a view showing a first sensing module with a door open, and FIG. 28 is a view showing a transfer member starts to contact a supporter while a door is closed. Additionally, FIG. 29 is a view showing a first sensing module with a door closed, and FIG. 30 is a view showing a first sensing module at a time of a knock operation.

Hereafter, the operation and effect of the first sensing module provided in the appliance of one embodiment are described.

Referring to FIG. 27, the first sensing module 100 may include a sensor 110, an input switch 120, a transfer member 130 and a support assembly 150.

The support assembly 150 may be disposed at the rear of the cavity 11, and the sensor 110 may be supported by the support assembly 150 and disposed at the rear of the cavity 11.

The input switch 120 may be disposed at the front of the cavity 11. The input switch 120 may be disposed on the front panel 12, and at least a portion of the input switch 120 may be disposed between the front panel 12 and the door 16 and exposed toward the door 16.

The transfer member 130 may connect between the input switch 120 and the sensor 110. The transfer member 130 may connect to the input switch 120, at the front of the cavity 11, and connect to the supporter 160, at the front of the cavity 11.

The transfer member 130 may connect to the moving member 123 and move in the front-rear direction along the moving member 123. The transfer member 130 may connect to the supporter 160 while contacting the front surface of the supporter 160. The supporter 160 may be pushed by the moving member 123 having moved rearward and rotate rearward, and rotate forward by using elastic force provided by the second elastic member 180.

As illustrated in FIGS. 28 and 29, the moving member 123 may move rearward while being slightly pressed by the door 16 as the door 16 closes a cooking space 15 (see FIG. 2). The transfer member 130 may move rearward together with the moving member 123. The transfer member 130 may move to a position where the transfer member 130 contacts the supporter 160. The elastic force provided by the second elastic member 180 may keep the supporter 160 contacting the transfer member 130 reliably.

In the embodiment, the transfer member 130 is formed into a rod, for example. Preferably, the transfer member 130 may be formed into a rod having a rigid body that does not bring about vibration damping.

Since the transfer member 130 is formed into a rod having a rigid body, the supporter 160 may be kept contacting the rod 130 reliably.

As a knock is input to the door 16 as illustrated in FIG. 30, the moving member 123 is further pressed by the door 16 that is moved rearward by vibrations input to the door 16 and moves rearward further. The transfer member 130 moves rearward further along the moving member 123 and presses the supporter 160 rearward.

Accordingly, the supporter 160 may rotate rearward, and the sensor 110 may move rearward together with the supporter 160 rotating rearward. In this process, the sensor 110 may sense vibrations transferred to the supporter 160.

The sensor 110 may determine whether the vibrations sensed by the sensor 110 are caused by a knock input by the user. When determining that the vibrations are caused by a knock input by the user, the sensor 110, as illustrated in FIGS. 2 to 4, may output information on the determination in the form of a first signal and transmit the first signal to the controller 200.

In an example, the transfer member 130 may be formed into a rod. Preferably, the transfer member 130 may be formed into a rod having a rigid body that does not bring about vibration damping.

Since the transfer member 130 is formed into a rod having a rigid body as described above, the supporter 160 and the rod 130 may be kept contacting each other reliably.

In another example, the input switch 120 may be provided in the form of a switch that controls electric currents, and the transfer member 130 may be provided in the form of an electric wire that electrically connects between the input switch 120 and the sensor 110.

For example, as the door 16 is closed, the input switch 120 is turned on, and the input switch 120 and the sensor 110 electrically connect to each other. As the door 16 is opened, the input switch 120 is turned off, and the input switch 120 and the sensor 110 electrically disconnect from each other.

As the input switch 120 and the sensor 110 electrically connect, the sensor 110 may be supplied with electricity and operate. As the input switch 120 electrically disconnects from the sensor 110, the supply of electricity to the sensor 110 may be disconnected and the sensor 110 may not operate.

Accordingly, depending on the opening and closing of the door 16, the operation of the sensor 110 may be determined electrically.

At this time, vibrations input to the input switch 120 may be transferred to the sensor 110 immediately by the transfer member 130 in the form of an electric wire.

In another example, vibrations input by a knock may be transferred through the door 16 to which a knock is input, the main body 10 in which the second sensing module 100 is installed, and a medium constituting the components between the door 16 and the main body 10.

In yet another embodiment, a transfer member 130 in the form of an electric wire, and a transfer member 130 in the form of a rod may be provided together. At this time, the operation of the sensor 110 may be determined by the transfer member 130 in the form of an electric wire, and vibrations may be transferred to the supporter 160 by the transfer member 130 in the form of a rod.

Having received a first signal transmitted by the sensor 110, the controller 200 may control the operation of the lamp 70, based on the first signal.

The above-mentioned operation may be provided as a knock-on function. For example, as the user touches a knock-on button displayed on the input part 21 of the display part once, the knock-on function may be turned on, and as the user touches the knock-on button once again, the knock-on function may be turned off.

The knock-on function allows the lamp 70 to be turned on/off based on the user's knock motion. That is, in the state in which the knock-on function is on, the lamp 70 may be automatically on/off, based on the user's knock-on motion. In the state in which the knock-on function is off, the lamp 70 may not be automatically on/off even if the user's knock is input.

If the user wants to use the knock-on function, the user may turn on the knock-on function, and if not, the user may turn off the knock-on function.

Additionally, a lamp button displayed on the input part 21 of the display part is used to manually turn on/off the lamp 70 regardless of the user's knock motion. That is, as the user touches the lamp button displayed on the input part 21 of the display part once, the lamp 70 is turned on, and as the user touches the lamp button once again, the lamp 70 is turned off.

In the state in which the lamp 70 is on at the touch of the lamp button, the lamp 70 is not turned off even if a knock is input. That is, in the state in which the lamp 70 is on as the user touches the lamp button manually, the knock-on function is not performed.

This is because the user cannot perform intended work if the user turns off the lamp 70 because a knock is input, while the user manually turns on the lamp 70 and looks into the appliance. However, in the state in which the lamp 70 is off as the user touches the lamp button, the knock-on function can be performed such that the user's knock motion allows the lamp 70 to be turned on/off.

In another example, a self-cleaning button may be displayed on the input part 22 of the display part. Self-cleaning may involve automatically sterilizing and cleaning the cooking space 15 itself, and the like. During self-cleaning, the operation of the appliance may be set such that the knock-on function cannot be performed. At this time, despite the user's knock motion, the lamp 70 is not turned on/off.

During the self-cleaning operation, the temperature of the cooking space 15 remains very high. As the lamp 70 is turned on in this state, the lamp 70 is likely to be broken due to high-temperature heat. Considering the fact, in the embodiment, the operation of the appliance may be set such that knock-on function cannot be performed during the self-cleaning procedure.

The first sensing module in the embodiment may provide the function sensing the opening of the door 16.

As the door 16 is opened, the supporter 160 and the transfer member 130 do not contact each other, and accordingly, the sensor 110 may not sense a knock normally. That is, when the door 16 is opened, even if the user knocks at the door 16, vibrations caused by the knock may not be transferred to the supporter 160 through the transfer member 130, and the sensor 110 may not sense the knock normally.

Considering the fact, when the sensor 110 senses vibrations, it means that the closing of the door 16 is a prerequisite. That is, the closing of the door 16 may be sensed based on the vibrations sensed by the sensor 110.

Accordingly, the appliance in the embodiment may use the first sensing module 100 provided with the sensor 110 sensing vibrations, to sense whether the door 16 is closed mechanically, without an additional module.

Referring to FIGS. 2, 6 and 7, the first accommodation space is disposed at the inside of the main body 10 in the left-right direction and at the inside of the main body 10 in the up-down direction. The first sensing module 100 in the embodiment may be installed in the main body 10 in a way that the first sensing module 100 is disposed in the first accommodation space, i.e., outside the cooking space 15.

For example, the first sensing module 100 may be disposed at the edge of the right side of the main body 10 in a way that the first sensing module 100 is biased toward the upper side and the right side of the cooking space 15.

The input switch 120 disposed at the frontmost side of the first sensing module 100 may be disposed on the front panel 12. The input switch 120 may be disposed at the edge of the right side of the front panel 12.

In the first unit 1, the front panel 12 may include a suction opening 13, and an opening part 14. The suction opening 13 may form a passage that allows external air to pass through the front panel 12 and to flow into the second accommodation space, on the front panel 12. The suction opening 13 needs to be disposed in front of the fan 40 that creates the above-mentioned air flow.

In the embodiment, the fan 40 is biased toward one side of the main body 10 in the left-right direction thereof. Accordingly, the suction opening 13 may be disposed from the left-to-right center of the front panel 12 to one side of the font surface panel 12 in the left-right direction thereof.

Hereafter, one side in the left-right direction is referred to as a right side, and the other side in the left-right direction is referred to as a left side.

In the component room 30, the area of the right side of the components room 30 is filled mostly with electronic components such as a circuit board 31 and the like. Accordingly, the water tank 65 to be disposed in the component room 30 may be disposed in the area of the left side of the component room 30, which has relatively enough space.

Since electronic components are disposed in the area of the right side of the component room 30, the area of the right side of the component room 30 needs to cool. To this end, the suction opening 13 and the fan 40 need to be disposed at the right side of the main body 10.

Additionally, since the water tank 65 is disposed in the area of the left side of the component room 30, the opening part 14 may be biased toward the left side of the main body 10.

As a result, most of the area of the front panel 12 is occupied by the suction opening 13 and the opening part 14, and the input switch 120 of the first sensing module 100 and the second sensing module 80 may be disposed very close to the end portion of the right side of the front panel 12 and the end portion of the left side of the front panel 12, respectively.

For example, the second sensing module 80 may be disposed between the end portion of the left side of the front panel 12 and the opening part 14, and the input switch 120 of the first sensing module 100 may be disposed between the end portion of the right side of the front panel 12 and the suction opening 13.

In the second unit 2 under the first unit 1, most of the area of the front panel 12 may be occupied by the suction opening 13. Electronic components are not disposed in the second accommodation space of the second unit 2, but the up-to-down width of the second accommodation space of the first unit 1 is much less than that of the second accommodation space of the second unit 2.

As the up-to-down width of the second accommodation space of the second unit 2 increases in the state in which the entire up-to-down length of the appliance is determined, the height of the component room 30 and the height of the first accommodation space decreases.

Additionally, an increase in the height of the second accommodation space of the second unit 2 results in a decrease in the structural reliability of the appliance in which the first unit 1 and the second unit 2 are stacked.

Considering the fact, the up-to-down width of the second accommodation space of the second unit 2 is much less than that of the second accommodation space of the first unit 1, in the embodiment. To effectively prevent heat generated by the cavity 11 of the second unit 2 from being transferred to the first unit 1 under the conditions, the amount of external air flowing into the second accommodation space of the second unit 2 needs to increase. Accordingly, in the second unit 2, most of the area of the front panel 12 is occupied by the suction opening 13.

Like the input switch 120 and the second sensing module 80 of the first unit 1, the input switch 120 of the first sensing module 100 and the second sensing module 80 of the second unit 2 may be disposed very close to the end portion of the right side of the front panel 12 and the end portion of the left side of the front panel 12, respectively.

The transfer member 130 connecting to the input switch 120 may pass through the second accommodation space and connect to the sensor 110. In the first unit 1, the transfer member 130 may be disposed to pass through the component room 30. The transfer member 130 may be disposed outside the area where electronic components are disposed, in the left-right direction.

For example, the transfer member 130 may be disposed to pass through the second accommodation space, i.e., a space between the end portion of the right side of the cavity 11 and the area where electronic components are disposed in the component room 30, in the front-rear direction.

Specifically, the transfer member 103 may be disposed in a space between the end portion of the right side of the air guide 37 and the end portion of the right side of the cavity 11.

Additionally, the transfer member 130 may be disposed to pass through a space, surrounded by the upper surface of the cavity 11 and the lateral surface of the component supporter 35, in the front-rear direction.

Specifically, the transfer member 130 may be disposed in the space surrounded by the end portion of the right side of the air guide 37, the upper surface of the cavity 11, and the end portion of the right side of the cavity 11.

At this time, electronic components such as a circuit board 31 may be disposed in the component room 30 in a way that the electronic components are spaced a predetermined distance apart from the cavity 11 while being supported by the component supporter 35.

If the transfer member 130 escapes from the above-described area and passes through the area where electronic components are disposed, the above-described area becomes complex due to large number of components, and the transfer 130 and the electronic components are highly likely to interfere with one another. Since the transfer member 130 moves in the front-rear direction, when the transfer member 130 passes through the area where electronic components are disposed, the electronic components are highly likely to be broken by the transfer member 130.

Considering the fact, the transfer member 130 is disposed to avoid the area where electronic components are disposed and to pass through the space between the end portion of the right side of the cavity 11 and the area where electronic components are disposed, in the embodiment.

The component supporter 35 does not contact the left-to-right end portions of the cavity 11 completely, in the component room 30 since the component supporter 35 is ordinarily installed in the first area 11*a* that does not reach the left-to-right end portions of the cavity 11. Additionally, the component supporter 35 does not need to contact the left-to-right end portions of the cavity 11 completely, in the component room 30.

A predetermined space may be formed between the air guide 37 of the component supporter 35 installed as described above, and the end portion of the right side of the cavity 11. The space may be suitable as a passage that is used to connect between the input switch 120 and the sensor 110. Additionally, other electronic components are not installed in the space, and almost no electric wire is disposed in the space. Thus, the space is appropriate to dispose the transfer member 130.

Further, considering that the input switch 120 is disposed between the end portion of the right side of the front panel 12, disposed at the front of the second accommodation space, and the suction opening 13, i.e., the input switch 120 is biased toward the right side of the main body 10, the transfer member 130 connecting to the input switch 120 is also biased toward the right side of the main body 10, preferably.

In the embodiment, since the transfer member 130 is disposed as described above, the above-mentioned problems may be prevented, and vibrations transferred to the input switch 120 may be reliably transferred to the sensor 110 by the transfer member 130.

Additionally, the appliance may further include a heating part, i.e., an upper heater 19 disposed in the upper portion of the first accommodation space. The upper heater 19 may be disposed close to the upper surface of the cooking space 15 while being disposed in the first accommodation space, i.e., in the cooking space 15.

In the embodiment, the first sensing module 100 may be disposed between the end portion of one side of the cavity 11 in the left-right direction thereof and the heating part. Specifically, the first sensing module 100 may be disposed between the end portion of the right side of the cavity 11 and the upper heater 19.

The cavity 11 may include a heater accommodation part that is depressed upward from the upper surface of the cavity 11. When viewed from the inside of the cooking space 15, the heater accommodation part may be depressed upward from the upper surface of the cavity 11. The heater accommodation part may accommodate at least a portion of the heating part, i.e., the upper heater 19.

The outside of the cooking space 15, i.e., the heater accommodation part, when viewed from the second accommodation space, may be formed convexly from the upper surface of the cavity 11 toward the second accommodation space, i.e., in the upward direction. The transfer member 130 may be disposed outside the heater accommodation part in the left-right direction thereof, while being disposed in the second accommodation space.

The heater accommodation part corresponds to the first area 11*a* on the upper surface of the cavity 11. The upper heater 19 is disposed under the first area 11*a*, and electronic components are disposed on the first area 11*a*. At this time, electronic components such as a circuit board 31 may be disposed in the component room 30 in a way that the electronic components are spaced a predetermined distance from the cavity 11, while being supported by the component supporter 35.

The transfer member 130 may connect between the input switch 120 and the sensor 110 while passing through a space between the end portion of the right side of the cavity 11 and the heater accommodation part, in the front-rear direction, in the second accommodation space.

The first area 11*a* of the cavity 11 is an area that is convex upward in the second accommodation space. To be disposed in the first area 11*a* that is convex upward, the transfer member 130 needs to be disposed further upward by a significant height than when the transfer member 130 is disposed in the second area 11*b*.

If not, the cavity 11 and the transfer member 130 interfere with each other in the first area 11*a*, and the transfer member 130 may not move smoothly or vibrations may not be transferred properly through the transfer member 130.

Even if the transfer member 130 can be disposed on the first area 11*a* not to contact the first area 11*a*, at this time, it is difficult to dispose the input switch 120, since the input switch 120 needs to be disposed further upward as much as the transfer member 130 is disposed upward.

At this time, the alignment of the positions of the input switch 120 and the door 16 for a smooth contact between the input switch 120 and the door 16 may hardly be ensured. Additionally, for the installation of the input switch 120, the up-to-down length of the front panel 12 needs to increase.

Further, when the transfer member 130 is disposed in the first area 11*a*, the position of the input switch 120 and the position of the suction opening 13 overlap on the front panel 12. At this time, the entire surface area of the suction opening 13 is reduced by the input switch 120, and the cooling effect on the second accommodation space may deteriorate. Additionally, since the input switch 120 is disposed in the area where the suction opening 13 is disposed, the aesthetic qualities of the appliance may deteriorate.

In the first unit 1, the first area 11*a* is an area where electronic components are disposed. If the transfer member 130 is disposed in the first area 11*a*, the first area 11*a* becomes so complex due to large number of components, the transfer member 130 and the electronic components interfere with one another, and the electronic components are highly likely to be broken by the transfer member 130.

Considering the fact, the transfer member 130 in the embodiment is disposed outside the first area 11*a*, i.e., the heater accommodation part, without being disposed in the first area 11*a*. That is, the transfer member 130 in the embodiment may connect between the input switch 120 and the sensor 110 while passing through the space between the end portion of the right side of the cavity 11 and the heater accommodation part in the front-rear direction.

Since the transfer member 130 in the embodiment is disposed as described above, the above-mentioned problems may be prevented. Additionally, since the transfer member 130 is disposed as described above, the effect of heat generated by the heating part on the transfer member 130 may be effectively suppressed.

For example, when the transfer member 130 is disposed near the heating part, the transfer member 130 may be deformed due to heat generated by the heating part. At this time, the transfer member 130 may not connect between the input switch 120 and the sensor 110 properly, and accordingly, vibrations may not be properly transferred to the sensor 110.

In the embodiment, since the transfer member 130 is disposed in the space between the end portion of the right side of the cavity 11 and the heater accommodation part, the transfer member may be disposed far from the heating part. Thus, heat generated by the heating part hardly affects the transfer member 130, and vibrations transferred to the input switch 120 may be reliably transferred to the sensor 110 by the transfer member 130.

In the embodiment, the fan 40 is biased toward the rear in the second accommodation space, for example. The fan 40 may create the flow of air flowing to the front of the second accommodation space to the rear of the second accommodation space.

A duct cover 27 may be disposed at the rear of the cavity 11 and below the fan 40. The fan 40 may allow external air to flow into the second accommodation space through the suction opening 13. The fan 40 may suction the air having flown into the second accommodation space and discharge the air to a space in the duct cover 27.

The fan 40 may suction air through its front, and discharge the suctioned air to its lower portion. If the fan 40 is biased toward the front in the second accommodation space, i.e., disposed near the front panel 12, air may not be discharged properly through the duct cover 27.

If the fan 40 is disposed at the front side of the appliance, since the fan 40 is too close to the user, the noise of the fan 40 may cause inconvenience to the user.

Considering the fact, the fan 40 in the embodiment is biased toward the rear in the second accommodation space. The sensor 110 in the embodiment is also disposed near the fan 40, i.e., at the rear of the cavity 11.

In an example, at the rear of the cavity 11, at least a portion of the fan 40 and at least a portion of the sensor 110 may overlap in the up-down direction. In another example, at the rear of the cavity 11, at least a portion of the sensor 110 and the second accommodation space may overlap in the up-down direction.

Further, at the rear of the cavity 11, at least a portion of the sensor 110 and at least a portion of the second accommodation space may overlap in the front-rear direction.

Accordingly, at least a portion of the sensor 110 may contact air having flown into the second accommodation space by the fan 40. That is, at least a portion of the sensor 110 may contact cold air flowing by the fan 40.

As illustrated in FIGS. 2, 20 and 21, the sensor 110 may be disposed at the rear of the cavity 11. Specifically, the sensor 110 may be disposed at the edge of the upper portion of the right side of the cavity, at the rear of the cavity 11.

The above-mentioned position is farthest from the door 16 in the appliance, and adjacent to the fan 40. That is, in the embodiment, the position of the sensor 110 is far from the door at high temperature and the surrounding area of the door and allows of contact with cold air forced to flow by the fan 40.

For example, a cover bracket 90 may be disposed at the rear of the cavity 11. The cover bracket 90 may be disposed at the edge of the upper end of the rear of the cavity 11, while disposed on the rear surface of the cavity 11. The cover bracket 90 may be installed to protrude upward from the upper portion of the cavity 11. The component room side cover 26 may be coupled to the cover bracket 90 and fixed onto the cavity 11.

The cover bracket 90 is disposed in front of the sensor 110 and the support assembly 150, and blocks a space among the sensor 110, the support assembly 150 and the second accommodation space. Since the space among the sensor 110, the support assembly 150 and the second accommodation space is blocked by the cover bracket 90, foreign substances may be effectively prevented from flowing into the second accommodation space through the rear of the cavity 11, and large-sized foreign substances may be effectively prevented from approaching the sensor 110 and the support assembly 150.

Additionally, the cover bracket 90 may serve as a blocking wall that blocks heat generated by the heating part, in particular, the upper heater 19 from being transferred to the sensor 110.

The sensor 110 may be disposed behind the cover bracket 90. Specifically, the support assembly 150 may be disposed behind the cover bracket 90, and the sensor 110 may be supported by the support assembly 150 and disposed at the rear of the cavity 11.

The transfer member 130 may protrude to the rear of the cavity 11 while passing through the cover bracket 90, and to this end, a rod penetration hole 94 may be formed at the cover bracket 90 in a way that penetrates in the front-rear direction.

Additionally, the cover bracket 90 may have a discharge opening 92. The discharge opening 92 may be formed at the cover bracket 90 in a way that penetrates in the front-rear direction. The discharge opening 92 may form a passage that is needed to discharge cold air in the second accommodation space to the sensor 110, on the cover bracket 90.

In summary, the sensor in the embodiment, disposed at the rear of the cavity 11, may be disposed far from the door at high temperature and the surrounding area thereof. The sensor 110 is disposed at the rear of the first accommodation space and the rear of the second accommodation space, and the cover bracket 90 blocks between the sensor 110 and the second accommodation space.

The cover bracket 90 may effectively block heat generated by the heating part, in particular, the upper heater 19, from being transferred to the sensor 110.

Further, the sensor 110 may be disposed in the position where the sensor contacts cold air forced to flow by the fan 40. Cold air in the second accommodation space may cool the sensor 110 while passing through the cover bracket 90 through the discharge opening 92 and exchanging heat with the sensor 110.

That is, the sensor 110 may be disposed in the position where heat generated by the heating part is blocked and the sensor is cooled by cold air forced to flow by the fan 40, while being disposed far from the door at high temperature and the surrounding area thereof.

Since the sensor 110 is disposed in a position that is not affected by heat, as described above, the sensor 110 is much less likely to experience an operational error or damage caused by heat. Accordingly, the appliance in the embodiment may reduce the effect of heat on the sensor 110 and improve accuracy of the sensor 110's sensing.

The sensor 110 may receive vibrations of a knock through the input switch 120 disposed near a point where a knock is input, and the transfer member 130 connecting to the input switch 120. Accordingly, the appliance in the embodiment may effectively sense a knock input even in an appliance such as an oven and the like that makes it difficult to attach a sensor to a door due to high-temperature heat, reduce the effect of the heat on the sensor, and improve accuracy of the sensor's sensing.

The transfer member 130, which transfers vibrations transferred to the input switch 120 to the sensor 110, may connect between the input switch 120 and the sensor 110 while passing through the second accommodation space. The transfer member 130 may be disposed to avoid the area where electronic components are installed, the area where the upper surface of the cavity 11 is convex toward the upper portion of the second accommodation space to accommodate the heating part, and the area which is occupied by the component supporter supporting electronic components and being disposed on the upper surface of the cavity 11. For example, the transfer member 130 may be disposed in the area of the end portion side of the second accommodation space in the left-right direction thereof.

The transfer member 130 may be installed in the appliance without being affected by or affecting the electronic components in the appliance. Thus, the appliance in the embodiment can sense a knock input effectively without being affected by or affecting the electronic components installed in the appliance.

Additionally, the sensor cover 190 may be disposed outside the sensor 110 and the support assembly 150. The sensor cover 190 may be disposed outside and behind the sensor 110 and the support assembly 150 in the left-right direction thereof and installed at the cavity 11.

The sensor cover 190 may protect the sensor 110 and the support assembly 150 while surrounding the sensor 110 and the support assembly 150 from the outside. A discharge opening 191 may be formed at the sensor cover 190 in a way that penetrates, and cold air having flown to the sensor 110 from the second accommodation space may be discharged out of the appliance through the discharge opening 191.

[Control Method of Appliance]

Figure 31:
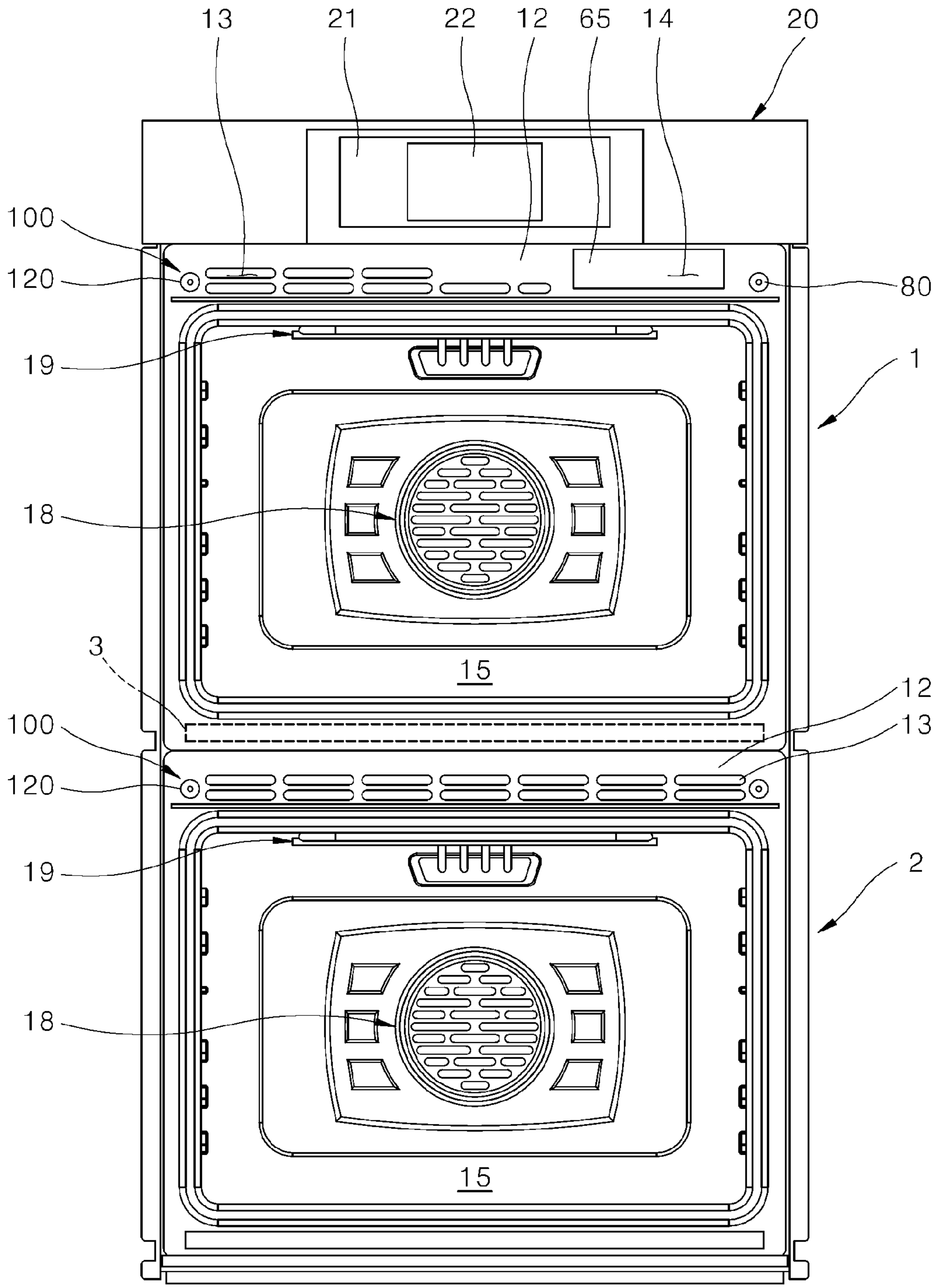
FIG. 31 is a front view showing the appliance of FIG. 2 without a door in another embodiment.
Figure 32:
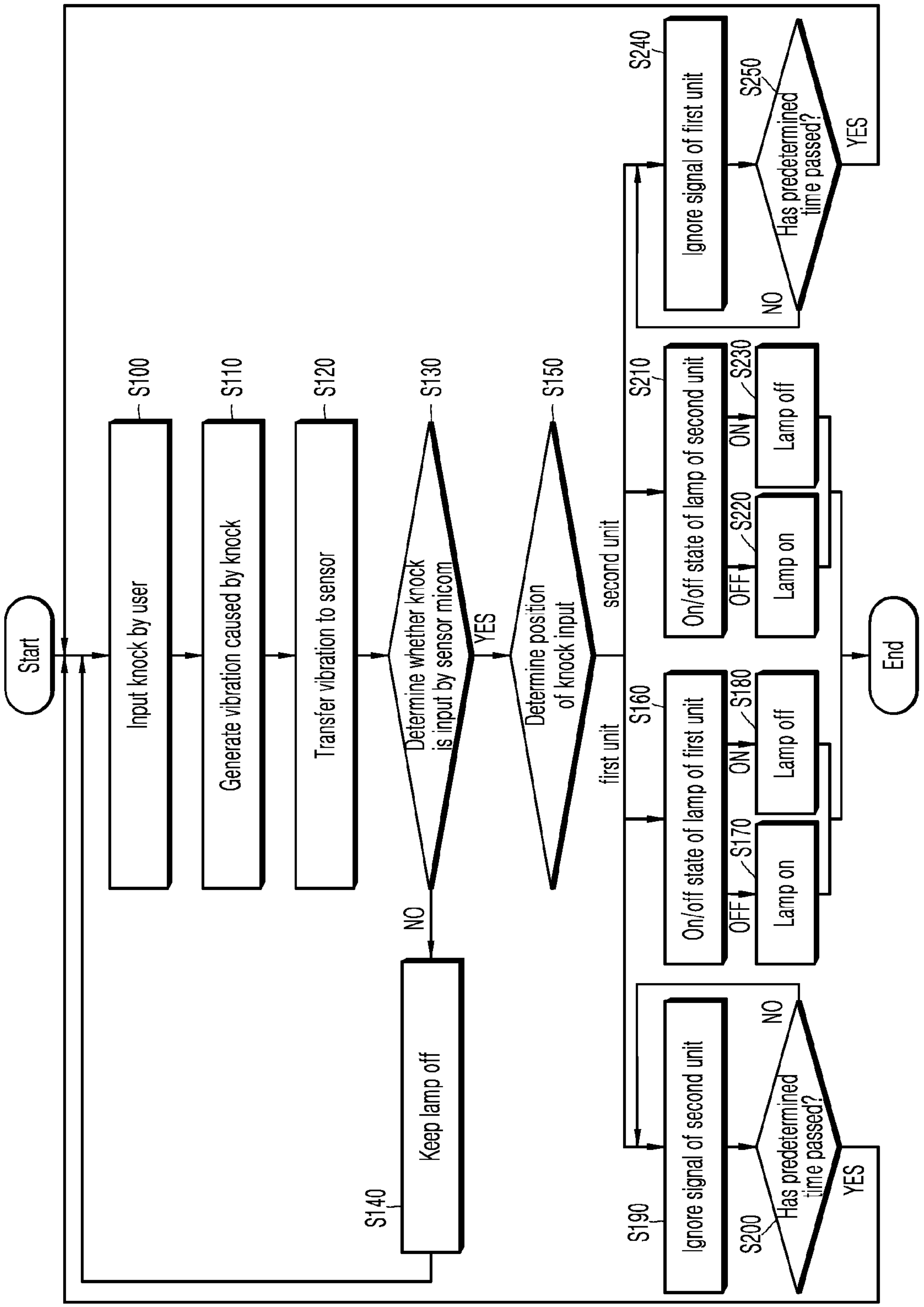
FIG. 32 is a flowchart for describing a control method of an appliance in one embodiment.
Figure 33:
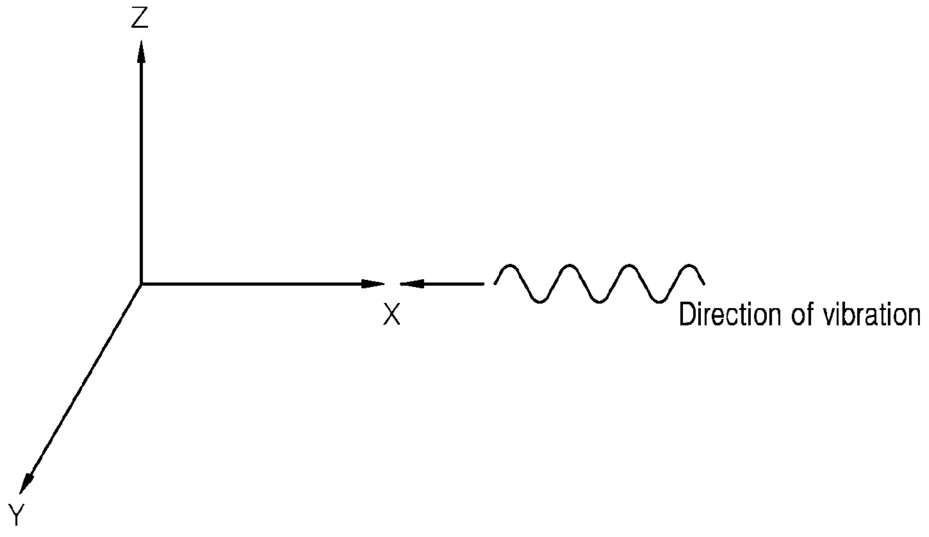
FIG. 33 is a view showing the direction of one axis of a three axes sensor module and the direction of vibrations caused by a knock, in one embodiment.
Figure 34:
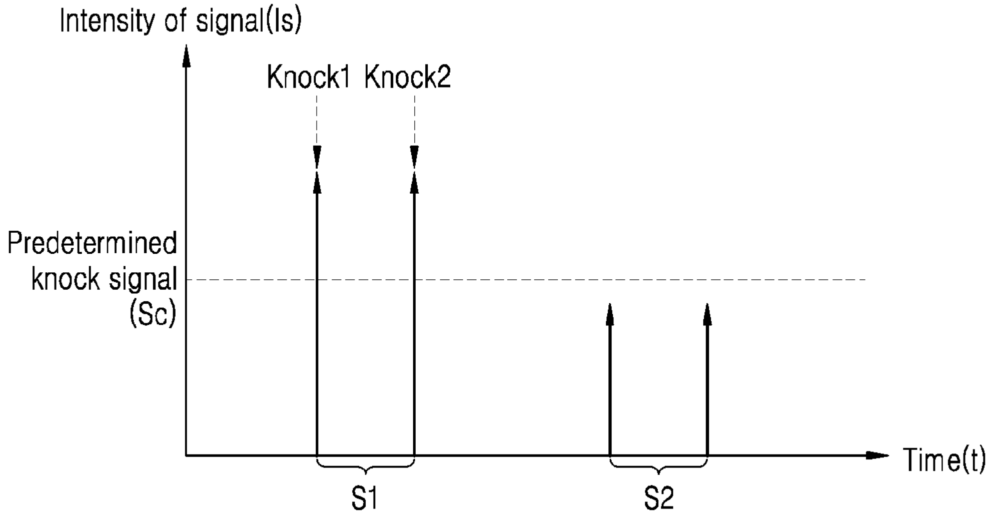
FIG. 34 is a view showing a vibration sensing signal caused by a knock in the appliance of one embodiment.
Figure 35:
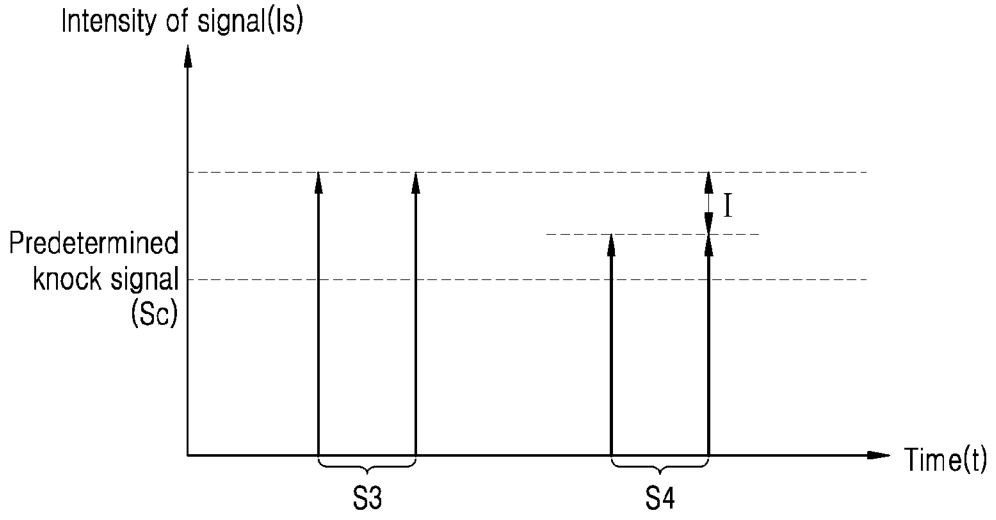
FIGS. 35 and 36 are views showing a vibration sensing signal generated in each unit of the appliance of one embodiment.
Figure 36:
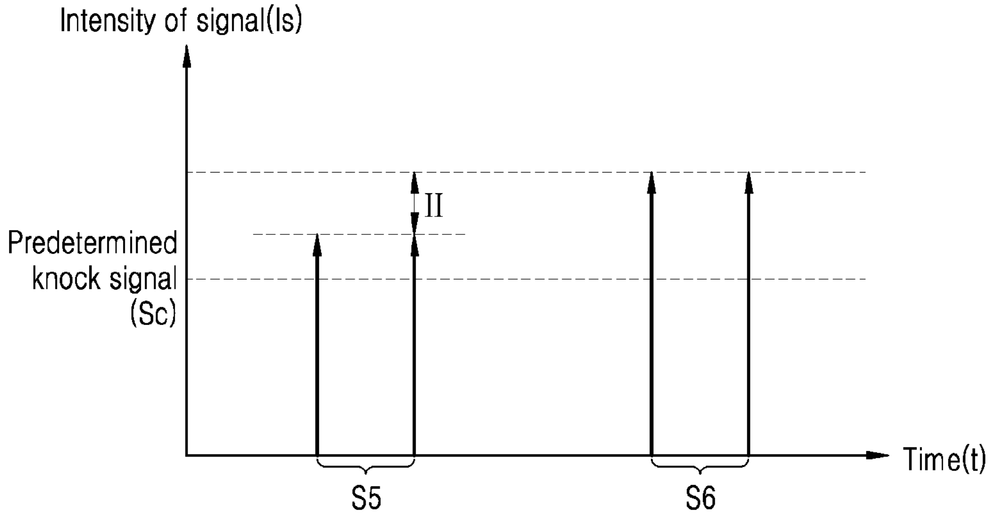

FIG. 31 is a front view showing the appliance of FIG. 2 without a door in another embodiment. FIG. 32 is a flowchart for describing a control method of an appliance in one embodiment. FIG. 33 is a view showing the direction of one axis of a three axes sensor module and the direction of vibrations caused by a knock, in one embodiment. FIG. 34 is a view showing a vibration sensing signal caused by a knock in the appliance of one embodiment. Additionally, FIGS. 35 and 36 are views showing a vibration sensing signal generated in each unit of the appliance of one embodiment.

Hereafter, the control method of the appliance configured as described above, according to the disclosure, is described with reference to FIGS. 31 to 36.

Referring to FIGS. 31 and 32, for the user to look into the appliance through the see-through window 16*a*, the user knocks on the see-through window 16*a* mounted on the door 16 of the appliance including the first unit 1 or the second unit 2. As the user inputs a knock by knocking on the see-through window 16*a* mounted on the door 16 of the appliance including the first unit 1 and the second unit 2 that are stacked vertically (S100), vibrations may occur in the portion where the knock is given, and vibrations caused by the knock may occur (S110).

The vibrations may be transferred to the input switch 120 disposed at the frontmost side of the first sensing module 100. The input switch 120 may be disposed respectively at the first unit 1 or the second unit 2, to receive the vibrations applied to the see-through window 16*a*.

The vibrations input to the input switch 120 may be transferred to the sensor 110 at the rear of the cavity 11 through the transfer member 130 (S120).

The sensor 110 may detect each acceleration that is a very small change in the movement of a medium caused by the vibrations in three axes directions orthogonal to one another, i.e., x, y and z-axis directions through the three axes acceleration sensor provided in the three axes sensor module 111.

At this time, the three axes acceleration sensor may be installed in a way that the direction of an axis on which the vibrations are sensed is aligned with the direction of the vibrations caused by the knock, to improve the accuracy in the sensor 110's sensing vibrations caused by a knock. For example, as illustrated in FIG. 33, the three axes acceleration sensor may be installed in a way that the x-axis direction of the three axes acceleration sensor is aligned with the direction of the vibrations caused by the knock, but not be limited.

The sensor 110 may sense the vibrations transferred in the three axes directions, and combine vibration sensing signals corresponding to the vibrations, to sense vibrations corresponding to the knock.

The vibrations transferred to the sensor 110 may include unnecessary noise in addition to the vibration sensing signal caused by the knock input. Considering the fact, the appliance in the embodiment may remove the unnecessary noise from the vibrations transferred to the sensor 110, by using the filter part 115. The vibration sensing signal may pass through the filter part 115 as described, be amplified by the amplification part 117 and then be input to the sensor micom 113.

Having received the vibration sensing signal, the sensor micom 13 may determine whether the vibrations sensed by the sensor 110 are the vibrations caused by the knock that is input by the user (S130). The sensor micom 113 may determine the vibrations caused by the knock, based on the signals output from the amplification part 117.

Referring to FIG. 34, the sensor micom 113 may determine the vibrations caused by the knock, based on results of comparison of the pattern S1, S2 of the vibration sensing signals generated by the three axes sensor module 111 with the pattern of vibration sensing signal Sc (hereafter, a "predetermined knock signal") of a predetermined threshold or greater.

Ordinarily, a knock is given in the form of "knock knock", and vibrations corresponding to "knock knock" may be usually expressed as a signal having magnitude greater than that of vibrations generated by another factor. Accordingly, the sensor micom 113 may compare the intensity of the predetermined knock signal Sc with the measured intensity of the signal, in the state in which a vibration sensing signal of intensity corresponding to "knock knock" is input to the sensor micom 113 as the predetermined knock signal Sc.

In an example, the sensor micom 113, as illustrated in FIG. 34, may determine that a knock is given, when the predetermined knock signal Sc is sensed as "knock 1" and "knock 2" continuously at predetermined intervals.

When sensing a signal of intensity less than the intensity of the predetermined knock signal Sc (S2), the sensor micom 113 may determine that vibrations are not caused by a knock, and transmit a signal corresponding to the determination to the controller 200.

In another example, the sensor micom 113 may extract a vibration sensing signal in any one axis direction (e.g., the x-axis direction) aligned with the direction of vibrations caused by a knock, among vibration sensing signals in the three axes directions. The sensor micom 113 may determine the vibrations caused by the knock, based on results of comparison of the extracted vibration sensing signal with the vibration sensing signals in the two other axes directions (e.g., the y and z-axes directions).

Specifically, the sensor micom 113 may determine that vibrations sensed by the sensor 110 are not caused by a knock when a maximum value of the vibration sensing signal in at least one of the y-axis or z-axis direction is greater than a maximum value of the vibration sensing signal in the x-axis direction.

For example, a knock input may be usually performed through the see-through window 16*a* attached on the door 16 of the appliance. Vibrations caused by the knock may be transferred to the input switch 120 disposed on the front panel 12, and transferred to the sensor 110 through the transfer member 130 connecting to the input switch 120. That is, vibrations caused by a knock input occur only in one direction of the x-axis.

Additionally, vibrations generated in the y-axis direction or the z-axis direction may be vibrations respectively generated in the side portion and the upper portion of the appliance, rather than vibrations generated in the front portion of the appliance. Further, the waveforms of vibrations, which are not caused by a knock input by the user, e.g., the wave forms of vibrations caused by ambient noise or the internal operation of the appliance, may be generated in the y-axis or z-axis direction.

Considering the fact, the value of the predetermined knock signal Sc, which is a vibration sensing signal of the predetermined threshold or greater in the x-axis direction, may be input to the sensor micom 113 as vibrations corresponding to a knock. In this state, the sensor micom 113 may extract a vibration sensing signal in the x-axis direction from vibration sensing signals input to the sensor 100.

Having extracted the vibration sensing signal in the x-axis direction, the sensor micom 113 may determine that vibrations sensed by the sensor 110 are vibrations caused by a knock only when a maximum value of the intensity of the vibration sensing signal in the x-axis direction is greater than a maximum value of the intensity of the vibration sensing signal in the y-axis direction, a maximum value of the intensity of the vibration sensing signal in the z-axis direction, and the predetermined knock signal Sc.

That is, the sensor micom 113 may be set to determine that vibrations sensed by the sensor 110 are not caused by a knock when the maximum value of the intensity of the vibration sensing signal in the x-axis direction is less than the predetermined knock signal Sc.

Additionally, the sensor micom 113 may be set to determine that vibrations sensed by the sensor 110 are not caused by a knock when the maximum value of the intensity of the vibration sensing signal in at least one of the y-axis or z-axis direction is greater than the maximum value of the intensity of the vibration sensing signal in the x-axis direction.

The controller 200 may control the on/off of the lamp 70. When determining that vibrations input to the sensor 110 are not a vibration sensing signal caused by a knock, the sensor micom 113 may output a signal corresponding to the determination to the controller 200. As the signal is output to the controller 200, the controller 200 may keep the lamp 70 off (S140).

When determining vibrations input to the sensor 110 are a vibration sensing signal caused by a knock, a determination the position in which the knock is input may made (S150).

In the case of an appliance including a first unit 1 and a second unit 2 that are stacked vertically, it is important to determine whether vibrations caused by a knock are generated in the first unit 1 or the second unit 2.

When knock-induced vibrations in the first unit 1 does not distinguish from knock-induced vibrations in the second unit 2, an operational error may occur in the operation of turning on/off the lamp 70, and the user may not look into the unit to be checked by the user properly through the see-through window 16*a*. For example, when the two sensors 110 disposed respectively in the first unit 1 or the second unit 2 sense the predetermined knock signal at the same time, an operational error such as a simultaneous on/off of the lamps 70 of the two units or the turn-on of the lamp 70 of the other unit rather than the unit to which a knock is input.

Considering the fact, the sensor 110 in the embodiment, specifically, the sensor micom 113, may accurately distinguish a first knock-on/off signal corresponding to a knock input by the user to the first unit 1 from a second knock-on/off signal corresponding to a knock input by the user to the second unit 2.

Specifically, the intensity of vibrations caused by a knock input by the user may be determined depending on the position of a portion to which the knock is input.

In an example, as the user gives a knock on the door installed in the portion of the front surface of the first unit 1 of the appliance as illustrated in FIG. 35, vibrations caused by the knock are sensed as a first vibration sensing signal S3 of large magnitude by the sensor micom 113 disposed at the rear of the first unit 1, and sensed as a second vibration sensing signal S4 of less magnitude than that of the first vibration sensing signal S3 by the sensor micom 113 disposed at the rear of the second unit 2.

As the user knocks on the door or the see-through window 16*a*, installed in the portion of the front surface of the first unit 1, vibrations, transferred to the input switch 120 disposed on the front panel 12 of the first unit 1, may be transferred directly to the sensor 110 through the transfer member 130, and a first vibration sensing signal S3 of large magnitude may be input to the sensor micom 113 of the first unit 1.

At this time, since the vibrations may also be transferred to the sensor 110 of the second unit 2 far from the sensor 110 of the first unit 1, to which the knock is directly input, a second vibration sensing signal S4 input to the sensor micom 113 of the second unit 2 may have less intensity than the first vibration sensing signal S3 by magnitude 'I'.

In another example, as vibrations caused by a knock occur on the door or the see-through window 16*a* installed in the portion of the front surface of the first unit 1, a first vibration sensing signal S3 of large magnitude may be input to the sensor micom 113 of the first unit 1. This is because vibrations transferred to the input switch 120 disposed on the front panel 12 are transferred directly to the sensor 110 of the first unit 1 through the transfer member 130, as described above.

In the second unit 2, vibrations pass through a vibration absorption member 3 (see FIG. 31) disposed on the front surface of the bottom between the first unit 1 and the second unit 2 and are input to the sensor micom 113 of the second unit 2. Accordingly, a second vibration sensing signal S4 from the second unit 2 may have less intensity than the first vibration sensing signal S3 from the first unit 1 by magnitude 'I'.

The vibration absorption member 3 including a material capable of absorbing vibrations may be disposed between the first unit 1 and the second unit 2 that are made of a metallic material and transfer vibrations well. The vibration absorption member 3 may reduce interference between the units, caused by vibrations. For example, the vibration absorption member 3 may be made of a material such as rubber or sponge and the like capable of absorbing vibrations but not limited.

Since both of the first vibration sensing signal S3 from the first unit 1 and the second vibration sensing signal S4 from the second unit 2 are determined as vibrations caused by a knock, both of the first vibration sensing signal S3 and the second vibration sensing signal S4 have intensity that is the intensity or greater of the predetermined knock signal Sc.

The sensor micom 113 may determine the first and second sensing signals S3, S4, based on a signal output by the amplification part 117.

The sensor micom 113 may determine the first vibration sensing signal S3 having greater intensity than the second vibration sensing signal S4 as a first knock-on/off signal corresponding to a knock input by the user, and transfer an output signal to the controller 200. In other words, the sensor micom 113 may determine the first vibration sensing signal as the first knock-on/off signal indicating that the user inputs a knock to the first unit 1.

As the sensor micom 113 determines that the first knock-on/off signal has occurred in the first unit 1, the controller 200 ascertains the on/off state of the lamp 70 of the first unit 1 (S160). Then the controller 200 may turn on/off the lamp 70 (S170, S180).

Specifically, when determining the first knock-on/off signal in the state in which the lamp 70 is off, the controller 200 outputs an on output signal to the lamp 70. Then the controller 200 may turn on the lamp 70 of the first unit 1, based on the on output signal (S170).

Additionally, when determining the first knock-on/off signal in the state in which the lamp 70 is on, the controller 200 outputs an off output signal to the lamp 70. Then the controller 200 may turn off the lamp 70 of the first unit 1, based on the off output signal (S180).

When determining the first knock-on/off signal of the first unit 1, the controller 200 ignores the second vibration sensing signal S4 sensed by the sensor micom 113 of the second unit 2 at the same time as the controller 200 determines the first vibration sensing signal S3 as the first knock-on/off signal (S190).

When the second unit 2 is not limited in the state where the position of the occurrence of the first knock-on/off signal corresponding to a knock input by the user is determined as the first unit 1, an output signal from the controller 200 may also be applied to the lamp 70 of the second unit 2. Then the on operation may be performed to the second unit 2, and an operational error such as a simultaneous turn-on of the lamp 70 in the first accommodation space of each of the first unit 1 and the second unit 2 may occur. Since a vibration sensing signal sensed by the sensor micom 113 of the second unit 2 is ignored to prevent the operational error, an output signal from the controller 200 is not supplied to the lamp 70 of the second unit 2.

Ordinarily, a time interval between an output knock signal to the controller 200 from the first unit 1 and an output knock signal to the controller 200 from the second unit 2 is less than one second, and in an example, the time interval may be 500 ms to 600 ms. The sensor micom 113 may set time as much as the time interval between the output knock signal to the controller 200 from the first unit 1 and the output knock signal to the controller 200 from the second unit 2 such that the second vibration sensing signal S4 sensed by the second unit 2 is ignored.

Then the sensor micom 113 determines whether the set time passes (S200). As the time set by the sensor micom 113 passes, except for the first knock-on/off signal that has already been determined, other signals may be determined. Alternatively, a knock input by the user may be waited for. When the time set by the sensor micom 113 does not pass, the second vibration sensing signal S4 sensed by the second unit 2 may be kept ignored.

In the above-mentioned process, the lamp 70 of the second unit 2 may be prevented from being turned on/off while the lamp 70 of the first unit 1 is turned on/off, such that the user looks into the accommodation space of the first unit 1 to be checked by the user through the see-through window 16*a*.

In another example, as the user knocks on the door installed in the portion of the front surface of the second unit 2 of the appliance as illustrated in FIG. 36, vibrations caused by the knock may be sensed as a third vibration sensing signal S6 of large magnitude by the sensor micom 113 disposed at the rear of the second unit 2, and sensed as a fourth vibration sensing signal S5 having less magnitude than the third vibration sensing signal S6 by the sensor micom 113 disposed at the rear of the first unit 1.

As the user knocks on the see-through window 16*a* mounted on the door 16 installed in the portion of the front surface of the second unit 2, vibrations transferred to the input switch 120 disposed on the front panel 12 of the second unit 2 are transferred directly to the sensor 110 through the transfer member 130. Accordingly, a third vibration sensing signal S6 of large magnitude may be input to the sensor micom 113 of the second unit 2.

At this time, since the remaining vibrations are transferred to the sensor 110 of the first unit 1 far from the sensor 110 of the second unit 2, to which the knock is directly input, a fourth vibration sensing signal S5 input to the sensor micom 113 of the first unit 1 may have less intensity than the third vibration sensing signal S6 by magnitude 'II'.

In another example, as vibrations caused by a knock occur on the door or the see-through window 16*a* installed in the portion of the front surface of the second unit 2, a third vibration sensing signal S6 of large magnitude may be input to the sensor micom 113 of the second unit 2, since vibrations transferred to the input switch 120 disposed on the front panel 12 are transferred directly to the sensor 110 of the second unit 2 through the transfer member 130, as described above.

In the first unit 1, vibrations pass through the vibration absorption member 3 (see FIG. 31) disposed on the front surface of the bottom between the first unit 1 and the second unit 2 and are input to the sensor micom 113 of the first unit 1. Accordingly, a fourth vibration sensing signal S5 from the first unit 1 may have less intensity than the third vibration sensing signal S6 from the second unit 2 by magnitude 'II'.

Since both of the third vibration sensing signal S6 from the second unit 2 and the fourth vibration sensing signal S5 from the first unit 1 are determined as vibrations caused by a knock, both of the third vibration sensing signal S6 and the fourth vibration sensing signal S5 have intensity that is the intensity or greater of the predetermined knock signal Sc.

The sensor micom 113 may determine the third vibration sensing signal S6 from the second unit 2 having greater intensity than the fourth vibration sensing signal S5 from the first unit 1 as a second knock-on/off signal corresponding to a knock input by the user, and transfer an output signal to the controller 200. In other words, the sensor micom 113 may determine the third vibration sensing signal from the second unit 2 as the second knock-on/off signal indicating that the user inputs a knock to the second unit 2.

As the controller 200 determines the third vibration sensing signal S6 as the second knock-on/off signal corresponding to a knock input by the user to the second unit 2, the controller 200 ascertains the on/off state of the lamp 70 of the second unit 2 (S210). Then the controller 200 may turn on/off the lamp 70 (S220, S230).

Specifically, when determining the second knock-on/off signal in the state in which the lamp 70 is off, the controller 200 outputs an on output signal to the lamp 70. Then the controller 200 may turn on the lamp 70 of the second unit 2, based on the on output signal (S220).

Additionally, when determining the second knock-on/off signal in the state in which the lamp 70 is on, the controller 200 outputs an off output signal to the lamp 70. Then the controller 200 may turn off the lamp 70 of the second unit 2, based on the off output signal (S230).

When determining the second knock-on/off signal of the second unit 2, the controller 200 ignores the fourth vibration sensing signal S5 sensed by the sensor micom 113 of the first unit 1 at the same time as the controller 200 determines the third vibration sensing signal S6 as the second knock-on/off signal (S240).

When the first unit 1 is not limited in the state where the position of the occurrence of the second knock-on/off signal corresponding to a knock input by the user is determined as the second unit 2, an output signal from the controller 200 may also be applied to the lamp 70 of the first unit 1. Then the on/off operation may also be performed to the first unit 1, and an operational error such as a simultaneous turn-on or turn-off of the lamp 70 in the first accommodation space of each of the first unit 1 and the second unit 2 may occur. To prevent the operational error, the fourth vibration sensing signal S5 sensed by the sensor micom 113 of the first unit 1 is ignored to prevent an on/off output signal from be applied to the lamp 70 of the first unit 2.

Ordinarily, a time interval between an output knock signal to the controller 200 from the first unit 1 and an output knock signal to the controller 200 from the second unit 2 is less than one second, and in an example, the time interval may be 500 ms to 600 ms. The sensor micom 113 may set time as much as the time interval between the output knock signal to the controller 200 from the first unit 1 and the output knock signal to the controller 200 from the second unit 2 such that the fourth vibration sensing signal S5 sensed by the first unit 1 is ignored.

Then the sensor micom 113 determines whether the set time passes (S250). As the time set by the sensor micom 113 passes, except for the second knock-on/off signal that has already been determined, other signals may be determined. Alternatively, a knock input by the user may be waited for. When the time set by the sensor micom 113 does not pass, the fourth vibration sensing signal S5 sensed by the first unit 1 may be kept ignored.

In the above-mentioned process, the lamp 70 of the first unit 1 may be prevented from being turned on/off while the lamp 70 of the second unit 2 is turned on/off, such that the user looks into the accommodation space of the second unit 2 to be checked by the user through the see-through window 16*a*.

In yet another example, the controller 200 may determine whether predetermined time passes in the state where the lamp 70 is on. As the predetermined time passes, the controller 200 may turn off the lamp 70 automatically. Thus, even if the user forgets to turn off the lamp 70 after turning on the lamp 70 by knocking on the see-through window 16*a* to look into the first unit 1 or the second unit 2 through the see-through window 16*a*, the lamp 70 is turned off automatically as the predetermined time passes, preventing unnecessary power consumption.

In the above process, the user may look into the accommodation space from the outside through the see-through window 16*a* mounted on the door 16 of the appliance simply by giving a knock. Further, even if the user knocks respectively on the first unit 1 and the second unit 2 that are stacked vertically, the user can look into each accommodation space without an operational error such as a simultaneous turn-on/off of the lamps of the first unit 1 and the second unit 2.

One objective of the present disclosure is to provide a control method of an appliance, in which the position of a knock input can be accurately identified by an appliance where a plurality of accommodation spaces having a lamp therein is disposed to contact one another and each door opens and closes the accommodation space.

Another objective of the present disclosure is to provide a control method of an appliance in which lamps in a plurality of accommodation spaces are prevented from being turned on/off at the same time, allowing a user to look into each accommodation space, in an appliance where a plurality of accommodation spaces having a lamp therein is disposed to contact one another and each door opens and closes the accommodation space.

Another objective of the present disclosure is to provide an appliance that has an improved structure in which a sensor can be installed to sense a knock input effectively even in an appliance such as an oven and the like that makes it difficult to attach a sensor to a door due to high-temperature heat.

Another objective of the present disclosure is to provide an appliance that has an improved structure in which a knock input can be sensed effectively even when a sensor for sensing a knock input is installed far from a door to avoid a high-temperature environment.

Another objective of the present disclosure is to provide an appliance that has an improved structure in which the accuracy of a sensor's sensing improves while the effect of heat on the sensor can decrease.

Another objective of the present disclosure is to provide an appliance that has an improved structure in which a structure for sensing a knock input is effectively installed in the appliance without being affected by or affecting electronic components in the appliance.

Another objective of the present disclosure is to provide an appliance that can perform the functions of sensing a knock input and sensing the closing of a door, with a single module.

Yet another objective of the present disclosure is to provide an appliance that can perform the functions of sensing whether a door is opened and closed and determining whether a knock input is sensed depending on the opening and closing of the door.

According to one aspect, a control method of an appliance, including: the appliance includes a first unit that includes a first lamp, a first cavity, a first door and a first sensor; a second unit that includes a second lamp, a second cavity, a second door and a second sensor; and a controller that controls operations of the first unit and the second unit, includes: sensing vibrations generated in any one of the first unit or the second unit by the first sensor and the second sensor; determining whether the sensed vibrations are caused by a knock using the first sensor and the second sensor, and when determining that the sensed vibrations are caused by a knock, transferring a knock-on signal to the controller; and comparing the knock-on signals received from the first sensor and the second sensor and determining which of the first unit or the second unit is given the knock by the controller, and outputting a lamp-on output signal to the first unit or the second unit in which the knock is generated by the controller.

As described above, since any one of the first unit and the second unit, to which a user inputs a knock, is identified, a lamp in a cooking space selected by the user may be selective turned on/off.

According to another aspect, since the sensor in the first unit or the second unit senses vibrations, the controller determines whether the vibrations satisfy a predetermined knock signal that corresponds to vibrations caused by a knock.

According to another aspect, when the controller determines that the knock is generated in the first unit, the controller ignores a vibration sensing signal sensed by the second sensor and supplies no output signal to the second unit, and when the controller determines that the knock is generated in the second unit, the controller ignores a vibration sensing signal sensed by the first sensor and supplies no output signal to the first unit.

Thus, as vibrations are caused by a knock in an appliance where the door of the first unit or the second unit opens and closes accommodation space, the lamp in the cooking space of the first unit or the second unit may be prevented from being turned on/off at the same time, and an operational error may be prevented.

In a control method of an appliance according to the present disclosure, the appliance including a plurality of accommodation spaces that are disposed vertically may accurately identify the position of a knock input, where a user's knock operation is performed.

In the control method, the position of a knock input by the user may be identified such that a lamp in an accommodation space selected by the user can only be selectively turned on/off, among the plurality of accommodation spaces, reducing unnecessary power consumption.

In the control method, the lamps in the plurality of accommodation spaces may be prevented from being turned on/off at the same time in the appliance where the plurality of accommodation spaces having a lamp therein contact one another and each door opens and closes the accommodation space.

According to the present disclosure, since a sensor is disposed in a position that is not affected by heat, the sensor may be much less likely to experience an operational error or damage caused by heat.

Thus, according to the present disclosure, the effect of heat on the sensor may decrease, and the accuracy of the sensor's sensing may improve.

An appliance according to the present disclosure may effectively sense a knock input even in the case of an appliance such as an oven and the like that makes it difficult to attach a sensor to a door due to high-temperature heat, reduce the effect of heat on the sensor, and improve the accuracy of the sensor's sensing.

According to the present disclosure, a knock input may be effectively sensed without being affected by or affecting electronic components installed in the appliance.

According to the present disclosure, a transfer member may connect between an input member disposed near the door, and a sensor, and when the door is closed, vibrations of the door may be transferred to the sensor through the transfer member, providing the function of sensing whether the door is opened and close and the function of determining whether a knock input is sensed depending on the opening and closing of the door.

According to the present disclosure, depending on the opening and closing of the door, the operation of the sensor 110 may be determined electrically, and a knock input may be sensed through the transfer member in the form of an electric wire or a rod, and the like, performing the function of sensing a knock input and the function of sensing the closing of the door together.

The embodiments are described above with reference to a number of illustrative embodiments thereof. However, the embodiments set forth herein are provided only as examples, and numerous other modifications and embodiments can be devised by one skilled in the art from the embodiments set forth herein. The technical protection scope of the disclosure should be defined according to the appended claims.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A control method of an appliance including a first cavity, a first door for the first cavity, a first sensor for the first door, a first lamp for the first cavity; a second cavity, a second door for the second cavity, a second sensor for the second door, and a second lamp for the second cavity, and at least one controller, the control method comprising:

sensing, by the first sensor and the second sensor, vibrations in at least one of the first door or the second door;

determining, by the at least one controller, whether the sensed vibrations are caused by a knock;

based on determining that the sensed vibrations are caused by the knock, generating, by the at least one controller, respective knock-on signals for the first door and for the second door;

comparing, by the at least one controller, the knock-on signals for the first door and for the second door;

determining, by the at least one controller and based on comparing the knock-on signals for the first door and for the second door, which one of the first door or the second door received the knock; and controlling, by the at least one controller, one of the first lamp or the second lamp corresponding to the one of the first door or the second door that received the knock, wherein the vibrations are generated at one of the first door or the second door, and each the first sensor and the second sensor are connected to the first door and the second door, respectively, via a transfer member to receive the vibrations from the first door and the second door, respectively.

2. The control method of claim 1, when the at least one controller determines that the knock is received by the first door, the at least one controller ignores the knock-on signal for the second door and supplies no output signal to the second lamp in response to the knock-on signal for the second door.

3. The control method of claim 1, when the at least one controller determines that the knock is received the second door, the at least one controller ignores the knock-on signal for the first door and supplies no output signal to the first lamp in response to the knock-on signal for the first door.

4. The control method of claim 1, wherein the at least one controller supplies no output signal to another one of the first lamp or the second lamp that did not receive the knock for 500 ms to 600 ms.

5. The control method of claim 1, wherein controlling the one of the first lamp or the second lamp includes:

turning on the first lamp during the predetermined time after receiving the knock when the at least one controller determines that the knock is received by the first door, and turning on the second lamp when the at least one controller determines that the knock is received by the second door; and turning off the one of the first lamp or the second lamp after the predetermined time.

6. The control method of claim 1, wherein each of the first sensor and the second sensor detects acceleration of a respective one of the transfer members by the vibrations generated and transferred from, respectively, the first door and the second door with respect to an x-axis direction, a y-axis direction and a z-axis direction that are orthogonal to one another, and sets the x-axis direction to a direction of the vibrations caused by the knock.

7. The control method of claim 1, wherein determining when the sensed vibrations are caused by the knock includes:

determining that the sensed vibrations are vibrations caused by the knock when an intensity of the sensed vibrations is equal to or greater than a predetermined threshold intensity of a predetermined knock signal.

8. The control method of claim 1, wherein each of the first sensor and the second sensor detects acceleration of a respective one of the transfer members, caused by the vibrations, with respect to three-axes directions of an x-axis direction, a y-axis direction and a z-axis direction that are orthogonal to one another, and wherein determining when the sensed vibrations are caused by the knock includes:

setting the x-axis direction in direction associated with a vibration sensing signal of a threshold intensity or greater for a predetermined knock signal, extracting vibration sensing signals for the sensed vibrations in the x-axis direction, the y-axis direction, and the z-axis direction;

comparing the vibration sensing signal in the x-axis direction with the vibration sensing signals in the y-axis and z-axis directions; and when a maximum of at least one of the vibration sensing signal in the y-axis direction or the vibration sensing signal in the z-axis direction is greater than a maximum of the vibration sensing signal in the x-axis direction, determining that the vibrations sensed by the first sensor and the second sensor are not caused by the knock.

9. The control method of claim 1, determining which one of the first door or the second door received the knock includes:

comparing a first vibration sensing signal and a second vibration sensing signal, wherein the first vibration sensing signal is a knock-on signal satisfying a predetermined knock signal measured from the first door, and a second vibration sensing signal is an knock-on signal satisfying a predetermined knock signal measured from the second door.

10. The control method of claim 9, further comprising:

determining that the first door as a knock input position in which the user inputs the knock when an intensity of the first vibration sensing signal is greater than an intensity of the second vibration sensing signal; and determining that the second door as the knock input position in which the user inputs the knock when the intensity of the second vibration sensing signal is greater than the intensity of the first vibration sensing signal.

11. The control method of claim 1, wherein controlling the one of the first lamp or the second lamp includes:

turning on the one of the first lamp or the second lamp when the one of the first lamp or the second lamp is off when the knock is received, and turning off the one of the first lamp or the second lamp when the one of the first lamp or the second lamp is on when the knock is received.

12. The control method of claim 1, wherein the first cavity and the second cavity are disposed vertically.

13. The control method of claim 1, wherein the appliance includes an oven, a cooktop, a washing machine, a dryer, a dishwasher, or a refrigerator.

14. The control method of claim 1, wherein:

the at least one controller includes a first controller coupled to the first sensor and the second sensor, and a second controller that controls operations of the first lamp and the second lamp, determining whether the sensed vibrations are caused by the knock and generating the knock-on signals for the first door and for the second door are performed by the first controller, the method further comprises transferring, by the first controller, the knock-on signals to the second controller, and comparing the knock-on signals for the first door and the second door, determining which one of the first door or the second door received the knock, and controlling the one of the first lamp or the second lamp are performed by the second controller.

15. The control method of claim 14, wherein:

the first controller includes a first sensor controller for the first sensor and a second sensor controller for the second sensor, and each of the first sensor controller and the second sensor controller determines that the sensed vibrations are caused by the knock.

16. An appliance comprising:

a first cavity, a first lamp configured to light up the first cavity, and a first door to open and close an opening to the first cavity;

a second cavity, a second lamp configured to light up the second cavity, and a second door to open and close an opening to the second cavity;

a first sensor to detect first vibrations of the first door;

a second sensor to detect second vibrations of the second door; and a controller to control one of the first lamp or the second lamp associated with the one of the first door or the second door that received the knock;

wherein the controller outputs a signal to the one of the first lamp or the second lamp associated with the one of the first door or the second door that received the knock, when the controller determines that the knock is generated in the first door, the controller supplies no output signal to the second lamp, and when the controller determines that the knock is generated in the second door, the controller supplies no output signal to the first lamp, and wherein the vibrations are generated at one of the first door or the second door, and each the first sensor and the second sensor are connected to the first door and the second door, respectively, via a transfer member to receive the vibrations from the first door and the second door, respectively.

17. The appliance of claim 16, wherein each of the first door includes a first see-through window, and the second door includes a second see-through window such that the first cavity is visible through the first see-through window when the first lamp is turned on, and the second cavity is visible through the second see-through window when the second lamp is turned on.

18. The appliance of claim 16, wherein the controller is further to determine that one of the first vibrations or the second vibrations is caused by the knock when an intensity of the one of the first vibrations or the second vibrations is equal to or greater than a predetermined threshold intensity.

19. The appliance of claim 16, wherein the controller, when controlling the one of the first lamp or the second lamp, is further to:

turn on the one of the first lamp or the second lamp when the one of the first lamp or the second lamp is off when the knock is received, and turn off the one of the first lamp or the second lamp when the one of the first lamp or the second lamp is on when the knock is received.

* * * * *